US008073446B2

(12) United States Patent
Ishii et al.

(10) Patent No.: US 8,073,446 B2
(45) Date of Patent: Dec. 6, 2011

(54) RADIO NETWORK CONTROLLER, WIRELESS ACCESS GATEWAY, RADIO COMMUNICATION SYSTEM, AND COMMUNICATION METHOD FOR RADIO COMMUNICATION SYSTEM

(75) Inventors: Hidenori Ishii, Tokyo (JP); Satoshi Senga, Saitama (JP); Hiroshi Ishida, Kanagawa (JP); Takeshi Kanazawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1206 days.

(21) Appl. No.: 11/792,370

(22) PCT Filed: Dec. 7, 2005

(86) PCT No.: PCT/JP2005/022478
§ 371 (c)(1),
(2), (4) Date: Jun. 6, 2007

(87) PCT Pub. No.: WO2006/064705
PCT Pub. Date: Jun. 22, 2006

(65) Prior Publication Data
US 2008/0117884 A1   May 22, 2008

(30) Foreign Application Priority Data

Dec. 15, 2004   (JP) .................. 2004-362644
Apr. 5, 2005   (JP) .................. 2005-109202

(51) Int. Cl.
*H04W 36/00* (2009.01)
(52) U.S. Cl. .................. 455/436; 455/41.2; 455/432.1; 455/456.1
(58) Field of Classification Search .................. 370/338, 370/352, 401, 331, 332; 455/411, 414.3, 455/426.1, 436, 442, 552.1, 438, 439, 440
See application file for complete search history.

(56) References Cited

U.S. PATENT DOCUMENTS

| 6,535,738 B1 | 3/2003 | Bomar et al. |
| 7,203,482 B2 * | 4/2007 | Blumenthal et al. .......... 455/411 |
| 7,606,569 B2 * | 10/2009 | Hori et al. .................. 455/436 |
| 2003/0095663 A1 * | 5/2003 | Nelson et al. ................ 380/270 |

(Continued)

FOREIGN PATENT DOCUMENTS

EP   1 179 961   2/2002

(Continued)

OTHER PUBLICATIONS

Masaki Bandai et al., "A Seamless Handoff Scheme Using Positional Information for Mobile IP Based Networks", The Institute of Electronics, Information and Communication Engineers, Technical Report of IEICE, RCS2002-209, pp. 13-18 along with partial English translation.

(Continued)

*Primary Examiner* — Dwayne Bost
*Assistant Examiner* — Inder Mehra
(74) *Attorney, Agent, or Firm* — Wenderoth, Lind & Ponack, L.L.P.

(57) ABSTRACT

A radio network controller outputs a context required for a terminal capable of communicating with a mobile communication network and a wireless local area network to communicate with the wireless local area network to the terminal among pieces of information input from wireless access gateways that control connection with one or more wireless local area networks and provide seamless handover of packet communication between the mobile communication network and the wireless LAN.

22 Claims, 29 Drawing Sheets

U.S. PATENT DOCUMENTS

| | | | |
|---|---|---|---|
| 2003/0235176 A1 | 12/2003 | Zhang et al. | |
| 2004/0148352 A1* | 7/2004 | Menon et al. | 709/205 |
| 2005/0059347 A1* | 3/2005 | Haartsen | 455/41.2 |
| 2005/0130659 A1* | 6/2005 | Grech et al. | 455/436 |
| 2006/0268818 A1* | 11/2006 | Chen et al. | 370/349 |
| 2007/0014281 A1* | 1/2007 | Kant | 370/352 |
| 2008/0311927 A1* | 12/2008 | Boman et al. | 455/456.1 |

FOREIGN PATENT DOCUMENTS

| | | |
|---|---|---|
| JP | 2000-349829 | 12/2000 |
| JP | 2004-254278 | 9/2004 |
| WO | 03/055261 | 7/2003 |
| WO | 03/105007 | 12/2003 |
| WO | 03/107704 | 12/2003 |
| WO | 2004/002032 | 12/2003 |

OTHER PUBLICATIONS

Masaki Bandai et al., "A Low Latency Handoff Scheme Using Positional Information for Mobile IP Based Networks", GLOBECOM 2003 of IEEE, pp. 3468-3472.

English translation of the International Preliminary Report on Patentability of Jun. 19, 2007 issued in PCT/JP2005/022478.

Chinese Office Action issued Sep. 25, 2009 in Application No. 200580042465.2 (along with English translation).

* cited by examiner

FIG. 4

| CELL ID 401 | TYPE OF TERMINAL THAT CAN BE ACCOMMODATED 402 | POSITION 403 | CELL RADIUS 404 | CONNECTION INFORMATION 405 | ADJACENT CELL 406 | WAG 407 |
|---|---|---|---|---|---|---|
| M1 | UMTS | N 40° 00" / E139° 00.00" | 3000m | Scrambling code: M1 | M2,L1,L2 | - |
| M2 | UMTS | N 40° 00" / E139° 02.00" | 3000m | Scrambling code: M2 | M1,L2 | - |
| L1 | 802.11b/g | N 40° 00" / E138° 59.90" | 100m | SSID: L1 / WEP Key:K1 | M1 | W1 |
| L2 | 802.11b/g | N 40° 00" / E139° 01.80" | 100m | SSID: L2 / WEP Key:K2 | M1,M2 | W2 |

FIG. 6

| | | STATE | | | |
|---|---|---|---|---|---|
| | | (a) | (b) | (c) | (d) |
| 601 | IMSI | ID1 | ID1 | ID1 | ID1 |
| 602 | W-APN | iw.operator.com | iw.operator.com | iw.operator.com | iw.operator.com |
| 603 | USER ID | ID1@iw.operator.com | ID1@iw.operator.com | ID1@iw.operator.com | ID1@iw.operator.com |
| 604 | USER PROFILE | UP1 | UP1 | UP1 | UP1 |
| 605 | WIRELESS LAN MAC | 00:0E:36:4C:9E:38 | 00:0E:36:4C:9E:38 | 00:0E:36:4C:9E:38 | 00:0E:36:4C:9E:38 |
| 606 | Active Set | M1 | M1 | M1, L1 | L1 |
| 607 | SEMI-ACTIVE SET | NONE | M2, L1, L2 | M2, L2 | M1 |
| 608 | REMOTE IP ADDRESS | IP: 10.2.2.2 | IP: 10.2.2.2 | IP: 10.2.2.2 | IP: 10.2.2.2 |
| 609 | LOCAL IP ADDRESS | NOT SET | L1: 10.2.1.5, L2:10.2.2.5 | L1: 10.2.1.5, L2:10.2.2.5 | L1: 10.2.1.5, L2:10.2.2.5 |
| 610 | PDG TRANSPORT | NOT SET | IP: 10.1.1.1 Port: 10001 | IP: 10.1.1.1 Port: 10001 | IP: 10.1.1.1 Port: 10001 |

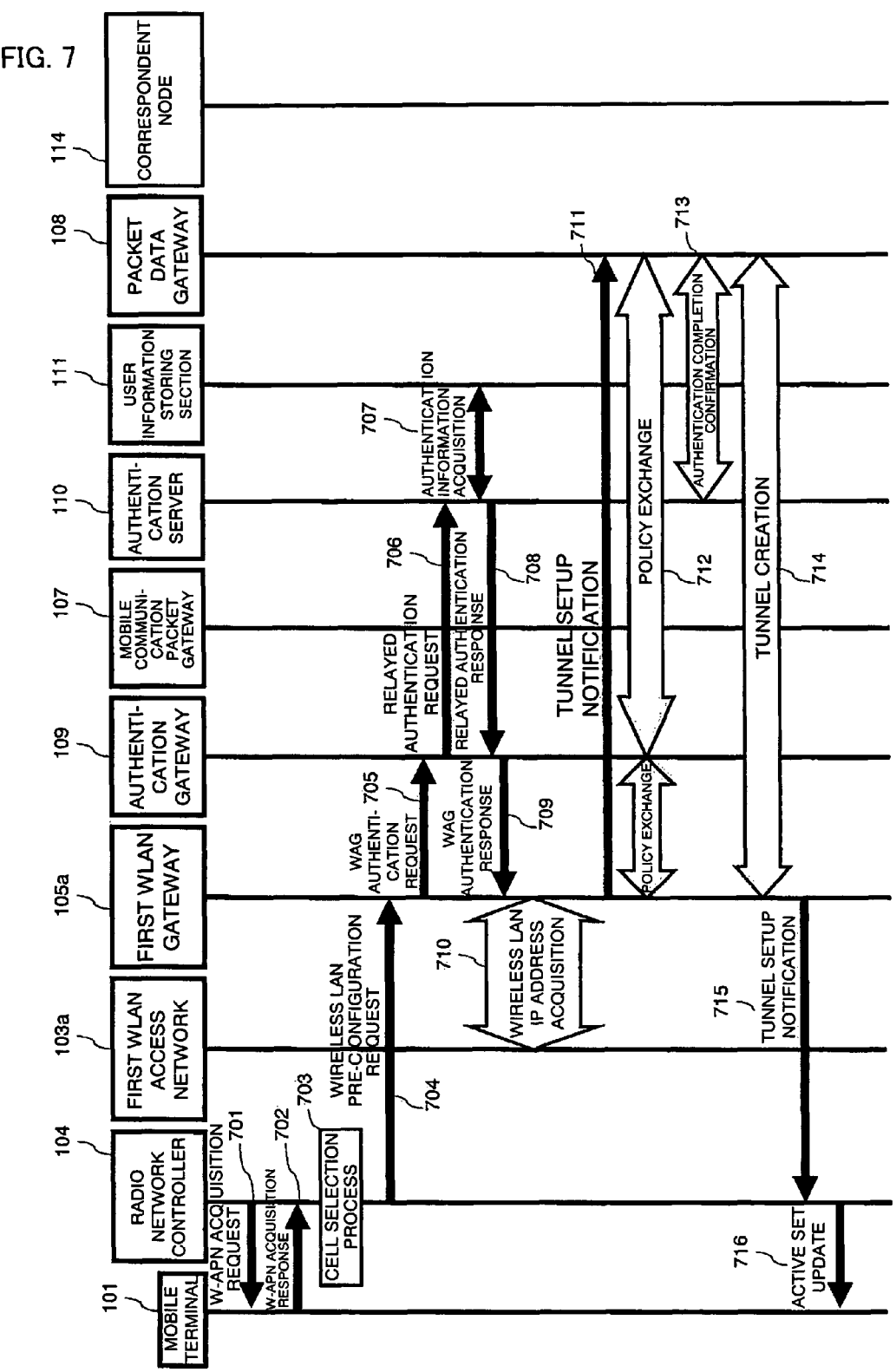

FIG. 8

| | | STATE | | | |
|---|---|---|---|---|---|
| | (a) | (b) | (c) | (d) | |
| IMSI | ID1 | ID1 | ID1 | ID1 | 801 |
| USER ID | NOT SET | ID1@iw.operator.com | ID1@iw.operator.com | ID1@iw.operator.com | 802 |
| USER PROFILE | NOT SET | UP1 | UP1 | UP1 | 803 |
| WIRELESS LAN MAC | NOT SET | 00:0E:36:4C:9E:38 | 00:0E:36:4C:9E:38 | 00:0E:36:4C:9E:38 | 804 |
| Active Set | M1 | M2, L1, L2 | M1, L1 | L1 | 805 |
| SEMI-ACTIVE SET | NOT SET | M1 | M2, L2 | M1 | 806 |
| REMOTE IP ADDRESS | IP: 10.2.2.2 | IP: 10.2.2.2 | IP: 10.2.2.2 | IP: 10.2.2.2 | 807 |
| LOCAL IP ADDRESS | NOT SET | L1: 10.2.1.5;L2:10.2.2.5 | L1: 10.2.1.5;L2:10.2.2.5 | L1: 10.2.1.5;L2:10.2.2.5 | 808 |

FIG. 9

| | STATE | | |
|---|---|---|---|
| | (a) | (b) | (c) |
| USER ID | ID1@iw.operator.com | ID1@iw.operator.com | ID1@iw.operator.com |
| USER PROFILE | UP1 | UP1 | UP1 |
| Serving RNC | R1 | R1 | R1 |
| WIRELESS LAN MAC | 00:0E:36:4C:9E:38 | 00:0E:36:4C:9E:38 | 00:0E:36:4C:9E:38 |
| Active Set | NONE | NONE | L1 |
| SEMI-ACTIVE SET | L1 | L1 | NONE |
| REMOTE IP ADDRESS | IP: 10.2.2.2 | IP: 10.2.2.2 | IP: 10.2.2.2 |
| LOCAL IP ADDRESS | NOT SET | IP: 10.2.1.5 | IP: 10.2.1.5 |
| PDG TRANSPORT | NOT SET | IP: 10.1.1.1 Port: 10001 | IP: 10.1.1.1 Port: 10001 |
| WLAN TRANSPORT | NOT SET | IP: 10.2.1.1 Port: 10001 | IP: 10.2.1.1 Port: 10001 |

901 USER ID
902 USER PROFILE
903 Serving RNC
904 WIRELESS LAN MAC
905 Active Set
906 SEMI-ACTIVE SET
907 REMOTE IP ADDRESS
908 LOCAL IP ADDRESS
909 PDG TRANSPORT
910 WLAN TRANSPORT

FIG. 16

| | | STATE | |
|---|---|---|---|
| | (a) | (b) | (c) |
| IMSI | ID1 | ID1 | ID1 |
| W-APN | iw.operator.com | iw.operator.com | iw.operator.com |
| USER ID | ID1@iw.operator.com | ID1@iw.operator.com | ID1@iw.operator.com |
| USER PROFILE | UP1 | UP1 | UP1 |
| WIRELESS LAN MAC | 00:0E:36:4C:9E:38 | 00:0E:36:4C:9E:38 | 00:0E:36:4C:9E:38 |
| Active Set | NONE | L2 | M1 |
| SEMI-ACTIVE SET | NONE | M1 | M2,L1,L2 |
| REMOTE IP ADDRESS | IP: 10.2.2.2 | IP: 10.2.2.2 | IP: 10.2.2.2 |
| LOCAL IP ADDRESS | L2: 10.2.2.5 | L2: 10.2.2.5 | L1: 10.2.1.5, L2:10.2.2.5 |
| PDG TRANSPORT | IP: 10.1.1.1 Port: 10001 | IP: 10.1.1.1 Port: 10001 | IP: 10.1.1.1 Port: 10001 |

1601 — IMSI
1602 — W-APN
1603 — USER ID
1604 — USER PROFILE
1605 — WIRELESS LAN MAC
1606 — Active Set
1607 — SEMI-ACTIVE SET
1608 — REMOTE IP ADDRESS
1609 — LOCAL IP ADDRESS
1610 — PDG TRANSPORT

FIG. 17

| | (a) | STATE (b) | (c) |
|---|---|---|---|
| 1701 IMSI | ID1 | ID1 | ID1 |
| 1702 USER ID | NOT SET | ID1@iw.operator.com | ID1@iw.operator.com |
| 1703 USER PROFILE | NOT SET | UP1 | UP1 |
| 1704 WIRELESS LAN MAC | NOT SET | 00:0E:36:4C:9E:38 | 00:0E:36:4C:9E:38 |
| 1705 Active Set | NONE | L2 | M1 |
| 1706 SEMI-ACTIVE SET | NOT SET | M1 | M2, L1, L2 |
| 1707 REMOTE IP ADDRESS | IP: 10.2.2.2 | IP: 10.2.2.2 | IP: 10.2.2.2 |
| 1708 LOCAL IP ADDRESS | L2: 10.2.2.5 | L2: 10.2.2.5 | L1: 10.2.1.5; L2:10.2.2.5 |

FIG. 18

| | (a) | STATE (b) | (c) |
|---|---|---|---|
| USER ID | ID1@iw.operator.com | ID1@iw.operator.com | ID1@iw.operator.com |
| USER PROFILE | UP1 | UP1 | UP1 |
| Serving RNC | R1 | R1 | R1 |
| WIRELESS LAN MAC | 00:0E:36:4C:9E:38 | 00:0E:36:4C:9E:38 | 00:0E:36:4C:9E:38 |
| Active Set | NONE | L2 | NONE |
| SEMI-ACTIVE SET | NONE | NONE | L2 |
| REMOTE IP ADDRESS | IP: 10.2.2.2 | IP: 10.2.2.2 | IP: 10.2.2.2 |
| LOCAL IP ADDRESS | IP: 10.2.1.5 | IP: 10.2.1.5 | IP: 10.2.1.5 |
| PDG TRANSPORT | IP: 10.1.1.1 Port: 10001 | IP: 10.1.1.1 Port: 10001 | IP: 10.1.1.1 Port: 10001 |
| WLAN TRANSPORT | IP: 10.2.1.1 Port: 10001 | IP: 10.2.1.1 Port: 10001 | IP: 10.2.1.1 Port: 10001 |

1801 USER ID
1802 USER PROFILE
1803 Serving RNC
1804 WIRELESS LAN MAC
1805 Active Set
1806 SEMI-ACTIVE SET
1807 REMOTE IP ADDRESS
1808 LOCAL IP ADDRESS
1809 PDG TRANSPORT
1810 WLAN TRANSPORT

FIG. 21

| | STATE | | |
|---|---|---|---|
| | (a) | (b) | (c) |
| IMSI — 2101 | ID1 | ID1 | ID1 |
| USER ID — 2102 | ID1@iw.operator.com | ID1@iw.operator.com | ID1@iw.operator.com |
| LOCAL IP ADDRESS — 2103 | 10.2.1.5 | 10.2.1.5 | 10.2.1.5 |
| WAG — 2104 | 10.1.1.2 | 10.1.1.2 | 10.1.1.2 |

PRIOR ART

PRIOR ART

RADIO NETWORK CONTROLLER, WIRELESS ACCESS GATEWAY, RADIO COMMUNICATION SYSTEM, AND COMMUNICATION METHOD FOR RADIO COMMUNICATION SYSTEM

BACKGROUND OF THE INVENTION

1. Technical Field

The present invention relates to a handover technique for maintaining communication when moving from one network to another network of different type during the communication in an interworking system between networks of different types such as mobile communication network such as W-CDMA and a wireless LAN.

2. Background Art

Engineers are working to develop a system that allows mobile phones capable of communicating in a wide area to interwork with a public wireless LAN service which enables fast data communication in a small area to complement each other. For example, a service is being contemplated that uses a terminal capable of accessing both mobile phone network and wireless local area network (WLAN) in such a system. This service uses a mobile communication network which covers a wide area around a base station to maintain a connection while the mobile phone is moving fast whereas it uses a wireless LAN to provide broadband access while the mobile phone is moving slowly or stays in one place.

For the interworking system, the 3GPP (3rd Generation Partnership Project) has standardized an architecture that implements a scenario in which a mobile terminal accesses the packet service of a mobile communication network through a WLAN. TS (Technical Specification) 22.234 of the 3GPP describes the requirements of such systems, TS 23.234 describes the architecture, and TS 33.234 describes the authentication method. Japanese Patent Application Laid-Open No. 2000-349829 describes a method in which handover of a packet call is performed between mobile phone networks by using a home agent 2613. The following is a description of an exemplary handover processing method performed when a mobile terminal that has access to both of a mobile communication network and a wireless LAN moves from a coverage area of the mobile communication to the wireless LAN while the terminal is performing packet access.

FIG. 26 shows a block diagram of an interworking system built in accordance with a conventional art. A mobile terminal 2601 in FIG. 26 has packet access means for both of a mobile communication network and a wireless LAN. The terminal 2601 represents UE (User Equipment) in the 3GPP specifications. A first base station 2602a and a second base station 2602b mutually convert a radio signal sent from the terminal 2601 to a wired signal and transfers the signal. The base stations represent Node B in the 3GPP specifications. The first base station 2602a covers cell M1 and the second base station 2602b covers cell M2.

A first WLAN access network 2603a and the second WLAN access network 2603b are packet-switched networks using a protocol such as IP (Internet Protocol) and include access points that provides connection to the mobile terminal 2601. The first WLAN access network 2603a covers cell L1 and the second WLAN access network 2603b covers cell L2. Both networks are correctively referred to as the WLAN access network 2603. The WLAN network 2603 converts a radio signal on a wireless LAN to a packet signal for a wired network. On the WLAN access network 2603, a DNS server performs address assignment. The WLAN access network 2603 represents WLAN AN (Access Network) in the 3GPP specifications.

A radio network controller 2604 is connected to base stations 2602 (also referred to as the first base station 2602a and the second base station 2602b) through IP and performs wireless terminal control and transfers control data and user data. The radio network controller 2604 is RNC (Radio Network Controller) in the 3GPP specifications. Advantageous effects of the present invention can be achieved in ATM connection with base stations 2602 as well.

A first WLAN gateway 2605a and a second WLAN gateway 2605b are connected with the first WLAN access network 2603a and the second WLAN access network 2603b, respectively, and transmit control data and user data for a wireless LAN to and from their respective WLAN access networks 2603. The first WLAN gateway 2605a and the second WLAN gateway 2605b represent WAG (Wireless Access Gateway) in the 3GPP specifications. Both are collectively called the WLAN gateway 2605. The WLAN gateways represent the wireless network controller in the attached claims.

A packet controller 2606 is connected to the radio network controller 2604, controls packet transmission within the mobile communication network and manages the status of mobile terminals 2601 that relates to packet transmission. It is assumed here that the packet controller 2606 uses IP to connect to the radio network controller 2604. The packet controller 2606 represents SGSN (Serving GPRS Support Node) in the 3GPP specifications.

A mobile network packet gateway 2607 is connected with the WLAN access networks 2603 through IP and relays packet data from the mobile communication network to the Internet. The mobile network packet gateway 2607 represents GGSN (Gateway GPRS Support Node) in the 3GPP specifications. One mobile network packet gateway 2607 is provided for each APN (Access Point Name) that is a domain of the mobile terminal 2601.

A packet data gateway 2608 is connected with the mobile network packet gateway 2607 and the WLAN gateways 2605 and relays data from these gateways to a public packet-switched network 2612. Like the mobile packet gateway 2607, the packet data gateway 2608 supports APN. It is assumed here that one packet data gateway 2608 is connected with multiple WLAN gateways 2605.

An authentication gateway 2609 is connected to the WLAN gateways 2605 and receives authentication data from the mobile terminal 2601 through the WLAN gateway 2605 when the mobile terminal 2601 enters the area covered by the wireless LAN. The authentication gateway 2609 represents AAA Proxy in the 3GPP specifications.

An authentication server 2610 is connected to the authentication gateway 2609 and receives authentication data from the mobile terminal 2601 through the authentication gateway 2609. The authentication server 2610 represents AAA Server in the 3GPP specifications.

A user information storing section 2611 is connected with the packet controller 2606, the mobile network packet gateway 2607, and the authentication server 2610 and stores information about services provided by the operator of the mobile communication network or wireless LAN to a user under a contract between the operator and the user. The public packet-switched network 2612 is a network made available to the public. The Internet is one of the public packet-switched network 2612.

A home agent 2613 relays data transmission from the mobile terminal 2601 and redirects data transmission in accordance with the location to which the mobile terminal 2601 moves. The home agent 2613 also manages the location of the mobile terminal 2601 by using mobile IP and registers the positioning of the mobile terminal 2601. A correspondent node 2614 is a node with which the mobile terminal 2601 performs packet communication. Examples of the correspondent node 2614 include servers on the Internet.

The mobile communication network and the wireless LAN that interwork with each other in the system will be defined as follows. The term "mobile communication network" refers to a network including mobile network packet gateways 2607, packet controllers 2606, radio network controllers 2604, and base stations 2602. The term "wireless LAN" refers to a network consisting of packet data gateways 2608, WLAN gateways 2605, and WLAN access networks 2603.

FIG. 27 shows components of a wireless LAN and stacks of protocols handled by the components. The mobile terminal 2601 has a remote IP layer 2701 for communicating with a correspondent node 2614 and a transport IP layer 2703 for performing IP communication over an access network of the wireless LAN. Different IP addresses for these layers are assigned to the terminal 2601, which are called the remote IP address and the local IP address.

Packets in the remote IP layer 2701 are relayed by the packet data gateway 2608 that is the entrance to the public packet-switched network 2612. A tunnel 2702 is provided between the mobile terminal 2601 and the packet data gateway 2608 through which packets at the remote IP layer 2701 are transmitted. The functions of the tunnel include the function of encapsulating packets, the function of compressing the header or payload of packets, and an encryption function. The terminal 2601 and the packet data gateway 2608 hold information about settings of the functions such as encapsulation, compression, and encryption schemes and connection setup information such as an access point name and a telephone number for each tunnel.

The transport IP layer 2703 is terminated at each node. Packets from the mobile terminal 2601 are terminated at a WLAN access network 2603. L1 (physical layer) and L2 (data link layer) are not particularly specified in this example.

The following is a description of a method for switching to communication over a wireless LAN when a terminal 2601 enters an area covered by the wireless LAN while communicating with a correspondent node 2614 over a mobile communication network in the system described above.

The mobile terminal 2601 performs IP packet communication as follows. First, user IP packets travel from the mobile terminal 2601 to the correspondent node 2614 via nodes of the mobile communication network and a home agent 2613. A remote IP address of user terminal is assigned by a mobile network packet gateway 2607 that routes remote IP addresses. The home agent 2613 manages a set of a home IP address, which is an address on the home network of the mobile terminal 2601, and a care-of address, which is an address of the mobile terminal 2601 that is used in the network to which the current position of the mobile terminal 2601 belongs (visited network). The home agent 2613 encapsulates the home IP address of the mobile terminal 2601 that is output from the correspondent node 2601, and transfers it to the care-of address.

IP packets from the mobile terminal 2601 are encapsulated and transferred, like packets transmitted in the reverse direction. If the correspondent node 2614 supports a Binding Update procedure, the procedure may be used to directly transmit IP packets to the mobile terminal 2601 and the correspondent node 2614, instead of using encapsulation.

On the mobile communication network, an IP tunnel is provided for each link between nodes and IP packets are encapsulated and then transferred. GTP (GPRS Tunneling Protocol) is used in communication between the mobile network packet gateway 2607 and the packet transmission controller 2606 and communication between the packet transmission controller 2606 and the radio network controller 2604.

The radio network controller 2604 converts IP packets to logical channel packets or transport channel packets as appropriate and then transferred to a base station 2602a by using IP transport. The base station 2602a converts them to W-CDMA physical channel packets and communicates with the terminal 2601.

When the mobile terminal 2601 enters an area covered by a wireless LAN while performing packet communication, the following process is performed. First, when the mobile terminal 2601 enters the wireless LAN area at 2801 in FIG. 28, the mobile terminal 2601 detects the radio field of the wireless LAN. It is assumed here that the wireless LAN is compliant with IEEE 802.11a/b/g. In the local connection process 2802, the first WLAN access network 2603a assigns a local IP address to the mobile terminal 2601.

Then, in the authentication process 2803, the terminal 2601 requests the user information storing section 2611 to authenticates the mobile terminal 2601 for making packet access through the WLAN. In the authentication, EAP (PPP Extensible Authentication Protocol) used by a first WLAN gateway 2605a, an authentication gateway 2609 (not shown in FIG. 28), and an authentication server 2610. If the authentication server 2610 does not have information about the user required for authentication, the authentication server 2610 obtains the information from the user information storing section 2611.

After completion of the authentication 2803, the mobile terminal 2601 queries DNS in the wireless LAN IP address acquisition process 2804. In response to this, the first WLAN access network 2603a returns a set of remote IP addresses and FQDNs of all networks that the mobile terminal can use and packet data gateways 2608 associated with them.

At a tunnel creation request 2805, the mobile terminal 2601 selects a packet data gateway 2608 from the IP addresses obtained in the IP address acquisition process 2804 and provides a request for creation of an IP tunnel using the set of remote IP addresses and FQDN to the packet data gateway 2608. In the authentication completion confirming process 2806, the packet data gateway 2608 communicates the authentication server 2610 via the authentication gateway 2609 to check to determine that the mobile terminal has been authenticated.

Then, in the policy exchange 2807, the packet data gateway 2608 and the first WLAN gateway 2603a exchange a packet transmission policy. The policy to use is determined by the packet data gateway 2608 and the first WLAN gateway 2603a applies the transmission policy provided from the packet data gateway 2608.

After the policy exchange, in the tunnel creation process 2808, the mobile terminal 2601 and the packet data gateway 2608 exchange tunnel attributes and a tunnel is created between them. The packet data gateway 2608 assigns a remote IP address to the mobile terminal 2601, which will be used as the IP address of the mobile terminal 2601 on the public packet-switched network 2612.

After the tunnel is created, the mobile terminal 2601 registers (remote IP registration 2809) the remote IP address in the home agent 2613. After the remote IP address is registered, the home agent 2613 changes the destination of packets from the correspondent node 2614 to the new remote IP address.

After a connection 2810 on the wireless LAN is established in this way, the mobile terminal 2601 disconnects the connection with the mobile communication network.

The interworking system between a mobile communication network and a wireless LAN as described above has a problem that the system requires much time to move across networks that use different access techniques because both authentication process and connection process must use equipment of a core network.

To solve the problem, an article entitled "Seamless handoff scheme using positional information in mobile IP network", Institute of Electronics, Information and Communication Engineers technical report RCS2002-209, pp. 13-18, proposes a method for reducing switching time involved in handover. This scheme is an improved version of mobile IP, in which the GPS (Global Positioning System) is used to manage the positioning of a mobile terminal 2601 and the mobile terminal 2601 predicts the next cell to move to on the basis of the management data. Authentication and connection processes required for handover to the predicted cell are performed beforehand using a cell with which the mobile terminal can communicate at the time, thereby reducing the switching time required for the mobile terminal to move to the predicted cell. The method disclosed in the article predicts the next cell to move to by using GPS data, on the mobile terminal 2601, the IP address and position of the mobile terminal 2601, thereby simplifying connection setup.

Japanese Patent Application Laid-Open No. 2004-254278 discloses a method in which handover is performed when a mobile terminal moves between a UMTS area and a WLAN area in a system in which a WLAN access point is connected to a UMTS (Universal Mobile Telecommunications System), which is a type of W-CDMA.

In the method disclosed in Japanese Patent Application Laid-Open No. 2004-254278, a wireless LAN AP 2903, which is an access point of a wireless LAN, is connected with a packet controller 2906 through a WLAN IWF (Inter-Working Function) 2905, which is a functional element for interconnecting them, as shown in FIG. 29.

The wireless LAN IWF 2905 and the packet controller 2906 are interconnected through an Iu-ps interface. According to the GPRS specifications, when a packet connection is established on a mobile communication network, a primary GPRS context and a secondary GPRS context containing information concerning the packet connection are created. In the secondary GPRS context, connection information such as IP addresses and QoS are stored. The method disclosed in Japanese Patent Application Laid-Open No. 2004-254278 activates the secondary GPRS context concerning the wireless LAN in association with an ongoing packet connection session and changes the secondary GPRS context in accordance with the area in which the mobile terminal 2901 is located, thereby enabling the mobile terminal 2901 to switch between the mobile communication network and the wireless LAN.

For example, when a mobile terminal 2901 that has already established packet connection with a mobile communication network in cell M1 enters cell L1 that is an area of a wireless LAN, the following process is performed. The mobile terminal 2901 first starts establishing connection to a wireless LAN AP 2903. The mobile terminal then attempts to obtain an IP address on the wireless LAN. However, the mobile terminal 2901 cannot obtain a new IP address because the mobile terminal 2901 has a connection that has already established over the mobile communication network. Therefore, the mobile terminal 2901 uses the IP address it already has. It should be noted that QoS can be changed. Thus, parameters are set and a secondary GPRS context for the wireless LAN is added to a mobile communication packet gateway in addition to the secondary GPRS context for the mobile communication network that is already used. In this way, a secondary GPRS context containing QoS and other information, which vary from network to network, is created for each terminal and an appropriate secondary GPRS context is used for the area in which the terminal 2901 is located to accomplish handover.

SUMMARY OF THE INVENTION

However, the methods described above requires an extra switching time because reconfiguration is required in communications in both layers 2 and 3 in the period between authentication 2803 and tunnel creation 2808.

Furthermore, if the method using the mobile IP is used, the mobile terminal must determine whether handover can be performed and select the next cell to switch to. Mobile terminals in general cannot know the status of usage of nodes in a network. Therefore, when multiple mobile terminals perform handover in a place where multiple cells overlap one another, multiple terminals may switch to the same cell. As a result, the capacity of the access point or base station of that cell or the bandwidth of the network can be exceeded, or congestion, or in the worst case, lost calls can occur.

In a 3GPP mobile communication network, an IP address is assigned to a mobile terminal when it accesses a mobile network packet gateway 2607. When the mobile terminal moves from one cell to another, typically the IP address is not changed. Therefore, the method based on mobile IP that manages mobility by IP routing is difficult to apply.

The method disclosed in Japanese Patent Application No. 2004-254278 has the following two problems.

A first problem is that the positions of mobile terminals are not managed on cell level since movements of mobile terminals are managed on RNC level. For example, to reduce switching time involved in handover in the system disclosed in Japanese Patent Application No. 2004-254278, the method described in the technical report of the Institute of Electronics, Information and Communication Engineers may be applied to the method described in Japanese Patent Laid-Open No. 2000-349829. However, in order to predict a mobile terminal for which a connection setup process is to be performed before movement as described in the technical report of the Institute of Electronics, Information and Communication Engineers, the radio field strengths, radio communication conditions, positions, directions and speeds of movement of all mobile terminals contained in mobile communication network areas M1 adjacent to a WLAN area L1 must be obtained. However, a packet controller 2906 in W-CDMA identifies the positions of mobile terminals 2901 in each RA (Routing Area) consisting of multiple cells, all cells included in the same RA that includes cell M1 are adjacent to cell L1. Therefore, the possibilities that mobile terminals, including those that are irrelevant to prediction of a terminal that will enter cell L1, will be determined and accordingly the amount of computation will be enormous.

A second problem is that, since the packet controller 2906 provides connection in the mobile communication network, the Iu-ps protocol (protocol between SGSN and RNC in packet communication) must be used for the connection. In particular, Iu-ps consists of C-plane which performs control and U-plane which performs transmission of user data, and GTP (GPRS Tunneling Protocol) is used in U-plane. Therefore, a new protocol must be designed for implementing the interface.

In light of these problems, the present invention implements, in packet transmission such as IP packet transmission, seamless handover in packet communication between a mobile phone network (mobile communication network) and a wireless LAN performed by a terminal that supports multiple wireless communication technologies such as mobile communication and a wireless LAN by using the mechanism of layer 2 of the mobile communication network and wireless LAN which is a low-level layer to predict movement of a terminal, performing authentication and connection setup processes for the terminal in a predicted wireless LAN, and transmitting the connection information generated by the processes to the terminal through the mobile communication network.

To solve the problems with the conventional art described above, a radio network controller according to the present invention has a configuration in which connection information required for a mobile terminal capable of communicating with a mobile communication network and a wireless LAN (Local Area Network) to communicate over the wireless LAN among pieces of information input from a WLAN gateway that controls connections of one or more wireless LAN access networks is output to the terminal, thereby achieving seamless handover of packet communication between the mobile communication network and the wireless LAN.

In an aspect of the present invention, there is provided a wireless access gateway (WAG) connected to a terminal capable of communicating with a mobile communication network and a wireless local network, a radio network controller that performs wireless control of one or a plurality of base stations that perform wireless communication, and a WLAN access network capable of connecting to one or a plurality of the terminals through a wireless local area network, the wireless access gateway comprising: a WAG connection setup unit which performs at least one of an authentication process and a connection setup process relating to the terminal in accordance with a WLAN pre-configuration request from the radio network controller, and generates, by the authentication process or the connection setup process, a context required for the terminal to communicate through the wireless local area network and outputs the context to the radio network controller.

In another aspect of the present invention there is provided a radio communication system that enables interworking between a mobile communication network and a wireless local area network, comprising: a terminal capable of communicating with the mobile communication network and the wireless local area network; a base station which wirelessly communicates with the terminal through the mobile communication network; a radio network controller which is connected to one or a plurality of the base stations and controls wireless connection of the terminal; a WLAN access network which wirelessly connects to the terminal through the wireless local area network; a wireless access gateway which is connected to the radio network controller and one or a plurality of the WLAN access networks and controls connection of the WLAN access network; and a packet data gateway which is connected to the wireless access gateway and relays data from the wireless access gateway to a public packet-switched network; wherein the radio network controller selects one of the WLAN access networks which the radio network controller predicts the terminal is likely to connect to, and outputs an authentication process request signal and a connection setup process request signal to the wireless access gateway that controls the selected WLAN access network; the wireless access gateway performs an authentication process for determining whether the terminal is permitted to use the selected WLAN access network and, if permitted, performs a process for setting up connection within the wireless local area network and outputs to the radio network controller a context required for the terminal to communicate on the wireless local are network, wherein the process for setting up connection being required for the terminal to use the WLAN access network; and the radio network controller outputs the context to the terminal.

In the radio communication system In another aspect of the present invention, when the terminal to which the context has been input from the radio network controller enters an area covered by the WLAN access network, the wireless access gateway may use the context to establish connection with the terminal.

In the radio communication system In another aspect of the present invention, the radio network controller may obtain network status information including the capacity, usage, or error information of one or a plurality of the base station and one or a plurality of the WLAN access network; and when the terminal resides in a position where the terminal is capable of communicating with a plurality of the base stations or the WLAN access networks at the same time, the terminal may select, on the basis of the network status information, one of the base stations and the WLAN access networks to communicate with.

In the radio communication system In another aspect of the present invention, when the terminal enters the WLAN access network, the wireless access gateway may send a packet reception relay notification notifying the packet data gateway that the terminal is capable of receiving packets through the wireless local area network; and when the packet reception relay notification is input in the packet data gateway, the packet data gateway may output data input from the public packet-switched network to the wireless access gateway.

In the radio communication system In another aspect of the present invention, the terminal and the radio network controller may hold active cell set which is a set of identifies of the base station or the WLAN access network with which the terminal is communicating and predicted cell set which is a set of identifiers of the base station or the WLAN access network to which the terminal is predicted to connect; and when the terminal communicates with the base station and the WLAN access network at the same time and an error rate in communication with the WLAN access network is less than or equal to a predetermined value, the radio network controller may transfer the identifiers of the base station included in the active cell set to the predicted cell set, may notify the wireless access gateway of the transfer of the identifiers, and may output to the terminal an update request signal that causes the terminal to update the active cell set and the predicted cell set.

In the radio communication system In another aspect of the present invention, when the radio communication system detects disconnection of connection between the terminal and the wireless access gateway, the radio communication system may transfer the identifies of the WLAN access network included in the active cell set to the predicted cell set, may notify the wireless access gateway of the transfer of the identifiers, and may output to the terminal an update request signal that causes the terminal to update the active cell set and the predicted cell set.

In the radio communication system In another aspect of the present invention, the radio communication system may transfer the identifiers of the WLAN access network included in the active cell set to the predicted cell set; and when the identifiers of the base station or the WLAN access network are no longer included in the active cell set, may notify the wireless access gateway that the communication of the terminal has been disconnected and the wireless access gateway deletes the context concerning the terminal.

In another aspect of the present invention, the radio communication system may further comprise a packet controller connected to the radio network controller for controlling calls in packet communication performed through the mobile communication network, wherein, when connection between the packet controller and the radio network controller that relates to the terminal is disconnected, the radio network controller may delete the identifiers of the base station connected to the radio network controller from the active cell set and the predicted cell information, may output a delete request signal to the wireless access gateway whose identifier is contained in the predicted cell set to cause the wireless access gateway to delete the context, and may output to the terminal an update request signal to cause the terminal to update the active cell set and the predicted cell set when the identifiers are not longer included in the active cell set.

In another aspect of the present invention, there is provided a communication method for a radio communication system which enables interworking between a mobile communication network and a wireless local area network and comprises: a terminal capable of communicating with a mobile communication network and a wireless local area network; a base station which wirelessly communicates with the terminal through the mobile communication network; a radio network controller which is connected to one or a plurality of the base stations and controls wireless connection of the terminal; a WLAN access network wirelessly connecting to the terminal through the wireless local area network; a wireless access gateway which is connected to the radio network controller and one or a plurality of the WLAN access networks and controls connection of the WLAN access network; and a packet data gateway which is connected to the wireless access gateway and relays data from the wireless access gateway to a public packet-switched network; wherein the communication method comprising the steps of: when the terminal is included in a cell controlled by the base station, selecting one of the WLAN access networks to which the terminal is predicted to connect and outputting an authentication process request signal for the terminal and a connection setup process request signal to the radio network controller through the base station; the wireless access gateway; and outputting by the radio network controller a context to the terminal to cause the terminal to establish connection with the selected WLAN access network.

In another aspect of the present invention, there is provided a mobile communication network controller, comprising; a communication control section which controls communication with a mobile terminal performed through a mobile communication network; a positional information acquisition section which acquires positional information of the mobile terminal; a next-location predicting section which predicts, on the basis of the positional information, a wireless network which interworks with a mobile communication network to which the mobile terminal will move; and a context transmitting section which transmits a context for connecting the mobile terminal to the wireless network to a wireless network controller which controls communication with the mobile terminal on the wireless network predicted by the next-location predicting section.

In another aspect of the present invention, the mobile communication controller may further comprise a wireless network information transmitting section which transmits information about the wireless network to the mobile terminal through the mobile communication network when the mobile communication network controller receives a response indicating completion of preparation for connection between the wireless network and the mobile terminal sent from the wireless network controller in response to the context transmitted by the context transmitting section.

In another aspect of the present invention, there is provided a wireless network controller, comprising: a radio control section which controls communication with a mobile terminal performed through a wireless network; a context receiving section which receives a context for the mobile terminal to connect to a wireless network controlled by the wireless network controller sent from a mobile communication network controller, wherein the mobile communication network controller controls communication with the mobile terminal performed through a mobile communication network which interworks the wireless network; a tunnel setup section which, in response to reception of a context at the context receiving section, sets up a tunnel for the mobile terminal between the wireless network and a gateway which relays packet communication between the wireless network and a public packet-switched network; and a response transmitting section which transmits a response to the mobile communication network controller indicating completion of preparation for connection upon completion of the tunnel setup by the tunnel setup section.

In another aspect of the present invention, the wireless network controller may further comprise an authentication section which, in response to reception of a context at the context receiving section, authenticates whether the mobile terminal is registered as a terminal connected to the mobile communication network; wherein the response transmitting section may transmit a response if the authentication section successfully authenticates the mobile terminal.

In another aspect of the present invention, the wireless network controller may further comprise: a determination section which, when a mobile terminal is detected within the wireless network, determines whether a tunnel is set for the mobile terminal between the wireless network controller and the gateway; and a packet reception relay notification transmitting section which transmits a packet reception relay notification indicating that packets can be received to the gateway in response to determination by the determination section that a tunnel for the mobile terminal is set.

In another aspect of the present invention, there is provided a radio communication system comprising a mobile communication network controller which controls communication with a mobile terminal performed through a mobile communication network and a wireless network controller which controls communication with a mobile terminal performed through a wireless network that interworks with the mobile communication network, wherein, the mobile communication network controller comprises: a positional information acquiring section which acquires positional information of the mobile terminal; a next-location predicting section which predicts a wireless network to which the mobile terminal will move, on the basis of the positional information; and a context transmitting section which transmits a context for connecting the mobile terminal to the wireless network to a wireless network controller of the wireless network predicted by the next-location predicting section; the wireless network controller comprises: a context receiving section which receives the context sent from the mobile communication network controller a tunnel setup section which sets up a tunnel for the mobile terminal between the wireless network controller and a gateway in response to reception of a context at the context receiving section, wherein the gateway relays packet communication between the wireless network and a public packet-switched network.

In another aspect of the present invention, there is provided a communication method for a radio communication system which comprises a mobile communication network controller which controls communication with a mobile terminal performed through a mobile communication network and a wireless network controller which controls communication with the mobile terminal performed over a wireless network that interworks with the mobile communication network, the communication method comprising the steps of: obtaining positional information of the mobile terminal at the mobile communication network controller; predicting, on the basis of the positional information, a wireless network to which the mobile terminal will move; transmitting a context for connecting the mobile terminal to the wireless network to the wireless network controller of the wireless network predicted at the step of predicting a wireless network; receiving at the wireless network controller the context sent from the mobile communication network controller; and in response to reception of the context at the step of receiving the context, setting up a tunnel for the mobile terminal between the wireless network controller and a gateway, wherein the gateway relays packet communication between the wireless network and a public packet-switched network.

In another aspect of the present invention, there is provided a wireless network controller which controls communication with a mobile terminal performed through a wireless network, comprising: an address information storing section which stores address information of a mobile communication network controller of a mobile communication network that interworks with the wireless network; a connection request receiving section which receives a connection request for connecting to the wireless network sent from the mobile terminal; and radio controller which, in response to reception of the connection request at the connection request receiving section, connects the mobile terminal to the wireless network and notifies the address information of the mobile communication network controller stored in the address information storing section to the mobile terminal.

In the wireless network controller In another aspect of the present invention, the wireless network controller may transfer packets directed to the mobile communication network controller sent from the mobile terminal to the mobile communication network controller.

In another aspect of the present invention, there is provided a radio communication system comprising a mobile communication network controller which controls communication with a mobile terminal performed through a mobile communication network and a wireless network controller which controls communication with the mobile terminal performed through a wireless network that interworks with the mobile communication network, wherein: the wireless network controller comprises: an address information storing section which stores address information of a mobile communication network controller of a mobile communication network that interworks with the wireless network; a connection request receiving section which receives a connection request for connecting to the wireless network sent from the mobile terminal; and radio controller which, in response to reception of the connection request at the connection request receiving section, connects the mobile terminal to the wireless network and notifies the address information of the mobile communication network controller stored in the address information storing section to the mobile terminal.

In the radio communication system In another aspect of the present invention, the mobile terminal may use the address information of the mobile communication network controller notified from the wireless network controller to send a registration request for registering the mobile terminal with the mobile communication network to the mobile communication network controller through the wireless network controller.

In the radio communication system In another aspect of the present invention, the mobile communication network controller may comprise: a determining section which, when the mobile terminal is detected within the mobile communication network, determines whether the detected mobile terminal is registered with the mobile communication network; and a packet reception relay notification transmitting section which transmits a packet relay notification indicating that packets can be received to a gateway in response to determination that the detected mobile terminal is registered with the mobile communication network, wherein the gateway relays packet communication between the mobile communication network controller and a public packet-switched network.

In another aspect of the present invention, there is provided a communication method for a radio communication system which comprises a mobile communication network controller which controls communication with a mobile terminal performed through a mobile communication network and a wireless network controller which controls communication with a mobile terminal performed through a wireless network that interworks with the mobile communication network, the communication method comprising the steps of: receiving a connection request for connecting to the wireless network sent from the mobile terminal; connecting the mobile terminal to the wireless network in response to reception of the connection request received at the step of receiving a connection request; and reading address information from an address information storing section and notifying the read address information to the mobile terminal by the wireless network controller, wherein the address information storing section stores address information of the mobile communication network controller of the mobile communication network that interworks with the wireless network.

The radio network controller according to the present invention enables a terminal to establish connection and perform communication quickly after the terminal enters an area covered by a wireless local area network.

Furthermore, the present invention makes it possible that a cell is selected using the network status and connection is established to perform communication quickly after a terminal enters an area covered by a wireless local area network. The present invention reduces extra traffic and enables resources of a mobile communication network to be effectively used when communication is stable. The present invention also reduces extra traffic and enables resources of the mobile communication network to be effectively used when communication with the wireless LAN is disconnected. When main communication is disconnected, resources of the mobile communication network and wireless LAN used as prediction information can be saved. After communication on the mobile communication is disconnected, the mobile communication network is disconnected from the communication on the wireless LAN, thereby enabling effective use of resources of the mobile communication network.

There are other aspects of the present invention as will be described below. The disclosure of the present invention is intended to provide some of the aspects of the present invention and is not intended to limit the scope of the present invention claimed.

BRIEF DESCRIPTION OF THE DRAWINGS

FIG. 4 shows fields of a cell position management section according to the first embodiment of the present invention;

FIG. 6 shows fields held by a mobile terminal according to the first embodiment of the present invention;

FIG. 7 shows a sequence of authentication and setup processes performed when an area to which the mobile terminal moves is predicted;

FIG. 8 shows information field held by the radio network controller according to the first embodiment of the present invention;

FIG. 9 shows information fields held by a wireless access gateway according to the first embodiment of the present invention;

FIG. 16 shows field of data held by the mobile terminal;

FIG. 17 shows fields of data held by a radio network controller;

FIG. 18 shows fields of data held by a WLAN gateway;

FIG. 21 shows field of data held by a packet data gateway;

DETAILED DESCRIPTION OF THE INVENTION

Figure 1:
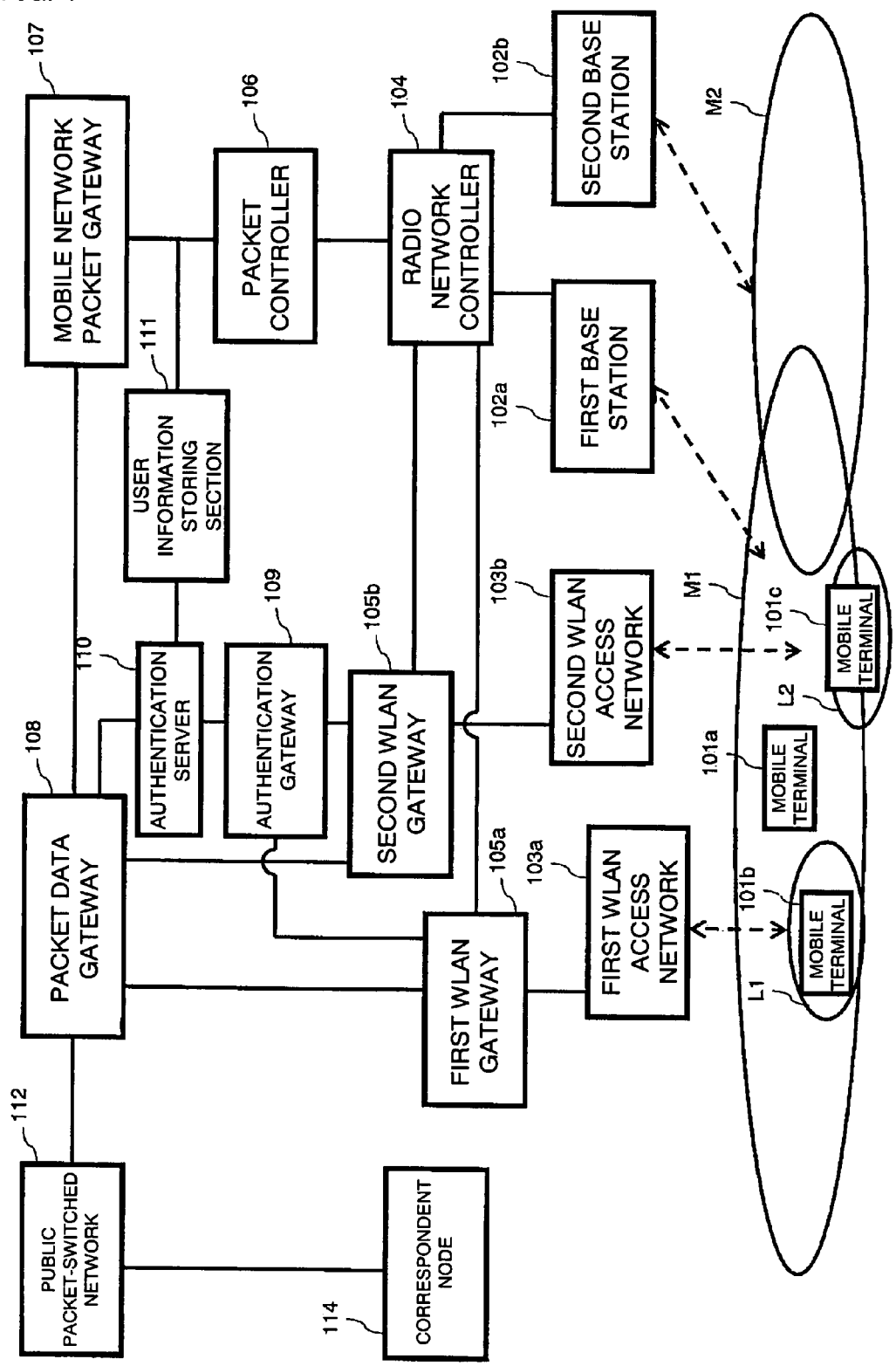
FIG. 1 shows a configuration of a radio communication system according to a first embodiment of the present invention.

The present invention will be described below in detail. The detailed description and the accompanying drawings are not intended to limit the present invention. The scope of the present invention is defined by the attached claims.

To solve the problems with the conventional art described above, a radio network controller according to the present invention has a configuration in which connection information required for a mobile terminal capable of communicating with a mobile communication network and a wireless LAN (Local Area Network) to communicate over the wireless LAN among pieces of information input from a WLAN gateway that controls connections of one or a plurality of wireless LAN access network is output to the terminal, thereby achieving seamless handover of packet communication between the mobile communication network and the wireless LAN.

A mobile communication network controller according to the present embodiment comprises: a communication control section which controls communication with a mobile terminal performed through a mobile communication network; a positional information acquisition section which acquires positional information of the mobile terminal; a next-location predicting section which predicts, on the basis of the positional information, a wireless network which interworks with a mobile communication network to which the mobile terminal will move; and a context transmitting section which transmits a context for connecting the mobile terminal to the wireless network to a wireless network controller which controls communication with the mobile terminal on the wireless network predicted by the next-location predicting section.

By thus transmitting connection information for the mobile terminal to the radio network controller of the wireless network predicted by the next-location prediction section to be a network to which the mobile terminal will move, the mobile terminal can be connected to the wireless network without transmitting connection information to the wireless network when the mobile terminal moves to the wireless network. Since the process for transmitting connection information which would otherwise be performed when the mobile terminal enters the area covered by the wireless network is omitted, the time required for establishing connection can be reduced and thus seamless handover can be achieved. It should be noted that the mobile communication network controller is for example a radio network controller (RNC) connected to a base station which wirelessly communicates with the mobile terminal. The radio network controller is for example a WLAN gateway which is connected to a WLAN access network wirelessly communicating with the mobile terminal.

The mobile communication controller according to the present embodiment may comprise a wireless network information transmitting section which transmits information about the wireless network to the mobile terminal through the mobile communication network when the mobile communication network controller receives a response indicating completion of preparation for connection between the wireless network and the mobile terminal sent from the wireless network controller in response to the context transmitted by the context transmitting section.

Since information about the wireless network is sent to a mobile terminal in response to notification of completion of connection setup from the wireless network device in this way, the mobile terminal can identify the wireless network that is ready to establish connection.

A wireless network controller according to the present embodiment comprises: a radio control section which controls communication with a mobile terminal performed through a wireless network; a context receiving section which receives a context for the mobile terminal to connect to a wireless network controlled by the wireless network controller sent from a mobile communication network controller, wherein the mobile communication network controller controls communication with the mobile terminal performed through a mobile communication network which interworks the wireless network; a tunnel setup section which, in response to reception of a context at the context receiving section, sets up a tunnel for the mobile terminal between the wireless network and a gateway which relays packet communication between the wireless network and a public packet-switched network; and a response transmitting section which transmits a response to the mobile communication network controller indicating completion of preparation for connection upon completion of the tunnel setup by the tunnel setup section.

Because a tunnel is set between the wireless network and the gateway beforehand in response to reception of connection information sent from the mobile communication network controller, the time that would otherwise be required for setting the tunnel when the mobile terminal enters the wireless network can be eliminated and consequently smooth handover can be accomplished.

The wireless network controller according the present embodiment may further comprise an authentication section which, in response to reception of a context at the context receiving section, authenticates whether the mobile terminal is registered as a terminal connected to the mobile communication network; wherein the response transmitting section transmits a response if the authentication section successfully authenticates the mobile terminal.

Because authentication of the mobile terminal is performed beforehand in response to connection information concerning the mobile terminal sent from the mobile communication network controller, the time that would otherwise be required for authenticating the mobile terminal when the mobile terminal enter the wireless network can be eliminated and consequently smooth handover can be accomplished.

The wireless network controller according to the present embodiment comprises: a determination section which, when a mobile terminal is detected within the wireless network, determines whether a tunnel is set for the mobile terminal between the wireless network controller and the gateway; and a packet reception relay notification transmitting section which transmits a packet reception relay notification indicating that packets can be received to the gateway in response to determination by the determination section that a tunnel for the mobile terminal is set.

Because the packet reception relay notification is sent to the gateway if a tunnel for a mobile terminal detected within the wireless network is set, the gateway can know that the mobile terminal can receive packets through the wireless network. Thus, the gateway can control the packets directed to the mobile terminal sent from the public packet-switched network so as to be transmitted to the wireless network controller.

A radio communication system according to the present embodiment comprises a mobile communication network controller which controls communication with a mobile terminal performed through a mobile communication network and a wireless network controller which controls communication with a mobile terminal performed through a wireless network that interworks with the mobile communication network, wherein the mobile communication network controller comprises: a positional information acquiring section which acquires positional information of the mobile terminal; a next-location predicting section which predicts a wireless network to which the mobile terminal will move, on the basis of the positional information; and a context transmitting section which transmits a context for connecting the mobile terminal to the wireless network to a wireless network controller of the wireless network predicted by the next-location predicting section; the wireless network controller comprises: a context receiving section which receives the context sent from the mobile communication network controller; a tunnel setup section which sets up a tunnel for the mobile terminal between the wireless network controller and a gateway in response to reception of a context at the context receiving section, wherein the gateway relays packet communication between the wireless network and a public packet-switched network.

With this configuration, the mobile communication network controller sends connection information of the mobile terminal held in the mobile communication network to another network controller beforehand in accordance with a predicted location to which the mobile terminal will move, and the wireless network controller sets a tunnel for the mobile terminal on the basis of the connection information received. Thus, when the mobile terminal actually enters the wireless network, the process for transmitting the connection information from the mobile terminal to the wireless network controller can be eliminated and accordingly smooth handover can be achieved.

A communication method for a radio communication system according to the present embodiment is a communication method for radio communication system which comprises a mobile communication network controller which controls communication with a mobile terminal performed through a mobile communication network and a wireless network controller which controls communication with the mobile terminal performed over a wireless network that interworks with the mobile communication network, the communication method comprising the steps of: obtaining positional information of the mobile terminal at the mobile communication network controller; predicting, on the basis of the positional information, a wireless network to which the mobile terminal will move; transmitting a context for connecting the mobile terminal to the wireless network to the wireless network controller of the wireless network predicted at the step of predicting a wireless network; receiving at the wireless network controller the context sent from the mobile communication network controller; and in response to reception of the context at the step of receiving the context, setting up a tunnel for the mobile terminal between the wireless network controller and a gateway, wherein the gateway relays packet communication between the wireless network and a public packet-switched network.

With this configuration, as with the radio communication system according to the present embodiment, the process for sending the connection information from the mobile terminal to the wireless network controller that would otherwise be performed when the mobile terminal moves from the mobile communication network to the wireless network can be eliminated and accordingly smooth handover can be achieved.

A wireless network controller which controls communication with a mobile terminal performed through a wireless network according to the present embodiment comprises: an address information storing section which stores address information of a mobile communication network controller of a mobile communication network that interworks with the wireless network; a connection request receiving section which receives a connection request for connecting to the wireless network sent from the mobile terminal; and radio controller which, in response to reception of the connection request at the connection request receiving section, connects the mobile terminal to the wireless network and notifies the address information of the mobile communication network controller stored in the address information storing section to the mobile terminal.

In this way, in response to a connection request from the mobile terminal capable of using a mobile communication network, the wireless network controller sends address information of the mobile communication network controller that interworks the wireless network that is under the control of the wireless network controller to the mobile terminal. Thus, the mobile terminal can know the address of the mobile communication network controller and can access the mobile communication network controller from the wireless network.

In the wireless network controller according to the present embodiment, the wireless network controller may transfer packets directed to the mobile communication network controller sent from the mobile terminal to the mobile communication network controller.

Because packets directed to the mobile communication network controller are transferred from the wireless network controller to the mobile communication network controller in this way, the wireless terminal can access the mobile communication network through the wireless network controller even if the mobile terminal is not in the area covered by the mobile communication network.

A radio communication system according to the present embodiment comprises a mobile communication network controller which controls communication with a mobile terminal performed through a mobile communication network and a wireless network controller which controls communication with the terminal performed through a wireless network that interworks with the mobile communication network, wherein, the wireless network controller comprises: an address information storing section which stores address information of a mobile communication network controller of a mobile communication network that interworks with the wireless network; a connection request receiving section which receives a connection request for connecting to the wireless network sent from the mobile terminal; and radio controller which, in response to reception of the connection request at the connection request receiving section, connects the mobile terminal to the wireless network and notifies the address information of the mobile communication network controller stored in the address information storing section to the mobile terminal.

Because, when a connection request is sent from the mobile terminal capable of communicating over a mobile communication network to the wireless network controller, address information of the mobile communication network controller that interworks with the wireless network is sent from the wireless network controller to the mobile terminal that has sent the connection request, the mobile terminal can know the address of the mobile communication network controller and therefore can access the mobile communication network controller from the wireless network.

In the radio communication system according to the present embodiment, the mobile terminal may use the address information of the mobile communication network controller provided from the wireless network controller to send a registration request for registering the mobile terminal with the mobile communication network to the mobile communication network controller through the wireless network controller.

With this configuration, the mobile terminal connected to the wireless network can register itself with the mobile communication network controller and, when the mobile terminal actually enters the mobile communication network, the process for registering the mobile terminal with the mobile communication network can be eliminated and smooth handover can be achieved.

A radio communication system according to the present embodiment, wherein the mobile communication network controller comprises: a determining section which, when the mobile terminal is detected within the mobile communication network, determines whether the detected mobile terminal is registered with the mobile communication network; and a packet reception relay notification transmitting section which transmits a packet relay notification indicating that packets can be received to a gateway in response to determination that the detected mobile terminal is registered with the mobile communication network, wherein the gateway relays packet communication between the mobile communication network controller and a public packet-switched network.

Because the packet reception relay notification is sent to the gateway if a mobile terminal detected in the mobile communication network has already been registered with the mobile communication network, the gateway can know that the mobile terminal can receive packets through the mobile communication network. Thus, the gateway can perform control such that packets directed to the mobile terminal sent from the public packet-switched network are sent to the mobile communication network.

A communication method for a radio communication system according to the present embodiment is a communication method for a radio communication system which comprises a mobile communication network controller which controls communication with a mobile terminal performed through a mobile communication network and a wireless network controller which controls communication with a mobile terminal performed through a wireless network that interworks with the mobile communication network, the communication method comprising the steps of: receiving a connection request for connecting to the wireless network sent from the mobile terminal; connecting the mobile terminal to the wireless network in response to the connection request received at the step of receiving a connection request; and reading address information from an address information storing section and notifying the read address information to the mobile terminal by the wireless network controller, wherein the address information storing section stores address information of the mobile communication network controller of the mobile communication network that interworks with the wireless network.

With this configuration, as with the radio communication system according to the present embodiment, the mobile terminal can know the address of the mobile communication network controller and therefore can access the mobile communication network controller from the wireless network. Any of the various configurations of the radio communication system of the present embodiment can be applied to the communication method of the present embodiment.

A radio communication system according to an embodiment of the present invention will be described with reference to the accompanying drawings. It is assumed here that a W-CDMA mobile communication network and a wireless LAN compliant with IEEE 802.11 (a/b/g) are used. However, the present invention can be applied to other mobile communication and wireless LAN schemes as well.

First Embodiment

In a first embodiment, an authentication process and connection setup process are performed before a mobile terminal performing packet communication moves from a mobile communication network to an area covered by a wireless local area network (WLAN), thereby reducing switching time.

Two specific processes are performed: in one process, a radio network controller uses the phone number (IMSI: International Mobile Subscriber Identity) of a mobile terminal to set connection information on a wireless LAN on behalf of the terminal; in the other process, the radio network controller obtains connection information required for the terminal through a wireless LAN gate way (hereinafter referred to as a "WLAN gateway") and transfers it to the terminal.

FIG. 1 shows a configuration of a radio communication system according to the first embodiment.

A public packet-switched network 112 is a packet-switched network that is open to the public. Examples of the public packet-switched network include the Internet.

A mobile terminal 101 has means for making packet access to both mobile communication network and wireless. LAN. The mobile terminal 101 represents UE (User Equipment) of the 3GPP specifications.

A first base station 102a and a second base station 102b convert a radio signal sent from the terminal 101 on the mobile communication network to a wired signal and send the signal to a radio network controller 104. The first base station 102a and the second base station 102b represent Node B in the 3GPP specifications. The first base station 102a covers cell M1 and the second base station 102b covers cell M2.

A first WLAN access network 103a and the second WLAN access network 103b are wireless LAN access networks that include wireless LAN terminals and also are packet networks using such a protocol as IP (Internet Protocol). The first WLAN access network 103a covers cell L1 and the second WLAN access network 103b covers cell L2. Both access networks are collectively referred to the WLAN access network 103. The WLAN access networks 103 include wireless LAN access points that provide connections with mobile terminals 101 and convert a radio signal on the wireless LAN to a packet signal used on a wired network. The WLAN access networks 103 function as DNS severs to assign IP addresses to mobile terminals. The WLAN access networks 103 represent WLAN AN (Access Network) in the 3GPP specifications.

The radio network controller 104 is connected to the base stations 102 using IP and performs terminal control relating to radio communications and transfers control data and user data. The radio network controller 104 represents RNC (Radio Network Controller) in the 3GPP specifications. Advantageous effects of the present invention can also be obtained by using ATM connection as the connection to the base stations 102.

A first WLAN gateway 105a and a second WLAN gateway 105b are connected to the first WLAN access network 103a and the second WLAN access network 103b, respectively, and transfer wireless LAN control data and user data to and from their respective WLAN access networks 103 connected. The first WLAN gateway 105a and the second WLAN gateway 105b represent WAG (Wireless Access Gateway) in the 3GPP specifications. Both gateways are collectively referred to as the WLAN gateway 105.

A packet controller 106 is connected to the radio network controller 104 and controls packet transmission within the mobile communication network and manages the status of terminals 101 relating to packet transmission. It is assumed here that IP is used for connection to the radio network controller 104. The packet controller 106 represents SGSN (Serving GPRS Support Node) in the 3GPP specifications.

A mobile network packet gateway 107 is connected with the WLAN access networks 103 through IP and relays packet data from the mobile communication network to the Internet. The mobile network packet gateway 107 represents GGSN (Gateway GPRS Support Node) in the 3GPP specifications. In this embodiment, one mobile network packet gateway 107 is provided for each APN (Access Point Name) which is a domain of a terminal 101.

A packet data gateway 108 is connected to the mobile network packet gateway 107 and the WLAN gateways 105 and relays data from these gateways to the public packet-switched network 112. Like the mobile network packet gateway 107, the packet data gateway 108 represents APN. It is assumed here that the packet data gateway 108 is connected to multiple WLAN gateways 105.

An authentication gateway 109 is connected to the WLAN gateways 105. When a mobile terminal 101 enters an area covered by the wireless LAN, the authentication gateway 109 receives authentication data from the mobile terminal through the WLAN gateways 105. The authentication gateway 109 represents AAA Proxy in the 3GPP specifications.

An authentication server 110 is connected with the authentication gateway 109 and receives authentication data from the terminal 101 through the authentication gateway 109. The authentication server 110 represents AAA server in the 3GPP specifications.

A user information storing section 111 is connected with the packet controller 106, the mobile network packet gateway 107, and the authentication server 110 and stores information about services provided by the operator of the mobile communication network or wireless LAN to a user under a contract between the operator and the user. The public packet-switched network 112 is a network made available to the public. The Internet is one of the public packet-switched network 112.

A correspondent node 114 is a node with which the terminal 101 performs packet communication. Examples of the correspondent node 114 include servers provided on the Internet.

The mobile communication network and the wireless LAN that interwork with each other in the system will be defined as follows. The term "mobile communication network" refers to a network including mobile network packet gateways 107, packet controllers 106, radio network controllers 104, and base stations 102. The term "wireless LAN" refers to a network consisting of packet data gateways 108, WLAN gateways 105, and WLAN access networks 103.

The mobile terminal 101b is the mobile terminal 101a that has moved into cell L1. When the terminals 101a and 101b are generally referred to in the following description, they are denoted as the terminal 101.

According to the present embodiment, the mobile network packet gateway 107 and the packet data gateway 108 are interconnected. In place of a home agent, the packet data gateway 108 performs routing to and from the packet networks. The radio network controller 104 is connected with the WLAN gateways 105 and communicates authentication information and control information with each other. These are differences of the present embodiment of the invention from the conventional art.

Figure 2:
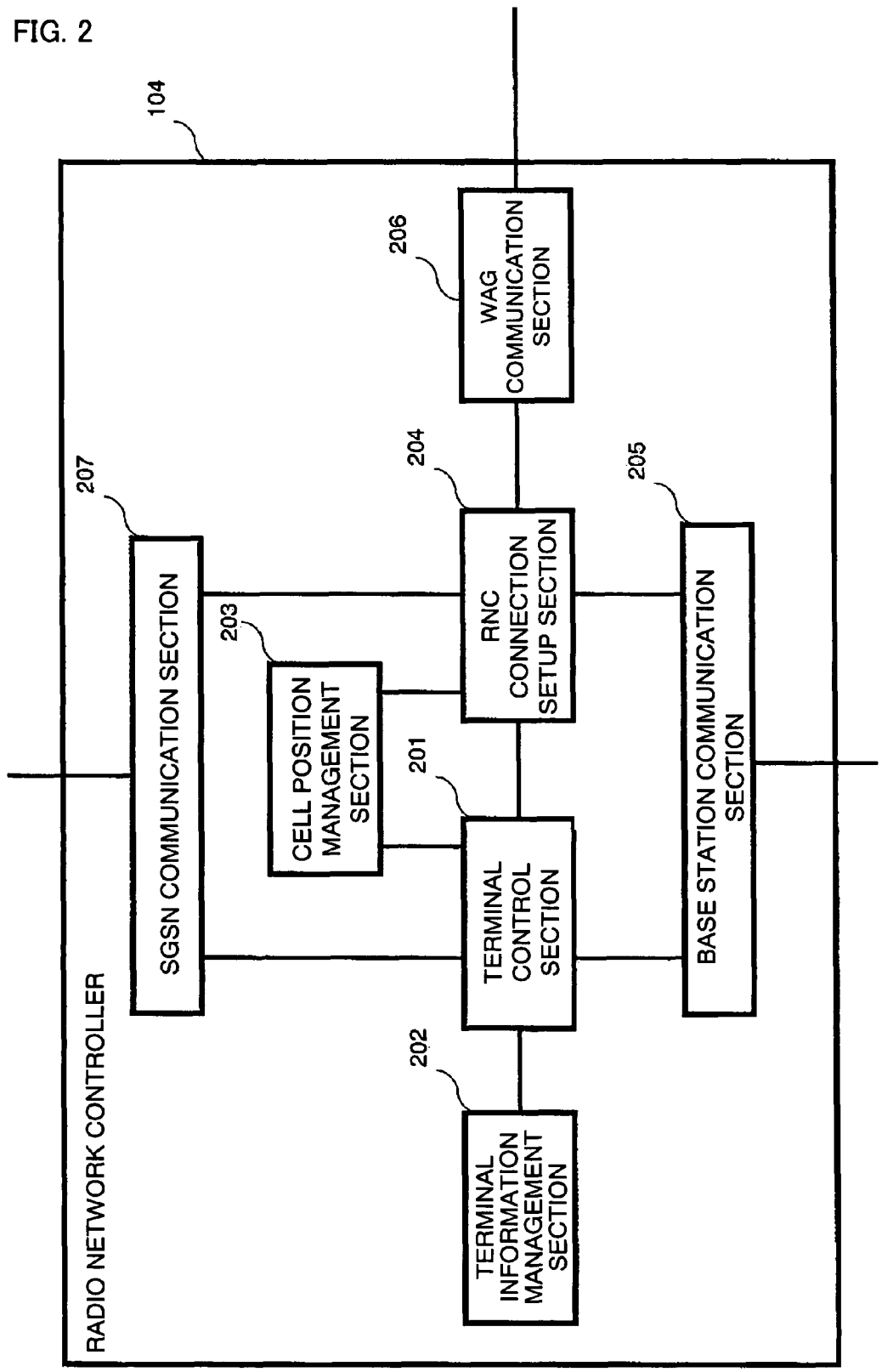
FIG. 2 shows a configuration of a radio network controller according to the first embodiment of the present invention.

FIG. 2 shows a configuration of the radio network controller 104 according to the first embodiment. A terminal control section 201 has the function of managing and controlling the wireless communication status of a mobile terminal 101 such as RRC in TS25.331 in FIG. 2. A terminal information management section 202 has the function of maintaining and managing the status of wireless communication of RRC in 25.331 or mobile terminals which reside in a cell controlled by the radio network controller 104 or an area covered by the WLAN access networks 103. The terminal controller 201 represents a "positional information acquisition section" and a "next-location predicting section" described in the attached claims.

A cell position management section 203 manages information used for controlling communication performed by the terminal 101 such as the states of devices on a network other than terminal 101, and state of the network. Specific information managed by the cell position management section 203 includes the positions, transmission capacities, bandwidths, outputs, and coverage radii of the WLAN access networks 103 and base stations 102.

An RNC connection setup section 204 performs setup of data transmission channels between the packet controller 106, base station 102, and WLAN gateways 105. The RNC connection setup section 204 controls connections using RANAP, NBAP or the like in the 3GPP specifications. A base station communication section 205 is means for communicating with a base station 102. The base station communication section 205 includes transport protocol, control plane, and user plane transmission processes within UTRN. The base station communication section 205 represents a "communication control section" in the attached claims.

A WAG communication section 206 communicates authentication and control information to and from the WLAN gateways 105. An SGSN communication section 207 is means for encapsulating user IP packets and transmitting them to the packet controller 106. It is assumed in the present embodiment that IP protocol and GTP are used.

Figure 3:
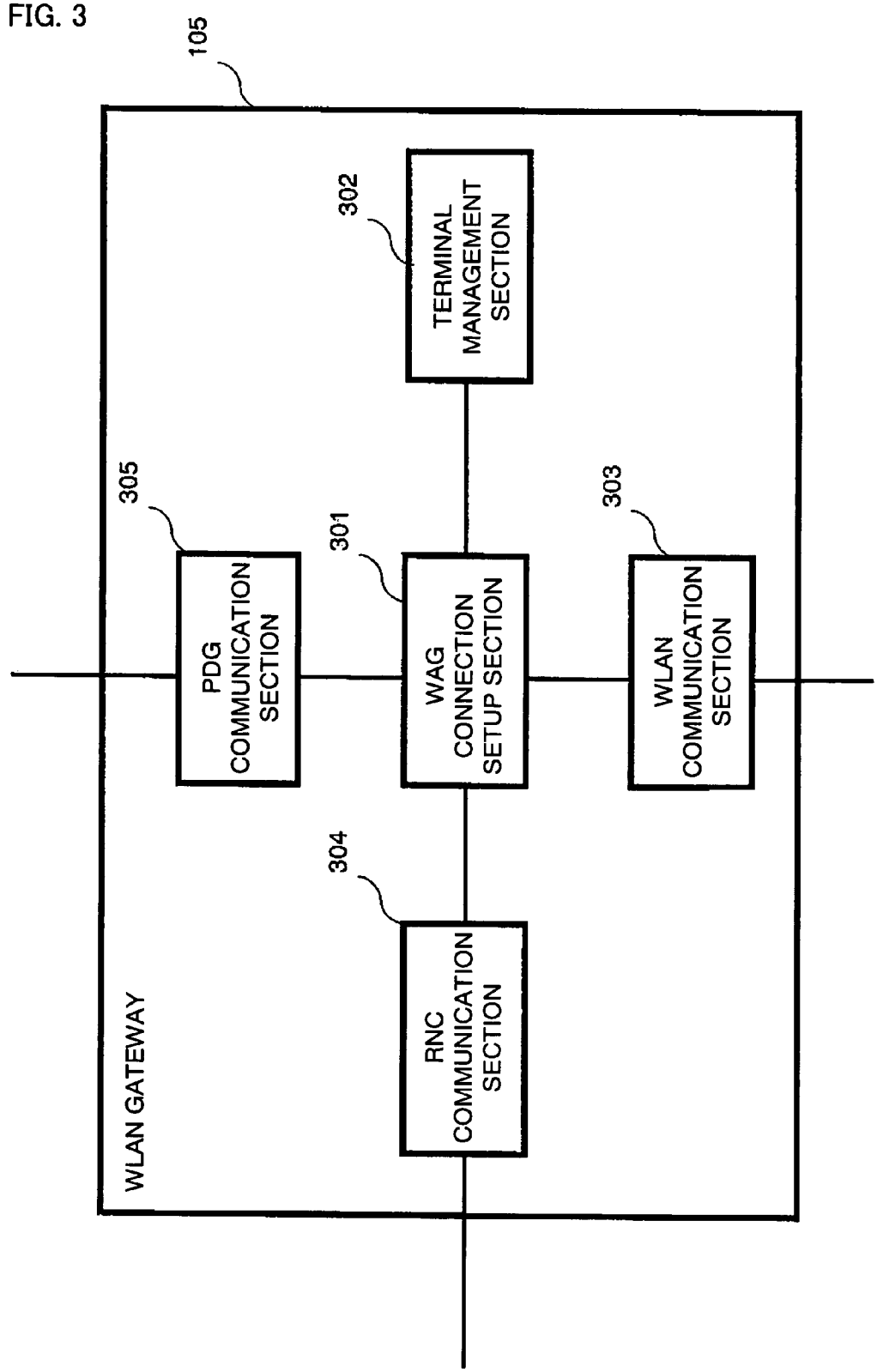
FIG. 3 shows a configuration of a WLAN gateway according to the first embodiment of the present invention.

FIG. 3 shows a configuration of the WLAN gateway 105 according to the first embodiment. A WAG connection setup section 301 in the WLAN gateway 105 sets up connection between a mobile terminal 101 on a wireless LAN covered by the WLAN gateway 105 and the packet data gateway 108. A terminal management section 302 manages all terminals 101 in the area covered by the wireless LAN accommodated by the WLAN gateway 105. A WLAN communication section 303 communicates with a WLAN access network 103 through IP. The WAG connection setup section 301 represents an "authentication section", "determining section", and "packet reception relay notifying section" in the attached claims.

An RNC communication section 304 communicates with the radio network controller 104 through IP. A PDG communication section 305 communicates with the packet data gateway 108 through IP. The wireless LAN controller 105 communicates with the authentication gateway 109 through a conventional processing section, not shown.

Operation of the radio communication system according to the first embodiment will be described below. Initial setting will be described first. Data about users on the mobile communication network and the wireless LAN is stored in the user information storing section 111. The data about the user may be a user profile, for example. In addition to a terminal ID described in TS23.234 and telephone number compliant with E.164, information can be specified such as information about whether inter-working or tunneling is possible, the maximum session time, an accounting method (prepayment or payment on credit, or both), the ID or address of an account server, a list of authorized W-APNs, whether or not local connection can be established, whether or not roaming can be performed, a password, and information on an SIM card and UIM card.

When a terminal 101 attempts to access the mobile communication network or the wireless LAN, the terminal 101 first accesses the user information storing section 111 through the first WLAN gateway 105a, the authentication gateway 109, and the authentication server 110 and obtains required information. The terminal 101 also holds a user profile.

The radio network controller 104 holds, in the cell position management section 203, information about cells under the control of the radio network controller 104 and information about the WLAN access networks 103 around the cells. FIG. 4 shows an exemplary implementation of the cell position management section 203. The cell position management section 203 contains the IDs 401 of base stations 102 with which communication is performed in the cells, the positions 403 of the cells, the radii 404 of the cells, connection information 405 indicating the types of terminals that can be accommodated by the cells (the types of terminals 101 such as 3G and wireless LAN that can be accommodated), and adjacent cells 406, and for wireless LAN cells, WAGs 407 that are WLAN gateways 105 with which the radio network controller 104 communicates.

The type of terminal that can be accommodated 402 indicates the type of cell that can be accommodated in each cell, namely UMTS (Universal Mobile Telecommunications System) or 802.11. The position 403 is positional information. The positional information includes a latitude value starting with N or S and a longitude value starting with E or W. The cell radius 404 indicates the signal coverage of a cell. The connection information 405 is information used for accessing the base station or WLAN access network that covers a cell. In this embodiment, a scrambling code is specified for a UMTS whereas an SSID and WEP key in the 802.11 specifications are specified for a wireless LAN.

In order to conform to the IEEE 802.11i and 802.1x specifications, additional fields may be provided such as fields indicating authentication and connection methods, fields of the speed, direction and acceleration of movement of a terminal 101 used for estimating the position, and fields storing an identifier of an encryption scheme for supporting encryption and information about a certification required or an encryption key required for encryption, and fields storing an identifier of a tunneling protocol if a tunnel other than an IPinIP tunnel is used for connecting to a wiring LAN, and information for setting the tunnel (such as a MPLS label if MPLS is used for the tunnel), an identifier for multiplexing, information about QoS or SLA (Service Level Agreement), and the sequence numbers of packets or frames. Advantageous effects of the present embodiment can be also obtained in the case where these fields are additionally provided.

The radio network controller 104 predicts a cell to which a terminal 101a will move on the basis of the positional information contained in the cell position management section 203 and the position of the cell in which the terminal 101a currently resides. Data in the cell position management section 203 can also be built by collecting information about the positions of WLAN access networks 103 by the WLAN gateway 105 beforehand and returning a set of the position of the WLAN access networks 103 and cell IDs of the WLAN access networks 103 to the radio network controller 104 in response to a request from the radio network controller 104.

In the present embodiment, means for determining whether a mobile terminal 101 has multiple wireless interfaces or not can also be provided in order to apply processing of handover between a mobile communication network and a wireless LAN to only the terminals 101 that have multiple types of radio interfaces such as a mobile communication network and a wireless LAN.

For example, an identifier such as an IMSI identifying terminals 101 having multiple radio interfaces may be stored in the radio network controller 104 and, when a new mobile terminal 101 enters or connects, determination may be made as to whether the identifier of the mobile terminal 101 matches the stored identifier of terminals 101 having multiple radio interfaces. Alternatively, when a mobile terminal 101 enters a cell, the user information storing section 111 or the terminal 101 itself may be asked about the radio interface of the terminal to determine the number of the radio interfaces. In either case, a cell registration process and the following process of handover between different types of networks may be performed only for terminals 101 that have multiple radio interfaces.

Figure 5:
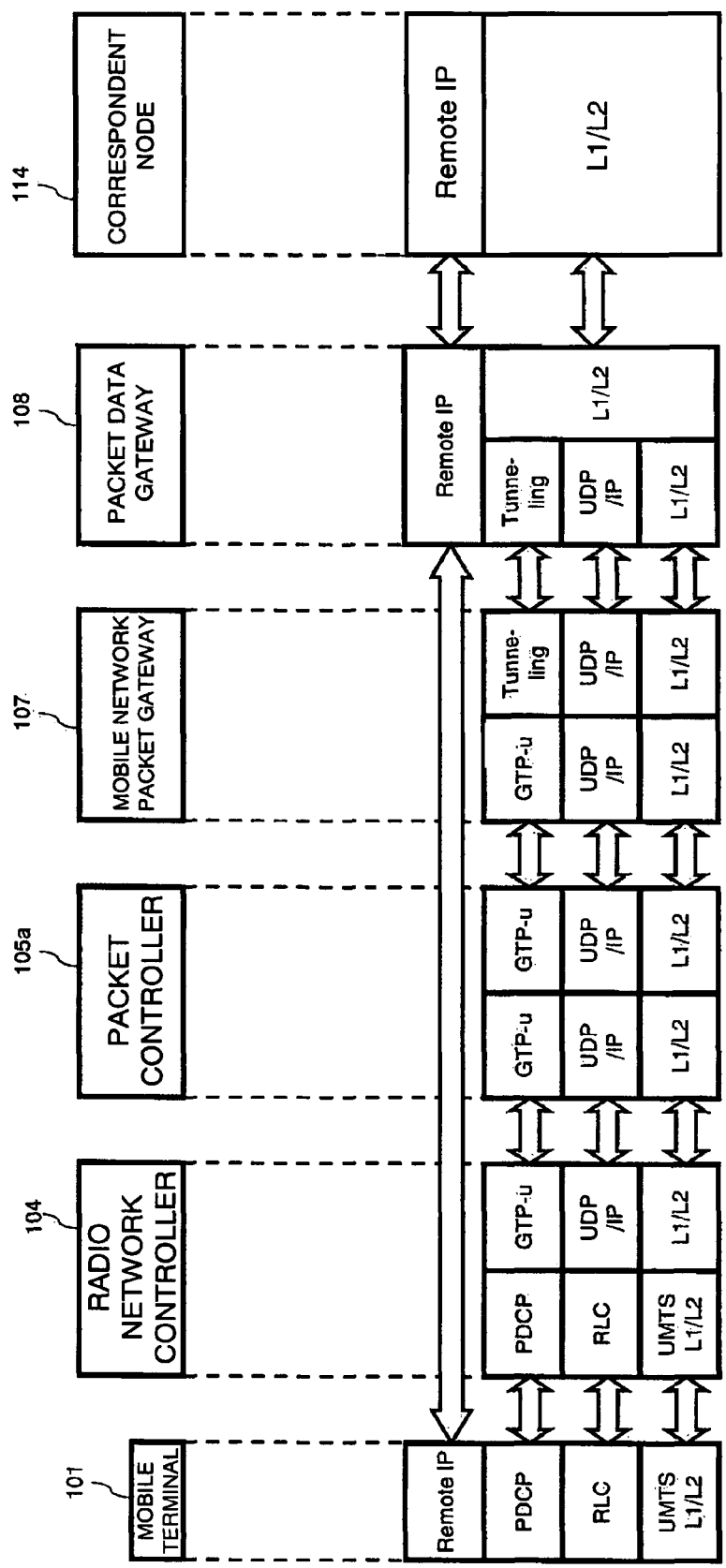
FIG. 5 shows protocol stacks of packet communication in a mobile communication network according to the first embodiment of the present invention.

It is assumed that a mobile terminal 101 is first connected through packet communication over a mobile communication network in the present embodiment. Protocol stacks relating to user data used in the connection are shown in FIG. 5. When a mobile-communication-network capable part of the mobile terminal 101 is used, the scheme used for packet communication between the mobile terminal 101 and the mobile network packet gateway 107 is the same as the packet communication scheme between UE and GGSN specified in the 3GPP TS 23.060 specifications. In the present embodiment, a packet data gateway 108 is provided between the mobile network packet gateway 107 and the public packet-switched network 112 and the packet data gateway 108 assigns a remote IP address to the terminal 101.

Therefore, the same remote IP address of the mobile terminal 101 is used in both of the case where the mobile terminal 101 is in a cell of the mobile communication network and the case where the mobile terminal 101 is in a cell of the wireless LAN.

If the node for connecting to the public packet-switched network 112 is a mobile network packet gateway 107, or the node that assigns a remote IP address is a mobile network packet gateway 107, advantageous effect of the present embodiments can be achieved provided that the remote IP address of the terminal 101 is common to the mobile communication network and the wireless LAN provides. If a remote IP address on the wireless LAN that differs from that on the mobile communication network is assigned to the mobile terminal, advantageous effects of the present invention can be obtained by notifying a higher-level node or the node that has assigned the remote IP address upon switching between the mobile communication network and the wireless LAN when the switching is performed and rerouting packets including user data in accordance with the notification.

Fields of information held by the mobile terminal 101 here is shown in FIG. 6. The IMSI 601 is an ID uniquely identifying the mobile terminal 101, which is ID1. The W-APN is an access point name in the interworking system and is iw.operator.com. The user ID is a character string that includes the W-APN as the domain name and uniquely identifies the user, and is ID1@iw.operator.com. The user profile 604 is the same as that contained in the user information storing section 111. The wireless LAN MAC 605 is the MAC address of the interface of a wireless LAN. If the terminal 101 has multiple wireless LAN interfaces, multiple MAC addresses may be contained.

The Active Set 606 is identifier of a cell of the mobile communication network or wireless LAN with which the mobile terminal 101 is communicating and are also referred to as ongoing-communication cell set. The Semi-active set 607 is an identifier of a cell that are predicted to be a cell to which the mobile terminal 101 will move and is also referred to as a predicted cell set. In the point of time of state (a), only packet connection in cell M1 is performed and therefore the Active Set 606 is M1 and the Semi-active Set 607 is "None". The remote IP address 608 is an IP address used by the mobile terminal 101 for communicating with a correspondent node 114 and has the value 10.2.2.2.

The local IP address 609 is an IP address used for communication with a WLAN access network 103 only when the wireless LAN is used. In states (b) to (d), the local IP address 609 L1 is 10.2.1.5 for cell L1 and 10.2.2.5 for cell L2.

The PDG transport 610 is a connection used for creating a tunnel to a PDG and consists of a set of an IP address and a port number. In states (b) to (d), the IP address 10.1.1.1 and the port number 10001 are set.

Referring to FIG. 7, a sequence will be described in which the radio network controller 104 predicts a cell to which a mobile terminal 101 is likely to move and makes pre-configuration for the predicted cell during packet connection of the mobile terminal 101a.

The radio network controller 104 first stores data associated with the user ID of the mobile terminal 101a in the terminal information management section 202. In the present embodiment, it is assumed that the user ID includes a symbol string indicating a network to which the terminal 101a connects and a character string used for identifying the user on the network. Specifically, the user ID has a format in which an IMSI and a W-APN (Wireless Access Point Name) indicating a network are combined into a domain name that follows "@", like a mail address.

In the 3GPP TS 23.003, a root NAI (Network Access Identifier specified in IETF RFC 2486) corresponding to a user ID is defined such that it is varied in accordance with the authentication scheme used in a wireless LAN, and the MNC (Mobile Network Code) and the MCC (Mobile Country Code) contained in an IMSI. It takes the form of <a one-digit number indicating an authentication scheme><MSIN (Mobile Subscriber Identification Number)>@wlan.mnc<MNC>.mcc<MCC>.<operator's domain name>. For example, if the IMSI is 234150999999999 and the authentication scheme is EAP-AKA, then the MCC is 234, MNC is 150, and MSIN is 999999999. EAP-AKA is represented by the number 0. Accordingly, it is represented as. 0999999999@wlan.mnc150.234.operator.com. It will be readily understood by analogy that advantageous effects of the present embodiment can also be obtained if a root NAI is used as a user ID.

A base station 102 can obtain an IMSI by paging performed during packet connection but not a W-APN. Therefore, a first base station 102a in the present embodiment obtains a W-APN for the mobile terminal 101a. The sequence for this is not required if the radio network controller 104 has already obtained the W-APN of the mobile terminal 101.

For example, if the W-APN is contained in a RRC connection request issued for establishing RRC connection in packet connection or in an Initial Direct Transfer of NAS (Non Access Stratum), a W-APN acquisition request 701 and W-APN acquisition response 702 are not required. Advantageous effects of the present embodiment can also be obtained by directly obtaining the user ID.

In the W-APN acquisition request 701, the radio network controller 104 provides a request signal for obtaining the W-APN that constitutes the domain name part of the user ID from the mobile terminal 101.

The information fields of the mobile terminal 101 before the W-APN acquisition request 701 are as shown in state (a) of FIG. 6, the information fields held by the radio network controller, which will be described later, as shown in state (a) of FIG. 8, and the information fields held by the wireless access gateway 105 are as shown in state (a) of FIG. 9.

At this point in time, the following process is performed inside the radio network controller 104. When packet connection is established or when information relating to prediction such as information about the position and speed of the terminal 101 measured if the terminal measures its position is input from the terminal 101a into the radio network controller 104, the radio network controller 104 starts a process for predicting and registering a location to which the terminal 101 will move. The terminal control section 201 inside the radio network controller 104 detects a trigger for starting this process.

At first, only the information about the mobile terminal 101a that relates to the mobile communication network is set in the terminal information management section 202 of the radio network controller 104. This is shown in state (a) of FIG. 8. In state (a) in FIG. 8, ID1 is set as the IMSI of the terminal 101a, the cell ID M1 is set as the active set, and 10.2.2.2 is set as the remote IP address of the terminal 101a. The other fields are not set.

The terminal control section 201 attempts to acquire the W-APN, user profile, and the MAC address of the wireless LAN from the terminal 101a. For this purpose, the terminal control section 201 generates a W-APN acquisition request using the IMSI. The terminal control section 201 issues the request to the terminal 101a through the base station communication section 205.

In the W-APN acquisition response 702, the terminal 101a notifies the W-APN, which is iw.operator.net, that the terminal 101a uses, the user profile, which is UP1, and the MAC address of the wireless LAN, 00:0E:36:4C:9E:38, to the radio network controller 104. In the radio network controller 104, the terminal control section 201 analyzes the information in the W-APN acquisition response 702 and extracts the W-APN (iw.operator.net), the user profile (UP1), and the MAC address of the wireless LAN. The terminal control section 201 combines the IMSI with the W-APN by using "@" to generate a user ID and stores it in the terminal information management section 202 along with the extracted information. The user ID in this case will be ID1@iw.operator.net.

In the cell selection process 703, the radio network controller 104 selects a WLAN access network 103 to which the terminal 101a will connect when the terminal 101a moves, on the basis of the position of the base station 102 to which the mobile terminal 101a is connected and the status of the first WLAN access network 103a. A WLAN access network 103 is selected that meets at least one of the following network conditions A to E.

Network condition A is that the WLAN access network 103 has a coverage area within a predetermined distance from the position of the base station 102. The radio network controller 104 may obtain or predict the position in any of the following ways.

Obtained position "a" is a position measured by the terminal 101a using a device such as a GPS system, obtained position "b" is a position close to the terminal 101a in which the terminal 101a is detected and notified by another terminal having position measurement and notification capabilities by using a secondary radio technology such as Blue tooth and UWB (Ultra Wide Band), and estimation method "c" predicts the position by using a change amount of the radio field strength of a channel or channels between the terminal 101 and one or more base stations 102.

Network condition B is that the terminal 101a is moving towered a coverage area of the WLAN access network 103 and the time calculated from the moving speed of the terminal is less than or equal to a predetermined value.

Network condition C is that the WLAN access network 103 is a network that provides interwork services to the user of the terminal 101a under a contract between the user and the operator of the mobile communication network.

Network condition D is that the WLAN access network 103 is provided by a wireless LAN connection service provider with which the user of the terminal 101a has a contract or provided by another service provider that has a roaming agreement with the service provider.

Network condition E is that the WLAN access network 103 has a sufficient capacity. The capacity here is determined by the capacity of the wires section of the WLAN access network 103, the capacity of the wireless access network in terms of the number of terminals, the total signal processing power of the hardware and software of the access points of the WLAN access network 103, the bandwidth, protocol processing capability, and routing capability of the link between the WLAN access network 103 and the WLAN gateway 105, and the policies of the operators.

The free capacity of the WLAN access network 103 accommodated by the WLAN gateway 105 can be provided by indicating from the WLAN gateway 105 to the radio network controller 104 at regular intervals or in response to an inquiry sent from the radio network controller 104 to the WAN gateway 105.

One or more cells to connect may be selected. The priorities of the selected cells may be determined as appropriate. One of the cells to connect may be selected on the basis of any of network conditions A to E.

For simple explanation, it is assumed in the present embodiment that the cells adjacent to the active set which indicates a cell to which the terminal is currently connected referred to as the semi-active set. Since the terminal 101a is located in cell M1 covered by the first base station 102a, only cell M1 is the active set. Therefore, cells M2, L1, and L2 adjacent to cell M1 are the semi-active set.

After cells are selected, in the wireless LAN pre-configuration request 704, the radio network controller 104 transfers the user ID and user profile of the terminal 1001a to the first WLAN gateway 105a. The user ID is a symbol string that uniquely identifies the user. For example, an NAI created from the IMSI and W-APN of the user may be used in 3GPP. In an NAI, W-APN is combined with an IMSI by @ like "ID1@iw.operator.net".

The terminal control section 201 of the radio network controller 104 generates a user profile from the user ID. Since cell L1 is accommodated by the first WLAN gateway 105a and cell L2 is accommodated by the second WLAN gateway 105b, the radio network controller 104 transfers the user ID and user profile to these two gateways. The following process to perform is the same for both WLAN gateways 105 and therefore the process will be described with respect to the first WLAN gateway 105a only.

Cell M2 belongs to the same radio network controller 104. Therefore, cell ID "M2" is straightforwardly added to the semi-active set of the terminal 101a and M2 will be added to the active set of the terminal 101 at active set update 716 which will be described later.

When a wireless LAN pre-configuration request 704 is input, a WAG connection setup section 301 in the first WLAN gateway 105a registers data about the terminal 101a in a terminal management section 302.

State (a) in FIG. 9 shows a stored information field, as an example of the terminal management section 302 of the first WLAN gateway 105a. The terminal management section 302 manages the active set and semi-active set of each terminal 101 by user ID.

Associated with the user ID 901 of the terminal 101a is a set of a user profile 902, the ID 903 of a serving RNC (radio network controller that controls the terminal 101), the MAC address 904 of the wireless LAN of the terminal 101, an active set 905, a semi-active set 906, and the remote IP address 907 of the terminal 101a.

The terminal 101a can communicate with multiple WLAN access networks 103 accommodated by the same first WLAN gateway 105a at the same time. In such a case, a WLAN transport for each of the WLAN access network 103 is established and a set of an IP address and a port is assigned to each transport. Accordingly, multiple sets of a local IP address 908, the IP address and port 909 of the transport IP layer for a packet data gateway 108, the IP address and port 910 of the transport IP layer for a WLAN access network 103 can be assigned to one user ID. It should be noted that if one WLAN gateway is associated with one WLAN access network, no WLAN transport is required.

If items of connection information (context) in addition to a local IP address and a port number are required for establishing connection such as information concerning encryption or compression applied in communication performed by a terminal 101 over a wireless LAN, those items of information can be stored in the terminal management section 302 and transferred along with the local IP address of the present embodiment to achieve the same effect as that of the present embodiment.

In state (a) of FIG. 9, because setup on the wireless LAN is not yet completed, the local IP address 908, PDG transport 909, and WLAN transport 910 are not set. The serving RNC 903 which controls the terminal 101a is the radio network controller 104 that has output a wireless LAN pre-configuration request 704. The ID of the radio network controller 104 is denoted by R1.

When the wireless LAN pre-configuration request 704 is input, the first WLAN gateway 105a uses the user profile in the request 704 to authenticate access to the mobile communication network. In the authentication process, the user of the terminal 101 is authenticated as a user of the mobile communication network using the user information storing section 111 through the authentication gateway 109 and the authentication server 110. During this authentication, the following messages are communicated among the components.

WAG authentication request 705 and WAG authentication response 709 between the first WLAN gateway 105a and the authentication gateway 109: In 3GPP specifications, EAP/Request and EAP/Success specified in TS23.234 are used.

Gateway authentication request 706 and gateway authentication response 708 between the authentication gateway 109 and the authentication server 110: In 3GPP specifications, the authentication gateway 109 is only relays messages and, as with the WAG authentication request 705 and WAG authentication response 709, EAP/Request and EAP/Success specified in TS23.234 are used.

Authentication acquisition process 707 performed between the authentication server 110 and the user information storing section 111 as specified in TS23.234. In 3GPP specifications, if the authentication sever 110 does not have data about a subscriber, the authentication server 110 acquires the data from the user information storing section 111. The authentication server 110 also checks the data from the user information storing section 111 to determine the user of the terminal 101a can use a wireless LAN.

Inside the first WLAN gateway 105a, the WAG connection setup section 301 extracts information required for the authentication such as information on an SIM/UIM card, a password, and session key from the user profile in the data about the terminal 101a in the terminal management section 302.

Through the exchange of the messages described above, the terminal management section 302 in the first WLAN gateway 105a determines that the terminal 101a is allowed to use the services of the mobile communication network.

Then, the first WLAN gateway 105a sets a communication link from the packet data gateway 108 to the first WLAN access network 103a that is required when the terminal 101a moves into the area covered by the wireless LAN and generates connection information. The first WLAN gateway 105a sets up tunnels based on IP between the packet data gateway 108 and the first WLAN gateway 105a and between the first WLAN gateway 105a and the terminal 101a.

The necessity to creating a tunnel is defined in TS23.234. Methods for creating a tunnel include, in addition to IP-in-IP, which is assumed in the first embodiment, MPLS (Multi-Protocol Label Switching), GRE (Generic Routing Encapsulation), IPsec, L2TP (Layer 2 Tunneling Protocol), and PPPOE (Point-to-Point Protocol over Ethernet (registered trademark)). Advantageous effects of the present embodiment can be achieved by using any of these methods.

Figure 10:
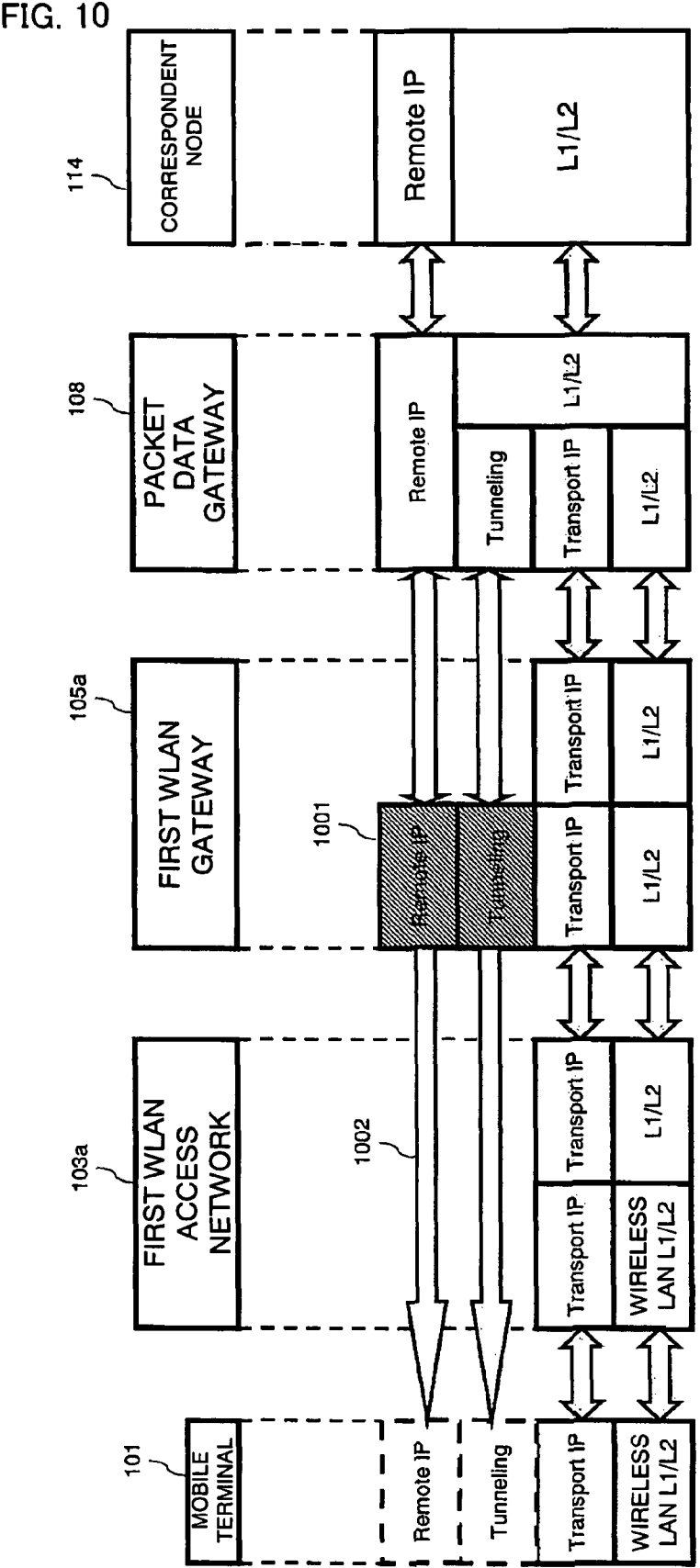
FIG. 10 shows protocol stacks in packet communication on a wireless LAN according to the first embodiment of the present invention.

A process for creating tunnels according to the present embodiment is shown in a protocol stack diagram in FIG. 10. In order for a terminal 101a to perform communication in an area covered by a wireless LAN, tunneling and a remote IP layer are required for both of the packet data gateway 108 and the terminal 101a. However, if the terminal 101a does not reside in the wireless LAN area, the first WLAN gateway 105a first creates a tunnel between itself and the packet data gateway 108 in place of the terminal 101a. This is the remote IP layer of the first WLAN gateway 105a and tunneling ("Tunneling" in FIG. 10) 1001. Then, connection information required for setting the tunnels is transferred to the terminal 101a through the mobile communication network.

For setting a tunnel, connection information of terminal 101a is required. Since IP-in-IP is assumed as the tunneling scheme in the present embodiment, the connection information is a local IP address used when the terminal 101a moves to cell L2. Reference numeral 1002 in FIG. 10 represents the transmission of the connection information, thereby the terminal 101a obtain the same setting information as obtained through setting tunnel directly.

In the tunnel creation process, first a transport IP layer is set in the communication link between the packet data gateway 108 and the first WLAN gateway 105a. For setting the communication link, the local IP addresses and port numbers of the first WLAN gateway 105a and the packet data gateway 108 are required.

For setting the communication link, the first WLAN gateway 105a must obtain a list of visited networks (WLAN access networks 103) to which the terminal 101 can connect and select a visited network in accordance with the user profile. The first WLAN gateway 105a first performs wireless LAN IP address acquisition 710. In the wireless LAN IP address acquisition 710, the first WLAN gateway 105a uses the domains of W-APNs and visited networks to receives IP addresses of packet data gateways 108 to which the terminal 101 can connect from WLAN access networks 103 having a DNS server function. In the wireless LAN IP address acquisition 710, the WAG connection setup section 301 uses the address contained in the domain section of the user ID to generate and output a DNS query.

In response to this query, the DNS severs returns a list of sets of local IP addresses of associated packet data gateways 108 to the first WLAN gateway 105a. The WAG connection setup section 301 refers to the user profile in the terminal management section 302 and selects an appropriate packet data gateway 108.

A packet data gateway 108 may be selected by using one of various methods. For example, the packet data gateway 108 of the home network may be selected in priority to packet data gateways 108 of visited networks. Alternatively, connection charges of networks may be contained in the user profile beforehand and the packet data gateway 108 of the network whose connection charge is the least expensive may be selected. Alternatively, multiple packet data gateways 108 or visited networks may be listed in the user profile in the order of priority of connection and the network with the highest priority may be selected. The qualities of service or bandwidths of nodes such as packet data gateways 108 and WLAN gateways 105 are stored beforehand and the node that provides the highest quality of service or bandwidth may be selected.

After a packet data gateway 108 is selected, the WAG connection setup section 301 in the first WLAN gateway 105a provides a tunnel setup notification 711 to the selected packet data gateway 108. The tunnel setup notification 711 contains the user ID and remote IP address of the terminal 101, and the port number of a port of the terminal 101 that is reserved for tunnel setup along with the IP address of the first WLAN gateway 105a.

In policy exchange 712 in the tunnel setup process, the first WLAN gateway 105a and the packet data gateway 108 exchange information such as filtering information with each other through the authentication gateway 109. The packet data gateway 108 to which the tunnel setup notification 711 is input provides authentication completion confirmation 713 to the authentication server 110 to confirm that authentication for accessing the first WLAN access network 103a has been completed. Since in this case the authentication of the terminal 101a has already been completed, completion of the authentication can be confirmed. These processes are defined in 3GPP TS 23.234.

If tunnel has encryption and compression functions, an encryption scheme and header compression or payload compression scheme used in a tunnel are required for setting the tunnel. These setup information is extracted by the policy exchange 712.

Then, the packet data gateway 108 selects the port number used for the tunnel and performs tunnel creation 714 with the first WLAN gateway 105a. In the tunnel creation 714, information about the tunnel between the packet data gateway 108 and the first WLAN gateway 105a and information identifying the terminal 101a, for example the user ID, is provided from the packet data gateway 108 to the first WLAN gateway 105a. When the WAG connection setup section 301 in the first WLAN gateway 105a detects the local IP address and tunnel port number of the packet data gateway 108 through the PDG communication section 305, the WAG connection setup section 301 stores the local IP address and tunnel port number of the packet data gateway 108 in a PDG transport field 909 in the terminal management section 302. The state of the terminal management section 302 of the first wireless LAN gateway 105a at this point in time is shown in state (b) of FIG. 9.

After setup of the tunnel between the first WLAN gateway 105a and the user information storing section 111 is completed, the connection information is transferred from the first WLAN gateway 105a to the terminal 101a as shown at SIG 1002 in FIG. 10. First, the first WLAN gateway 105a provides a tunnel setup notification 715 to the radio network controller 104. The WAG connection setup section 301 in the first WLAN gateway 105a extracts the user ID of the terminal 101a, wireless LAN connection information, and the local IP address (10.2.1.5) assigned through the tunnel setup from the terminal management section 302 to generate the tunnel setup notification 715 and outputs the notification to the radio network controller 104 by using an RNC communication section 304.

When the tunnel setup notification 715 is input in the radio network controller 104, the radio network controller 104 issues an Active Set Update 716 to the terminal 101a to direct the terminal 101a to set up the tunnel to the terminal 101a indicated by the tunnel setup notification 715 and adds cell L1 to the Semi-Active Set of the terminal 101a.

The active set update can be used by adding a section for containing semi-Active Set information to Active Set Update in 3GPP TS 25.331. The terminal 101a sets the local IP address and the remote IP address used in the area covered by the first WLAN access network 103a in accordance with the contents of the Active Set Update.

After the tunnel setup notification 715 is input in the radio network controller 104 through a WAG communication section 206, the following process is performed in the radio network controller 104. An RNC connection setup section 204 detects by the tunnel setup notification 715 that the tunnel setup on the wireless LAN has been completed. Thus, the terminal 101a becomes ready to communicate immediately after the terminal 101a will move into cell L1. The terminal control section 201 stores the local IP address (10.2.1.5) obtained from the tunnel setup notification 715 in the terminal information management section 202 as the local IP address on the wireless LAN and also adds L1 to the semi-active set.

In order to provide these items of information to the terminal 101, the terminal control section 201 generates an Active Set Update 716 for setting the local IP address 10.2.1.5 and adding L1 to the semi-active set and issues the Active Set Update 716 to the first base station 102a through the base station communication section 205. This signal is transferred by the first bas station 102a to the terminal 101a.

Although not explicitly shown, the radio network controller 104 also adds L2 to the semi-active set and issues an Active Set Update 716 for adding cell L2 to the terminal 101a at the time when the radio network controller 104 receives the tunnel setup notification 715 from the second WLAN gateway 105b. Thus, the active set will contain M1 and the semi-active set will contain M2, L1 and L2. The state of the terminal information management section 202 of the radio network controller 104 at this time point is shown in state (b) of FIG. 8 and the state of information held by the terminal 101a is shown in state (b) of FIG. 6.

A process performed by the nodes after the terminal 101a enters cell L1 and becomes terminal 101b will be described below with reference to a process sequence shown in FIG. 11. It is assumed here that the terminal 101a is in a condition unsuitable for communication at first since the radio signal strength is unstable immediately after the terminal 101a enters cell L1, and then the radio signal strength increases, the communication error rates decrease, and a condition in which stable communication can be performed is reached.

The section from the entry into cell L1 1101 to the downlink data transmission 1104 is a process in which packets sent from a public packet-switched network 112 to the terminal 101*b* is transferred from the packet data gateway 108 to the first WLAN gateway 105*a* immediately after the terminal 101*b* enters the cell L1. This process reduces the time of discontinuity between establishment of connection between the terminal 101*b* and the first WLAN access network 103*a* in cell L1 after stabilization of communication and reception of a downlink packet at the terminal 101*b*.

The terminal 101*b* moves into the area covered by the first WLAN access network 103*a* (1101). The first WLAN access network 103*a* detects the radio field of a wireless LAN on the terminal 101*b*. While the radio signal strength is unstable, the terminal 101*b* issues Probe defined in specification 802.11 or outputs Association on receipt of a beacon from the first WLAN access network 103*a*, thereby notifying the MAC address of the terminal 101*b* to the first WLAN access network 103*a*. Accordingly, depending on circumstances, the following procedure and a communication start procedure, which will be described later, may be initiated at about the same time in response to the first Association issued by the terminal 101*b* when communication condition is stabilized.

If the area covered by the wireless LAN overlaps the area covered by another wireless LAN and terminal communicates a WLAN access network other than the first WLAN access network 103*a*, the first WLAN access network 103*a* can detect the MAC address of the terminal 101*b* by receiving frames being communicated.

When the first WLAN access network 103*a* detects a wireless WLAN radio signal from the terminal 101*b*, the first WLAN access network 103*a* issues a wireless LAN radio signal detection notification 1102 to the first WLAN gateway 105*a*. The wireless LAN radio signal detection notification 1102 includes information such as the MAC address of the terminal 101*b* required for establishing connection to the wireless LAN.

When the wireless LAN radio signal detection notification 1102 is input, the first WLAN gateway 105*a* issues a packet reception relay notification 1103 relating to the terminal 101*b* to the packet data gateway 108. When the WAG connection setup section 301 in the first WLAN gateway 105*a* detects the wireless LAN radio signal detection notification 1102 through a WLAN communication section 303, the WAG connection setup section 301 searches the terminal management section 302 for the MAC address included in the notification 1102. Because the MAC address of the terminal 101*b* is already registered, the user ID (802) of the terminal 101*b*, "ID1@iw.operator.net can be retrieved. If the semi-active set of the terminal 101 found includes a cell covered by the first WLAN access network 103*a* whose wireless LAN radio field has been detected, packet transfer from the packet data gateway 108 is started. In this example, L1 is included in the semi-active set of the terminal 101*b*, therefore it is determined that packet transfer is started.

A packet reception relay notification 1103, which indicates that the terminal 101*b* has entered the area covered by the first WLAN access network 103 and prompts the packet data gateway 108 to start packet transfer, includes the user ID of the terminal 101*b*. The first WLAN gateway 105*a* specifies the user ID of the terminal 101*b* and the PDG transport 909 retrieved from the terminal management section 302 in the packet reception relay notification 1103 and issues the notification 1103 to the packet data gateway 108 through a PDG communication section 305.

When the packet data gateway 108 receives the packet reception relay notification 1103, the packet data gateway 108 selects a set tunnel on the basis of the user ID of the terminal 101*b*. The packet data gateway 108 transfers packets provided from the public packet-switched network 112 that are directed to the terminal 101*b* through the tunnel to the first WLAN gateway 105*a* (downlink data transfer 1104). Because packet transfer from the packet data gateway 108 through the mobile packet gateway 107 and the packet controller 106 has already been started, the packet data gateway 108 duplicates packets received and provides them to both of the mobile packet gateway 107 of the mobile communication network and the first WLAN gateway 105*a* of the wireless LAN. Packets transferred through packet transmission until a terminal connection notification 1106, which will be described later, is input are discarded at the first WLAN gateway 105*a*.

Figure 11:
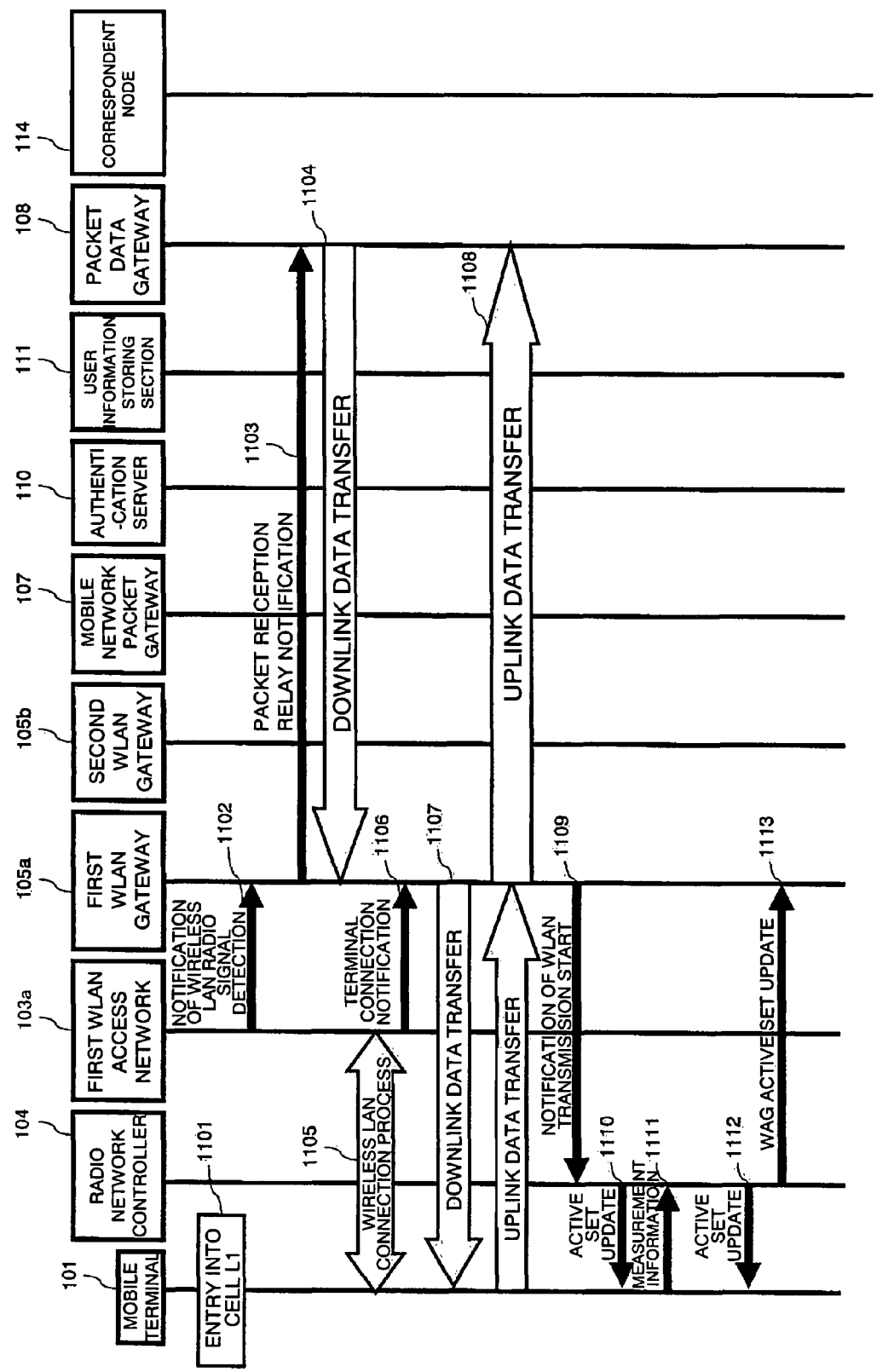
FIG. 11 shows a sequence of a connection setup process when the mobile terminal enters a cell.

The following is a description of a process in which when communication quality between the terminal 101*b* and the first WLAN access network 103*a* is stabilized, the terminal 101*b* starts outputting uplink data and the first WLAN access network 103*a* of cell L1 starts substantial communication (1105 to 1110 in FIG. 11).

The terminal 101*b* measures the radio field strength or the communication strength of the wireless LAN to determine whether a condition in which communication can stably be performed is reached. If the terminal 101*b* determines that the communication becomes stable after entry into the area covered by the first WLAN access network 103*a*, the terminal 101*b* performs a wireless LAN connection process 1105 in cooperation with the first WLAN access network 103*a* and starts communication using the local IP address that the terminal 101*b* has obtained. According to specification 802.11, Probe and Association procedures are used for the connection process.

When the first WLAN access network 103*a* detects that the terminal 101*b* is connected to the first WLAN access network 103*a*, the first WLAN access network 103*a* issues a terminal connection notification 1106 to notify the first WLAN gateway 105*a* of information about the terminal 101*b* such as the MAC address required for connecting to the wireless LAN. In the first WLAN gateway 105*a*, the WAG connection setup section 301 detects the terminal connection notification 1106 through the WLAN communication section 303 and retrieves the user ID, PDG transport, and WLAN transport associated with the MAC address from the terminal management section 302. In this example, the IP address "10.1.1.1" and port "10001" of the PDG transport 909 and the IP address "10.2.1.1" and port "10001" of the WLAN transport associated with the terminal 101*b* are retrieved.

The WAG connection setup section 301 further selects a tunnel relating to the terminal 101*b* that is set between the first WLAN gateway 105*a* and the packet data gateway 108 from the information required for connection to the wireless LAN and transfers packet sent from the packet data gateway 108 through the tunnel to the first WLAN access network 103*a* through the selected tunnel (downlink data transfer 1107).

In order to relay packets of the terminal 101*b* to the packet data gateway 108, the first WLAN gateway 105*a* transfers packets from the first WLAN access network 103*a* to the packet data gateway 108 (uplink data transfer 1108). Upon detection of the input of the uplink data transfer, the WAG connection setup section 301 in the first WLAN gateway 105*a* changes cell L1 of the first WLAN access network 103*a* from the semi-active set to the active set in the data about the terminal 101*b* in the terminal management section 302. The change may be made when a WLAN transmission start notification 1109 is issued.

Then, the first WLAN gateway 105a sends a WLAN transmission start notification 1109 to the radio network controller 104 to notify that the terminal 101b has started communication. The WAG connection setup section 301 stores the WLAN transmission start notification 1109 in association with the user ID of the terminal 101b and sends it to the radio network controller 104 through the RNC communication section 304.

When the WLAN transmission start notification 1109 is input in the radio network controller 104, the radio network controller 104 changes cell L1 of the terminal 101b from the semi-active set to the active set. The RNC connection setup section 204 detects the input of the WLAN transmission start notification 1109 by the WAG communication section 206 and notifies the input to the terminal control section 201. The terminal control section 201 adds L1 to the active set of the terminal 101b in the terminal information management section 202 and deletes L1 from the semi-active set. As a result, information in the terminal information management section 202 of the radio network controller 104 becomes as shown in state (c) of FIG. 8. Then, in order to change the active set in the terminal 101b, the terminal control section 201 generates an Active Set Update 1110 for directing the terminal 101b to change cell L1 from the semi-active set to the active set and sends the Active Set Update 1110 to the terminal 101b through a base station communication section 205 through the wireless LAN gateway 105a.

When the Active Set Update 1110 is input, the terminal 101b updates the active set data stored in itself in accordance with the Active Set Update 1110. As a result, the active set of the terminal 101b includes cells M1 and L1 as shown in state (c) of FIG. 6. Thus, the same data is stored both in the terminal 101b and the radio network controller 104.

When subsequently the communication over the wireless LAN becomes stable and its quality becomes better than that of communication over the mobile communication network, communication with the mobile communication network is disconnected, the mobile terminal 101b completely switches to the communication over the wireless LAN, and switches M1 from active set to the semi-active set. If the semi-active set of the mobile terminal 101b includes a cell the distance to which becomes far, the cell is deleted from the semi-active set (1111 through 1113 in FIG. 11).

After the active set update 1110, the terminal 101b measures the strength of radio field and conditions of communication (such as throughput, packet loss rate, and bit error rate (BER)) with the first WLAN access network 103a and notifies the information to the radio network controller 104 as measurement information 1111. For this purpose, Measurement Report defined in TS25.331 can be used. Because connection with the WLAN has been established, the report may be transmitted through the first WLAN access network 103a.

When the connection with the mobile communication network 103a becomes unnecessary because the BER of communication over the first WLAN access network 103a becomes lower than the BER of communication over the mobile communication network or the conditions of the communication over the first WLAN access network 103a becomes stable and the throughput increases, the radio network controller 104 determines that the cells in the active set except L1 should be removed from the set. In the present embodiment, cells adjacent to the cells in the active set are included in the semi-active set. Therefore, cell M1 is moved from the active set to the semi-active set and cells M2 and L2 are deleted from the semi-active set.

First, the terminal control section 201 generates an Active Set Update 1112 for updating the active set including cell M1 and the semi-active set including cells M2 and L2 and a WAG Active Set Update 1113 for causing the second WLAN gateway 105b to delete cell L2 from the semi-active set of the terminal 101b.

Change of the active set relating to cells M1 and M2 of the mobile communication network is made by using the Active Set Update 1112 for cells M1, M2, and L2. When the Active Set Update 1113 is input, the terminal 101 moves cell M1 from the active set to the semi-active set and deletes cell M2 from the semi-active set. This procedure can be performed in a manner similar to Active Set Update defined in 3GPP TS 25.331, with the only difference being updates made to the semi-active cell. Data from the radio network controller 104 is output through the base station communication section 205.

Then, a process for deleting cell L2 from the semi-active set is performed. A WAG Active Set Update 1113 for deleting cell L2 from the semi-active set of the terminal 101b is issued from the radio network controller 104 to the second WLAN gateway 105b. The second WLAN gateway 105b deletes cell L2 from the semi-active set of the terminal 101b in the terminal management section 302. As a result of the WAG Active Set Update 1113, information in the terminal information management section 202 of the radio network controller 104 becomes as shown in state (d) of FIG. 8.

Because the WLAN access network 103 accommodated by the second WLAN gateway 105b is no longer included in the active set and semi-active set of the terminal 101b, the data about the terminal 101b itself is also deleted. This deletion is also notified to the radio network controller 104. As a result of the WAG Active Set Update 1113, the information held by the terminal 101b is as shown in state (d) of FIG. 6. The information fields in the wireless LAN gateway 105 becomes as shown in state (c) of FIG. 9.

Figure 12:
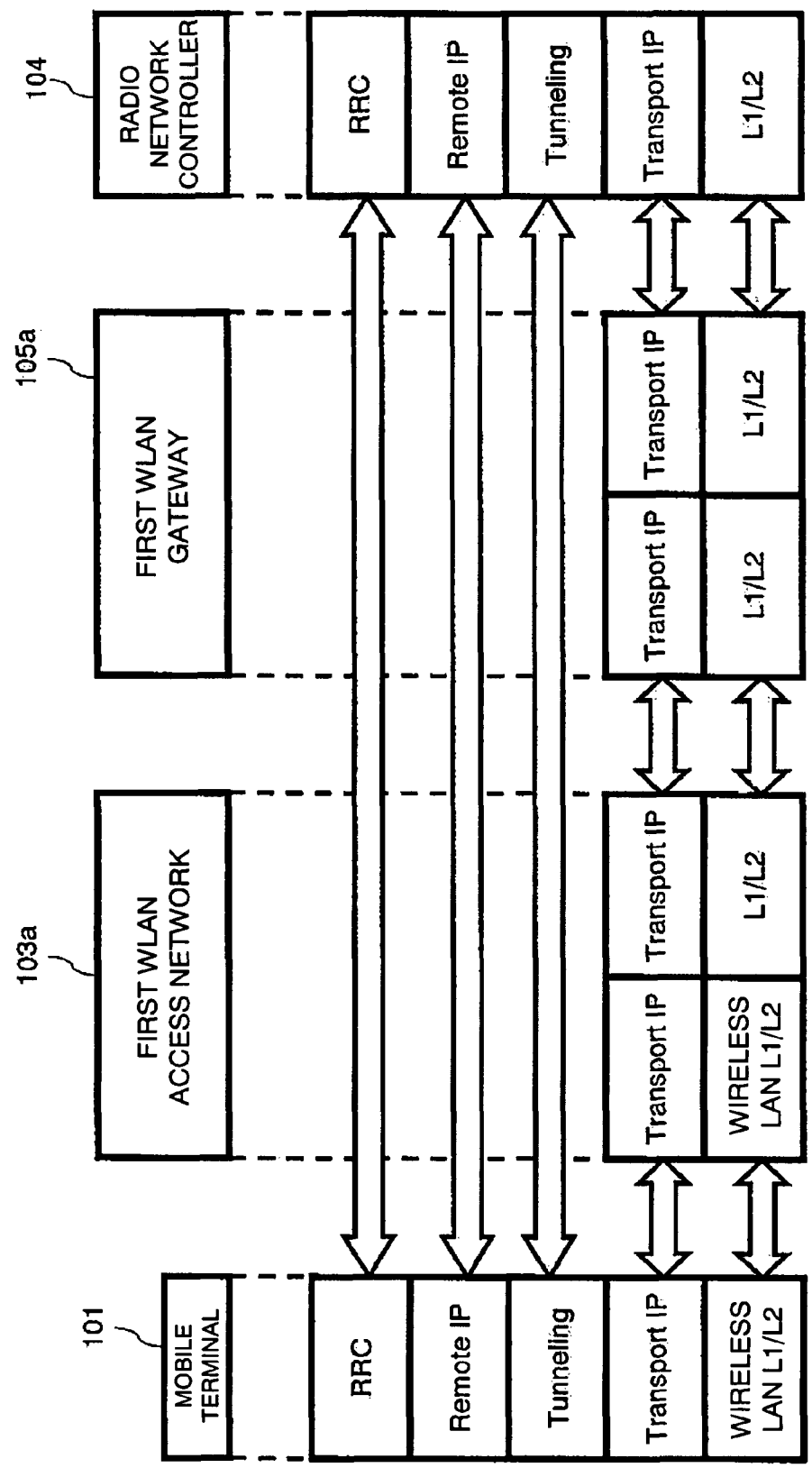
FIG. 12 shows protocol stacks for a control signal of the wireless LAN according to the first embodiment of the present invention.

Subsequently, control data in the control plane also is transmitted through the first WLAN access network 103a. FIG. 12 shows exemplary protocol stacks for transmission of the control data. The protocol stacks are basically similar to the protocol stacks for user data transmission. The terminal 101 transmits data of RRC, which is a protocol for controlling terminals, by using a remote IP address and a tunnel within the network.

While the present embodiment has been described with respect to an example in which the first WLAN gateway 105a and the radio network controller 104 are interconnected to communicate connection information and authentication information of the terminal 101b between them in order to implement handover based on prediction, advantageous effects of the present embodiment can also be achieved by connecting the radio network controller 104 on the wireless LAN to the first WLAN access network 103a so that the first WLAN access network 103a functions similarly to the first WLAN gateway 105a in the present embodiment.

The packet data gateway 108 of the home network and the packet data gateway 108 of the visited network are logically identical in the present embodiment. If they are logically different from each other, a tunnel from the first WLAN network gateway 105a to the packet data gateway 108 for the home network and a tunnel from the first WLAN network gateway 105a to the packet data gateway 108 for the visited network can be set up to achieve the same advantageous effects as those of the present embodiment.

While an IMSI is used as the ID for identifying a terminal 101 to obtain W-APN from the terminal 101 in the present embodiment, a U-RNTI (UTRAN Radio Network Temporary Identifier) may be used as the ID for identifying the terminal 101 instead of the IMSI to obtain data such as IMSI and W-APN used for authentication on wireless LAN from the terminal 101. A sequence similar to that used in the present embodiment can be used in that case as well to obtain the same advantageous effects as those of the present embodiment.

While packet transmission from the packet data gateway 108 over the first WLAN gateway 105a is started upon detection of the terminal 101b in the area covered by the first WLAN access network 103a in the semi-active set in the present embodiment, the radio network controller 104 may determine change from the semi-active set to the active set. The same advantageous effects as those of the present embodiment can be achieved in that case as well.

In that case, when the first WLAN gateway 105a detects a wireless LAN radio signal of the terminal 101b, the first WLAN gateway 105a notifies the user ID and data about the strength of the radio signal and quality of service of the terminal 101b to radio network controller 104, which then determines whether handover is possible or not according to contents of the notification. If the radio network controller 104 determines that handover is possible, the controller 104 issues a request for updating the active set and semi-active set to the first WLAN gateway 105a. The rest of the process is the same as the present embodiment. The terminal 101b establishes connection over the first WLAN gateway 105a from the packet data gateway 108.

If a terminal 101 holds positional information including at least one of the position, speed, acceleration, and direction of movement of the terminal 101 and notifies the positional information to the radio network controller 104, the radio network controller 104 can accurately predict the cell to which the terminal 101 will move. When the distance between a cell in the semi-active set and the terminal 101 or the time required for the terminal 101 to reach a cell calculated from the distance and speed decreases to a predetermined value or less, a packet reception relay notification can be sent from the radio network controller 104 to the packet data gateway 108 to cause the packet data gateway 108 to start packet transfer to the first WLAN gateway 105a.

While an IMSI has not been used at the first WLAN gateway 105a in the present embodiment, an identifier such as an IMSI that can uniquely identify the terminal 101 instead of the user ID in the present embodiment can be used to achieve the same effects as those of the present embodiment.

According to the present embodiment, the next cell to which a mobile terminal 101 moves is predicted, authentication and connection setup processes on the WLAN access network 103 of the predicted cell is performed beforehand and, when or immediately before the terminal enters the cell, packet transfer to the cell is started as described above. Thus, packet communication can be started immediately when the terminal arrives the WLAN access network 103 of the cell.

Furthermore, by deleting cells irrelevant to prediction of the next cell from the semi-active set when the terminal 101 moves from one cell to another, signaling traffic involved in the prediction process can be reduced.

Second Embodiment

In a second embodiment, packet transmission is stopped when the strength of radio signals transmitted over a wireless LAN becomes weak during communication and communication over the wireless LAN becomes impossible. The block diagrams showing the configuration of the second embodiment are the same as those in the first embodiment and therefore detailed description of the configuration thereof will be omitted.

Figure 13:
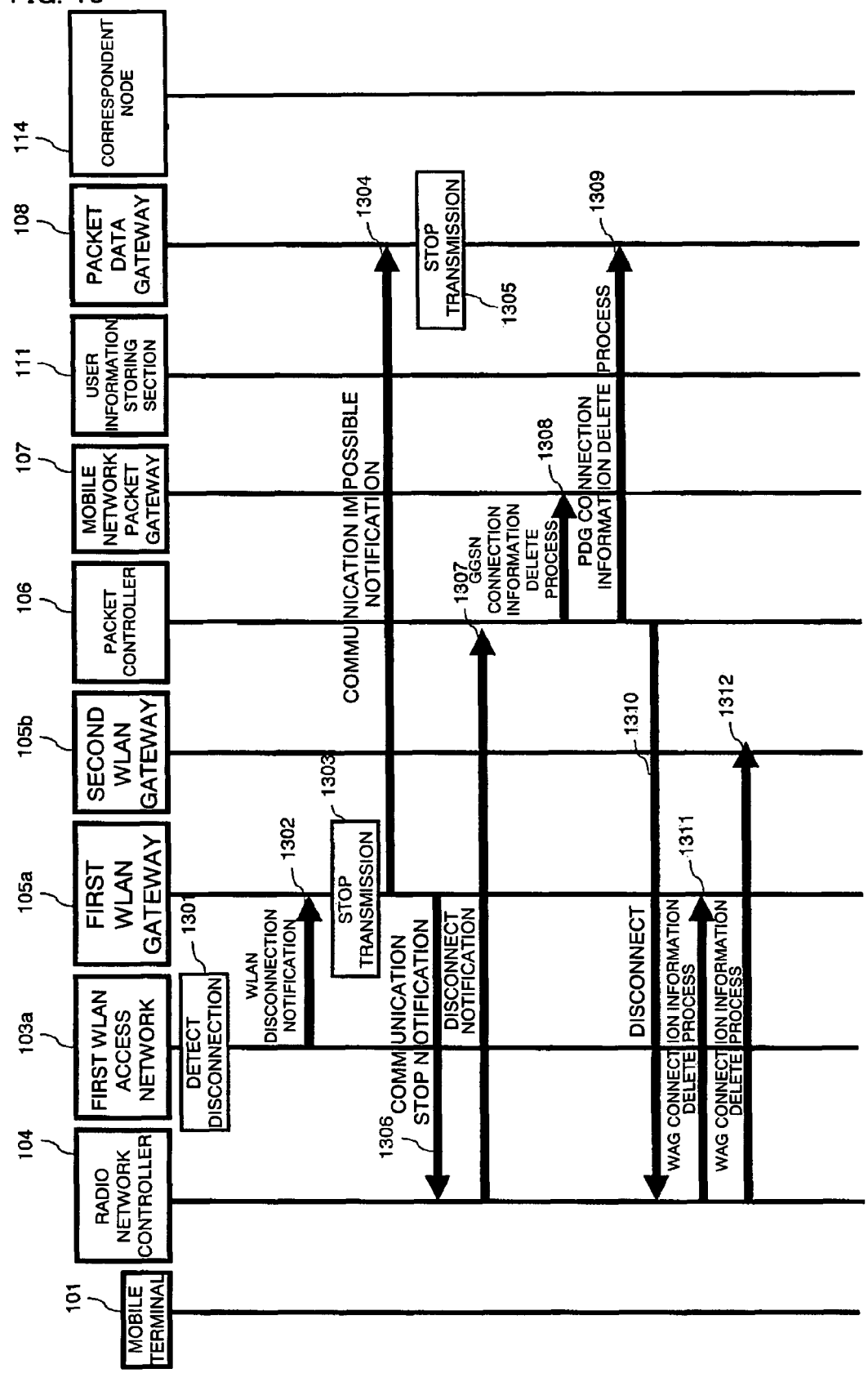
FIG. 13 shows a sequence of a disconnection process according to a second embodiment of the present invention.

Referring to FIG. 13, operation of the second embodiment will be described. In a first WLAN access network 103a, disconnection of packet transmission is detected after frames with the MAC address of a terminal 101b have not received for a predetermined period of time (Detect disconnection 1310). Specifically, a timer is started upon reception of a frame and the timer is updated each time a frame with the MAC address of the terminal 101b is received. When the timer expires and disconnection is detected, the first WLAN access network 103a sends a WLAN disconnection notification 1302 including the MAC address of the terminal 101b to a first WLAN gateway 105a.

When the WLAN disconnection notification 1302 is input, the first WLAN gateway 105a controls a WLAN communication section 303 to stop packet transmission to the first WLAN access network 103a (Stop transmission 1303). When a WAG connection setup section 301 in the first WLAN gateway 105a detects the WLAN disconnection notification 1302 through the WAN communication section 303, the WAG connection setup section 301 searches a terminal management section 302 for information that includes the MAC address of the terminal 101b contained in the notification 1302. In this case, information about the terminal 101b is found and a Serving RNC 903 that specifies a radio network controller 104 and a PDG transport 909 that specifies a packet data gateway 108 are retrieved from the information.

Then, the first WLAN gateway 105a notifies the specified packet data gateway 108 and radio network controller 104 that communication in cell L1 has been stopped. A communication impossible notification 1304 is sent to the packet data gateway 108 through a PDG communication section 305. The communication impossible notification 1304 includes the user ID and the ID of cell L1 that is no longer able to communicate with the terminal 101b. When the communication impossible notification 1304 is input, the packet data gateway 108 stops packet transmission relating to the terminal 101b to the first WLAN gateway 105a (Stop transmission 1305).

On the other hand, a communication stop notification 1306 relating to the terminal 101b to the radio network controller 104 is output by a WAG connection setup section 301 through an RNC communication section 304. When the communication stop notification 1306 is input, the radio network controller 104 moves cell L1 from the active set to the semi-active set. An RNC connection setup section 204 in the radio network controller 104 detects the communication stop notification 1306 through a WAG communication section 206 and notifies the notification 1306 to a terminal control section 201. If the active set of the terminal 101b still includes a cell, the terminal control section 201 causes the terminal 101b and the first WLAN gateway 105a to update their active sets to move cell L1 to the semi-active sets.

If the active set of the terminal 101b is empty, the RNC connection setup section 204 notifies a packet controller 106 that the communication with the terminal 101b is no longer possible. Since the active set includes only L1 in this example, the active set become empty. Consequently, the terminal control section 201 sends a disconnection notification 1307 to an SGSN 206 through an SGSN communication section 207 to notify that the communication between the terminal 101b and the radio network controller 104 has been disconnected.

When the disconnection notification 1307 is input, the packet controller 106 checks the state of the terminal 101b. Since there is no connection between the terminal 101b and another radio network controller 104 in this example, the packet controller 106 performs a process for disconnecting packet communication of the terminal 101b (PS Serving Connection Release defined in 3GPP TS 23.060).

The packet controller 106 also performs a GGSN connection information delete process 1308 and a PDG connection information delete process 1309 to cause the mobile network packet gateway 107 and the packet data gateway 108 to delete context information that is management information about the terminal 101*b*. The packet controller 106 uses Delete PDP Context Request/Response defined in 3GPP 23.060 for the mobile network packet gateway 107. The mobile network packet gateway 107 and the packet data gateway 108 delete context information concerning the terminal 101*b* that is held in each of the gateways 107 and 108.

Then, the packet controller 106 disconnects connection to the radio network controller 104 relating to the terminal 101*b* (1310). After communication between the packet controller 106 and the radio network controller 104 is disconnected, the radio network controller 104 performs a WAG connection information delete process to cause the first WLAN gateway 105*a* and the second WLAN gateway 105*b* to delete entries concerning the terminal 101*b* from their terminal management section 302 in order to delete context information about the terminal 101*b*. When the RNC connection setup section 204 in the radio network controller 104 detects disconnection with the packet controller 106, the RNC connection setup section 204 notifies the terminal control section 201 that the connection with the packet controller 106 relating to the terminal 101*b* has been disconnected.

The terminal control section 201 deletes information about the terminal 101*b* from the terminal information management section 202. The terminal control section 201 also outputs a WAG connection information delete process 1311 and a WAG connection information delete process 1312 to the first WLAN gateway 105*a* and the second WLAN gateway 105*b* that control cells L1 and L2 which are active set of the terminal 101*b*. When a WAG connection setup section 301 in each WLAN gateway 105 detects the WAG connection information delete process 1311,1312 through the RNC communication section 304, the WAG connection setup section 301 deletes information about the terminal 101*b* from the terminal management section 302. The WAG connection setup section 301 also outputs a response indicating the result of the WAG connection information delete process 1311,1312 to the radio network controller 104 through the RNC communication section 304.

According to the second embodiment, when the first WLAN access network 103*a* detects that communication with the terminal 101 becomes impossible, packet transmission is stopped as described above. Therefore, consumption of the bandwidth of the link between the packet data gateway 108 and the first WLAN gateway 105*a* is reduced. Furthermore, the radio network controller 104 is notified of the stoppage of packet transmission, the active set is changed to the semi-active set, the radio network controller 104 notifies the packet controller 106 that there is no active set, and the packet controller 106 disconnect the connection to the radio network controller 104. Thus, resource consumption at nodes on the mobile communication network and the wireless LAN can be reduced.

Third Embodiment

In a third embodiment, an example is shown in which when a terminal that performs packet communication is powered on in the area covered by a wireless LAN, the terminal is registered with a mobile communication network and a wireless LAN network and starts communication and, as a result, switching time in a connection setup process performed when the terminal moves from the wireless LAN coverage area to the mobile terminal coverage are is reduced. The entire block configuration and protocol stacks in the third embodiment are the same as those in the first embodiment unless otherwise stated.

While it is assumed in the first embodiment that a terminal has already established connection with a packet controller 106 in the initial state and then moves from the mobile communication network to a wireless LAN, it is assumed in a third embodiment that a terminal attempts to establish connection to a wireless LAN immediately after its power on. Therefore, unlike the first embodiment, the third embodiment assumes that set up for connection to a mobile communication network is not yet completed at the packet controller 106.

Figure 14:
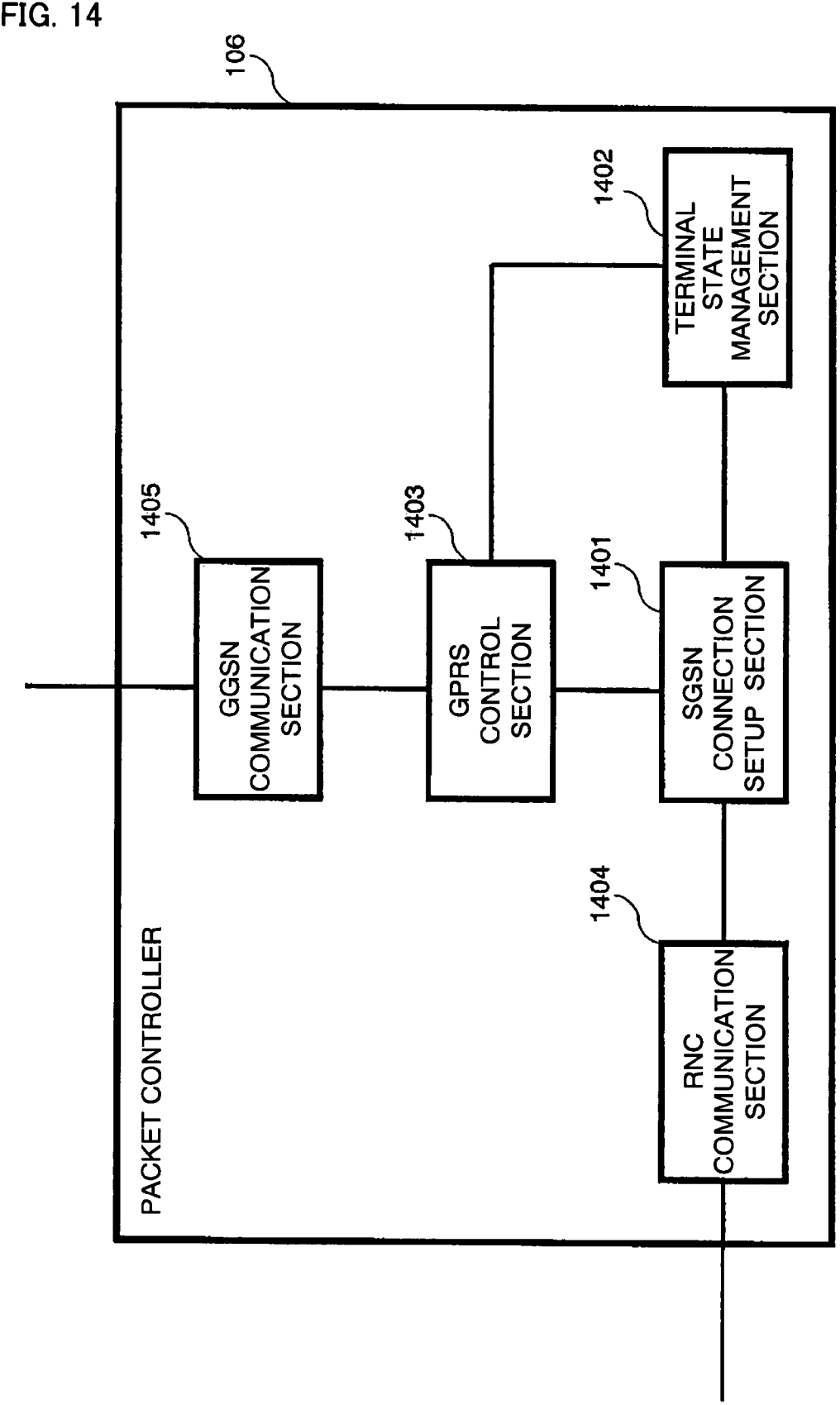
FIG. 14 is a block diagram showing an internal configuration of a packet controller according to the present embodiment.

FIG. 14 is a block diagram showing an internal configuration of a packet controller 106 according to the third embodiment. In FIG. 14, an SGSN connection setup section 1401 controls the packet controller 106 and has the function of performing a connection setup process that is performed by SGSN in a 3GPP network. A terminal state management section 1402 stores information about the state of a terminal required by the SGSN connection setup section 1401 to perform the control. For example, the terminal state management section 1402 stores primary PDP contexts of GPRS defined in 3GPP TS 23.060 and TS 29.060. A GPRS control section 1403 has the function of performing GPRS protocol conversion. While SGSN in 3GPP also performs other services such as position management services that does not relate to the present embodiment, description of configurations that provides such services will be omitted.

An RNC communication section 1404 and a GGSN communication section 1405 are means for communicating with a wireless network controller 104 and a mobile network packet gateway 107, respectively, and includes software and hardware for protocol stacks and network interfaces.

In the third embodiment, an ATTACH process will be described in which a communication link from a wireless LAN to a packet controller 106 of a mobile communication network is established and a terminal 101*c* uses the communication link to register information for packet connection in the packet controller 106.

Figure 15:
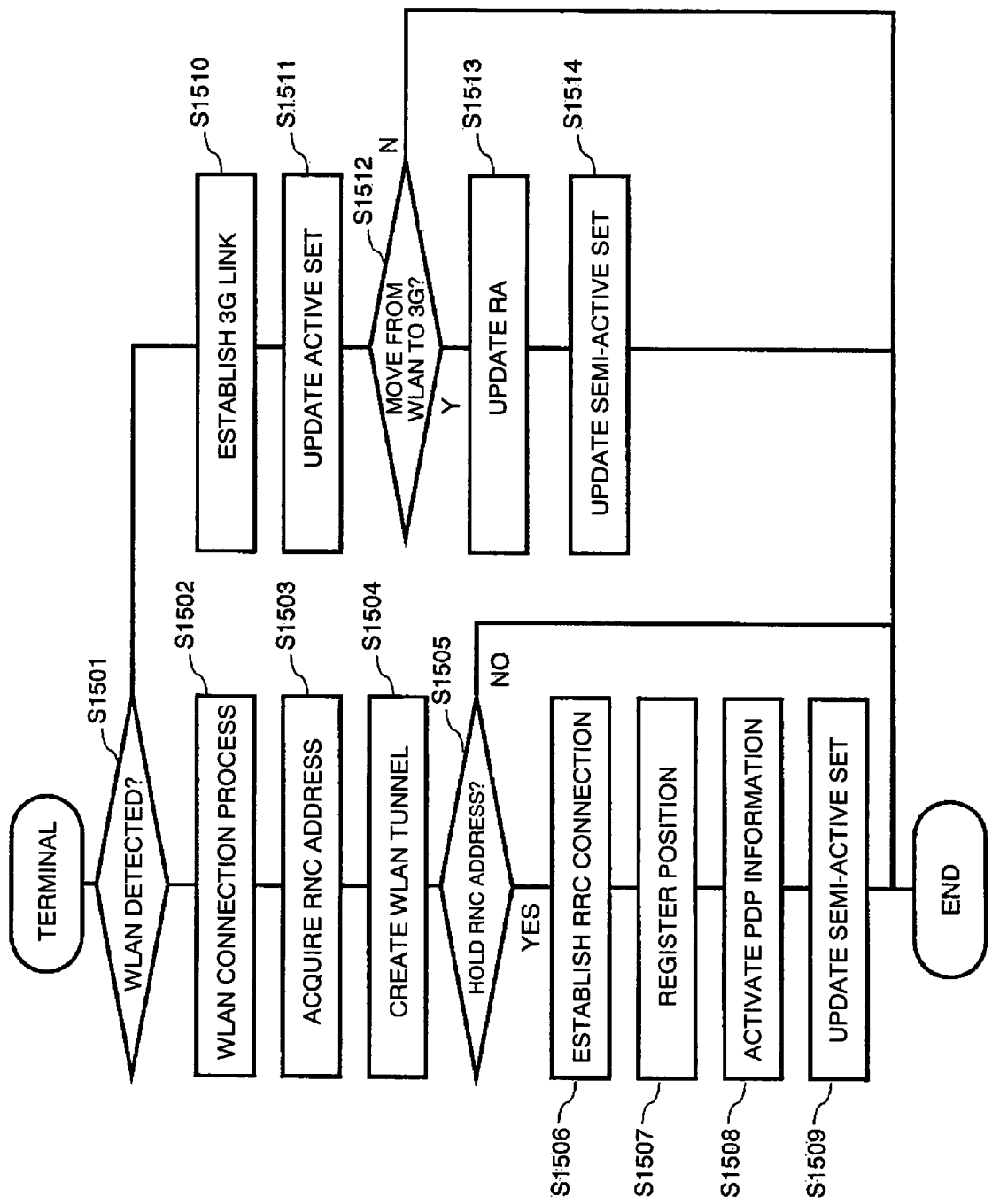
FIG. 15 shows operation of a mobile terminal.
Figure 22:
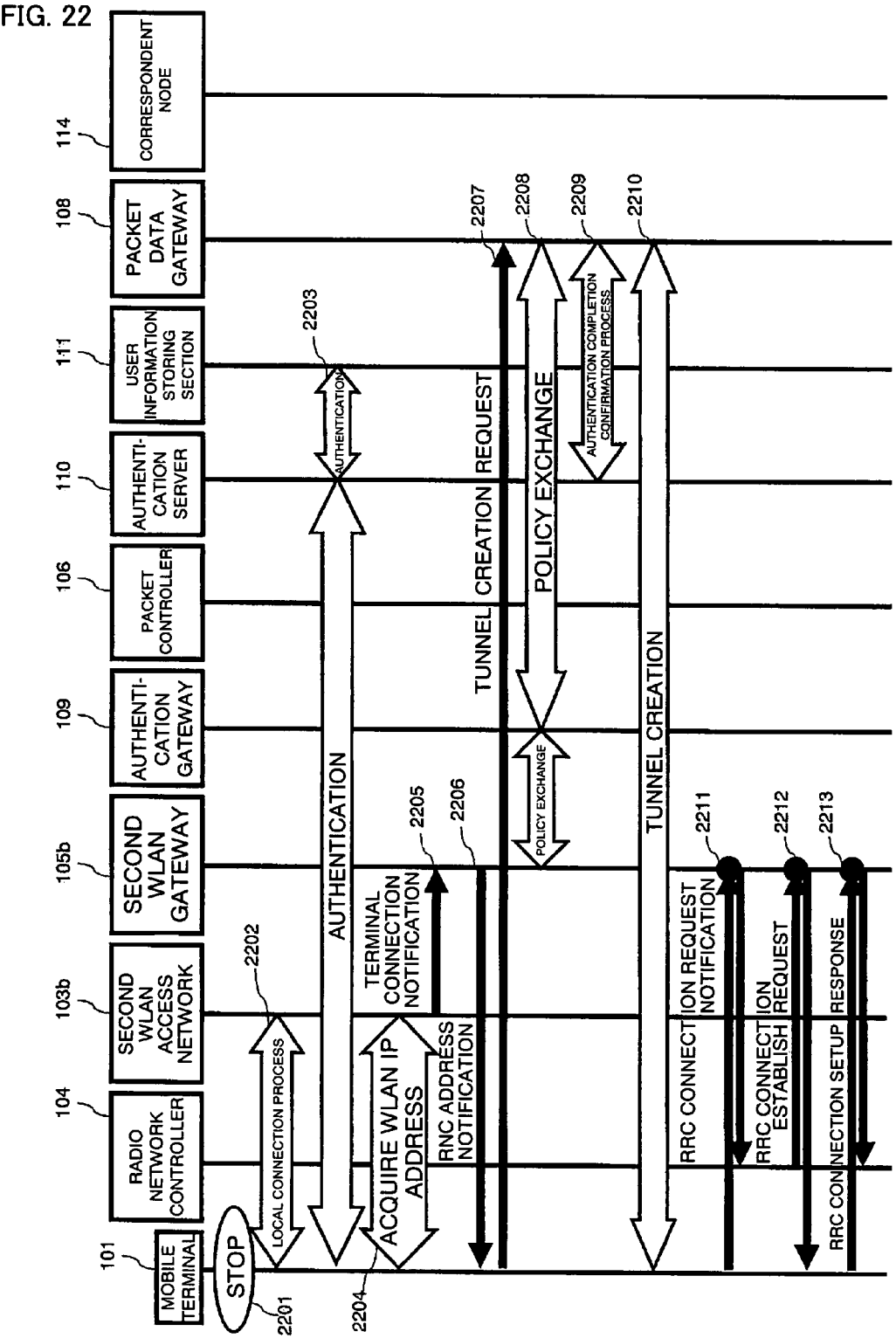
FIG. 22 shows a process for a mobile terminal to connect to a wireless LAN network.
Figure 23:
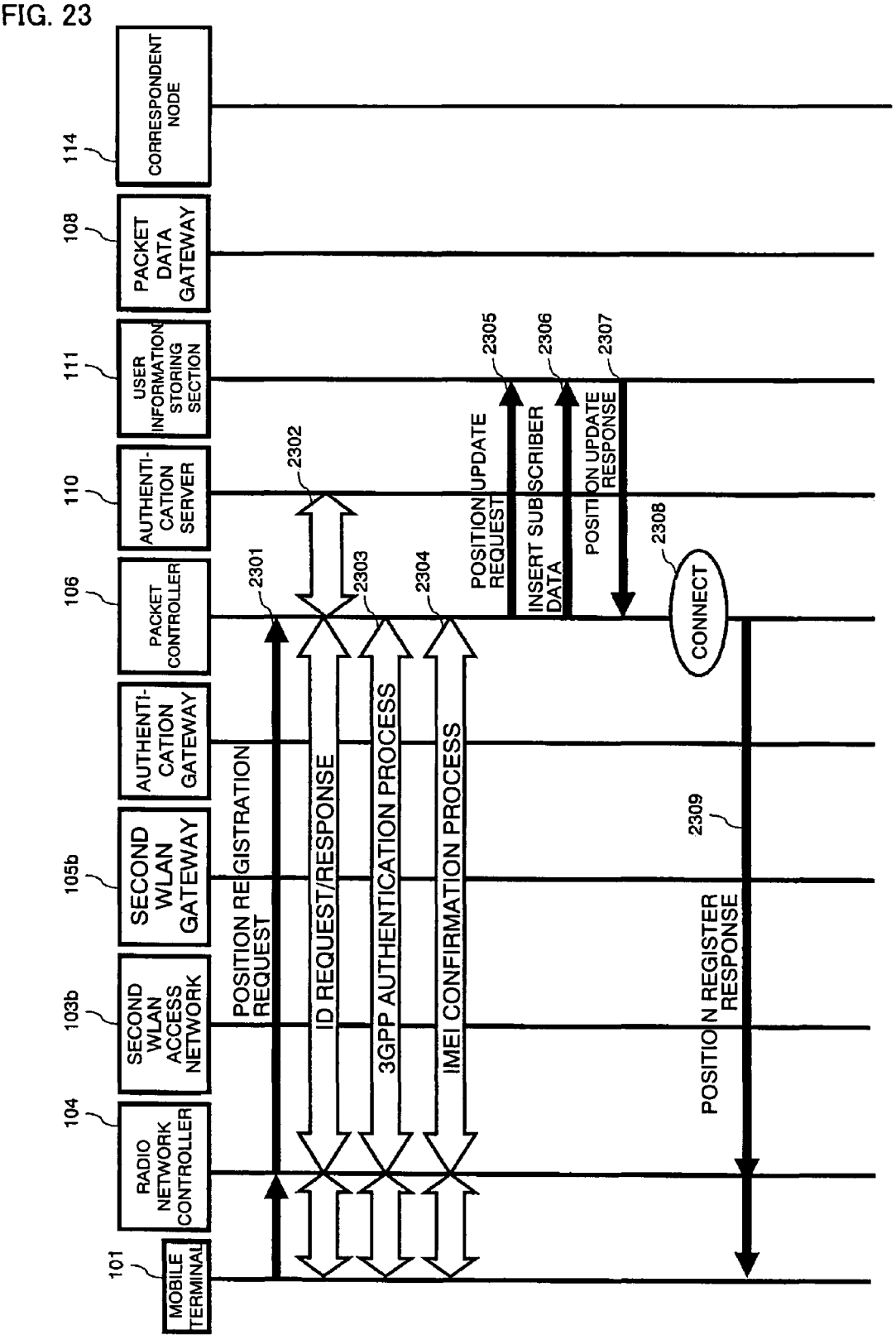
FIG. 23 shows a process for a mobile terminal to connect to a wireless LAN network.
Figure 24:
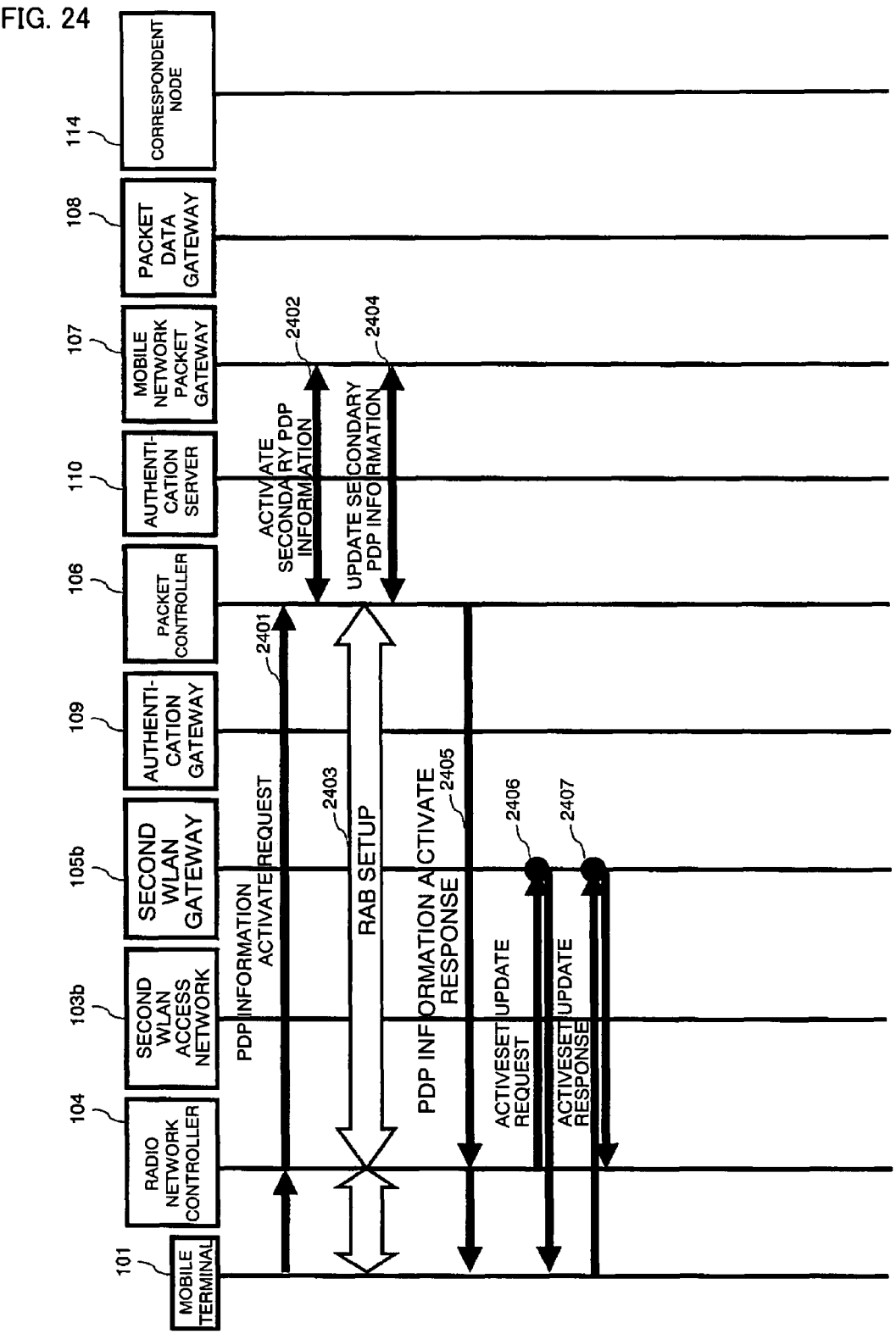
FIG. 24 shows a process for a mobile terminal to connect to a wireless LAN network.

FIG. 15 shows operation of the terminal 101*c*. FIGS. 16 to 21 show fields indicating data about a terminal held by each node. FIGS. 16, 17, 18, 19, 20, and 21 show information about the terminal stored in the terminal 101*c*, the radio network controller 104, a WLAN gateway 105, the packet controller 106, the mobile network packet gateway 107, and a packet data gateway 108. In these figures, state (a) indicates information contained after the tunnel creation process shown in FIG. 22 is completed, state (b) indicates after WLAN connection setup is completed, and state (c) indicates after switching from the WLAN to the mobile communication network is completed. FIGS. 22 to 24 show an operation of the ATTACH process performed for the terminal 101*c* on the wireless LAN.

FIG. 22 shows a process in which the terminal 101*c* connects to the wireless LAN and the terminal 101*c* sets up connection with radio network controller 104 through the wireless LAN.

In the third embodiment, the terminal is not powered on, that is, the terminal 101*c* is in a shutdown state 2201 until the process starts. A packet controller 106 does not contain information about the terminal 101*c* in the shutdown state and the mobility management (MM) of GPRS is in the PMM-detached state.

When the terminal 101*c* is powered on, the terminal 101*c* determines whether a wireless LAN or a mobile communication network is detected (S1501 in FIG. 15). When the terminal 101c detects a wireless LAN, the terminal 101c performs a process for connecting to the wireless LAN (S1502). The terminal 101c thus performs the sequence from the local connection process 2202 to the wireless LAN IP address acquisition 2204 shown in FIG. 22. This sequence is the same as the sequence from the local connection process 2802 to the wireless LAN IP address acquisition 2804 in the conventional art.

After a second WLAN access network 103b provides an IP address for local connection to the terminal 101c, the second WLAN access network 103b outputs a terminal connection notification 2205 to second WLAN gateway 105b to indicate that the terminal 101c has been connected. This notification is the same as the terminal connection notification 1106 in the first embodiment. In the third embodiment, information about a terminal that first accesses a wireless LAN is output as a terminal connection notification 2205 from the WLAN access network that detects the connection to its associated WLAN gateway. The timing of output varies depending on whether the terminal 101c has already acquired an IP address. In the first embodiment, the terminal 101c has already an IP address of the network that outputs the notification and therefore the terminal connection notification 1106 is output immediately after the completion of the wireless LAN connection process. In the third embodiment, on the other hand, the IP address on the network that outputs the notification has not yet determined, therefore the notification is output after the IP address is provided.

When the terminal connection notification 2205 arrives at the second WLAN gateway 105b, the second WLAN gateway 105b refers to a terminal state management section 1402 to determine whether the terminal 101c is connected to a mobile communication network. Since the terminal 101c in this example was in the shutdown state before connecting the WLAN, information about the terminal 101c is not stored in the terminal state management section 1402. Therefore, the second WLAN gateway 105b determines that the terminal 101c is a new terminal that is not connected to a mobile communication network. The second WLAN gateway 105b outputs an IP address of the radio network controller 104 associated with a first WLAN gateway as an RNC address notification 2206 to the terminal 101c.

Returning to FIG. 15, the terminal 101c receives the RNC address notification from the second WLAN gateway 105b (S1503). The terminal 101c is ready to communicate with a radio network controller 104 while the terminal 101c is in a mobile communication terminal. However, when the terminal 101c is in an area covered only by a wireless LAN, the terminal 101c must communicate with the radio network controller 104 through the wireless LAN. Therefore, the second WLAN gateway 105b uses the RNC address notification 2206 to provide the IP address of the radio network controller 104 and the cell number (such as a cell identity) of the WLAN area. Because the terminal 101c resides in the wireless LAN, the second WLAN gateway 105b does not perform further processing for the wireless LAN. In the third embodiment, because the terminal 101c is at first in the shutdown state, the RNC address notification is required in order to provide connection between the radio network controller 104 and the terminal 101c through the wireless LAN. If, as in the first embodiment, the terminal 101c moves from a mobile communication network to a wireless LAN, the RNC address notification is not required because the radio network controller 104 provides the IP address of the radio network controller 104 to the terminal 101c through a base station 102 while the terminal 101c is in the area of the mobile communication network.

When the terminal 101c receive the IP address of the radio network controller 104, the terminal 101c performs a process for creating a tunnel between the terminal 101c and the packet data gateway 108 (S1504). The sequence from the tunnel setup notification 711 to the tunnel creation 714 shown in FIG. 22 is performed. The sequence is the same as the sequence from the tunnel creation request 1605 to the tunnel creation 1608 in the conventional art.

Returning to FIG. 15, after completion of the tunnel creation process, the terminal 101c determines whether the terminal 101c hold the IP address of the radio network controller 104 (S1505). Since the terminal 101c in the third embodiment holds the IP address, the terminal 101c establish RRC connection to set up UTRAN (S1506).

Referring to FIG. 22, a sequence for establishing RRC connection will be described. First, the terminal 101c request the radio network controller 104 for RRC connection over the wireless LAN by means of an RRC connection request notification 2211. The request corresponds to RRC CONNECTION REQUEST in TS 25.331. Here, the terminal 101c sends the ID (such as IMSI) of itself and a cell number to the radio network controller 104 through the second WLAN gateway 105b. Whereas these signals are transmitted through a common channel or separate channels in a mobile communication network, they are transmitted as IP packets in the third embodiment because they pass through the wireless LAN network. Relay points are indicated by filled circles in FIG. 22.

In response to the RRC connection request notification 2211, the radio network controller 104 uses the terminal information management section 202 to determine whether the ID of the terminal 101c is an ID of a new terminal 101c. In the present embodiment, the terminal 101c is in the shutdown state 2201 at first and therefore is judged as being a new terminal. Since the terminal 101c is new, the radio network controller 104 creates an entry for the terminal 101c in the terminal information management section 202 and determines the position of the terminal 101c indicated by a cell. In the present embodiment, the terminal 101c is in cell L2 and therefore cell L2 is registered as the position of the terminal 101c.

Then, the radio network controller 104 sends an RRC connection setup request 2212 (RRC CONNECTION SETUP in 3GPP TS 25.331) for establishing RRC connection. In response to this, the terminal 101c returns an RRC connection setup response 2213 (RRC CONNECTION SETUP COMPLETE in 3GPP TS 25.331) to the radio network controller 104 through the radio network controller 104 because the terminal 101c is ready for establishing RRC connection. As a result of the process above, the terminal 101c is registered with the UTRAN controlled by the radio network controller 104. This state is shown by state (a) in FIGS. 16 to 21. In this state, the terminal 101c is not registered with a packet controller 106 nor a mobile network packet gateway 107.

Returning to FIG. 15, after registration with the UTRAN, the terminal 101c performs a process for registering its position in a packet controller 106 (S1507). This process is shown in the sequence diagram of FIG. 23. The GPRS specification in 3GPP TS 23.060 and TS29.060 specifies that an ATTACH process is performed for registering the position in SGSN. The third embodiment differs from this specification of 3GPP in the following two ways. First, a signal to SGSN is relayed by the second WLAN access network 103b and the second WLAN gateway 105b of the wireless LAN network, and the radio network controller 104. Second, in 3G, ATTACH processes for registering the position with the circuit-switched domain of the core network of a mobile communication network and the packet-switched domain are integrated. In the third embodiment, an ATTACH to the packet-switched domain is performed in order to ATTACH to the wireless LAN network.

Regarding to the first difference, the terminal 101c uses Direct Transfer (Initial Direct Transfer, Uplink Direct Transfer, and Downlink Direct Transfer in 3GPP TS 25.331), which transfers signals to a core network through RRC since the terminal 101c does not have the address of the packet controller 106. When a signal directed to the packet controller 106 is input from the terminal 101c using Direct Transfer, the radio network controller 104 determines whether the signal is Direct Transfer, and transfers the signal from the terminal 101c to the packet controller 106 by using RANAP (RAN Application Part, which is a protocol between a core network and RNC in 3GPP defined in 3GPP TS 25.413). On the other hand, the packet controller 106 uses RANAP for transferring a signal directed to the terminal 101c. The relay function of the radio network controller 104 is represented by separations of arrows indicating the position registration request 2301 and response in FIG. 23. Packets to be sent from the terminal 101c to the radio network controller 104 are relayed by the second WLAN access network 103b and the second WLAN gateway 105b. While the relay points are represented by solid circles in FIG. 22, such indications are omitted from FIG. 23 and FIG. 24 described later.

It should be noted that instead of using Direct Transfer for relaying signals between the terminal 101c and the packet controller 106, items of information such as a header or tailer indicating the signal is a control signal relating to GPRS may be contained in each message and the radio network controller 104 may relay signals judged to be signals relating to the packet controller 106 such as GPRS by means of the items of information. Since this method also enables communication between the terminal 101c and the packet controller 106, advantageous effects of the third embodiment can be achieved.

Communication between the packet controller 106 and the terminal 101c can also be enabled by providing the address of the packet controller 106 to the terminal 101c without explicitly relaying by the radio network controller 104. Advantageous effects of the third embodiment can be achieved by this method as well. Excluding the differences described above, the process shown in FIG. 23 is the same as the ATTACH process in TS 23.060.

A sequence for registering the position of the terminal 101c will be described below. First, terminal 101c sends a position registration request 2301 to the packet controller 106 to request the packet controller 106 to register its position. This corresponds to Attach Request in TS 23.060. When the packet controller 106 receives the position registration request 2301, the following four processes are performed between the terminal 101c and the packet controller 106. First, (1) if the terminal 101c is out of the area controlled by the packet controller 106, an ID request/response process 2302 is performed in which the packet controller 106 requests the terminal 101c to send an ID such as IMSI of the terminal 101c and the terminal 101c responds to the request. This corresponds to Identification Request and Identification Response in TS 23.060. Then, (2) a 3GPP authentication process 2303 is performed in which the packet controller 106 authenticates the terminal 101c. This corresponds to Authentication and Ciphering Request, and Authentication and Ciphering Response in TS 23.060 transferred between SGSN and UE. Send Authentication Info and Send Authentication Info Ack signals are transmitted between SGSN and HLR. Then, (3) an IMEI confirmation process 2304 for authenticating the terminal 101c is performed. This sequence is not essential and can be omitted. This corresponds to Identity Request and Identity Response in TS 23.060. Then, (4) a position update process is performed for inputting positional information in a user information storing section 111. The position update process is performed by communicating a position update request 2305, a subscriber data insert 2306, and a position update response 2307 between the packet controller 106 and the user information storing section 111. The position update request 2305, subscriber data insert 2306, and position update response 2307 correspond to Update Location, Insert Subscriber Data, Insert Subscriber Data Ack, and Update Location Ack in TS 23.060. After completion of these processes, the packet controller 106 sends a position registration response 2309 to the terminal 101c to indicate the completion of the ATTACH.

Returning to FIG. 15, after the position registration process (S1507), the terminal 101c performs a process for activating PDP information (S1508). FIG. 24 shows a process for initializing PDP information (PDP (Packet Data Protocol which is IP in this embodiment) context in TS 23.060) about the terminal 101c in the packet controller 106.

First, the terminal 101c sends a PDP information activate request 2401 to the packet controller 106. Here, the terminal 101c has already obtained a remote IP address used on a public packet-switched network 112. Therefore, the IMSI 1601 (ID1), user ID 1602 (ID1@iw.operator.com), user profile 1604 (UP1), remote IP address 1608 (10.2.2.2), and PDG transport 1610 (IP address "10.1.1.1" and port "10001") of the terminal 101c is contained in the PDP information activate request. With this, the terminal 101c is registered. Since ATTACH has been completed, the mobility management information becomes PMM-attached.

The PDP information active request 2401 is input in an RNC communication section 1404 inside the packet controller 106 and an SGSN setup section 1401 analyses the request. Since the request is the PDP information activate request 2401, the information in the request is registered in a terminal state management section 1402.

The packet controller 106 generates a request for secondary PDP information activate 2402 including the IP address of the terminal 101c and sends the request to the mobile network packet gateway 107 through a GPRS control section 1403 and a GGSN communication section 1405. The secondary PDP information activate request 2402 contains the IMSI 1901 (ID1), user ID 1902 (ID1@iw.operator.com), and IP address of PDG. In the third embodiment, APN (Access Point Name, iw.operator.com) is omitted because it is contained in the user ID. However, APN may be contained in the secondary PDP information activate 2402. Advantageous effects of the third embodiment can be achieved in that case as well.

Figure 19:
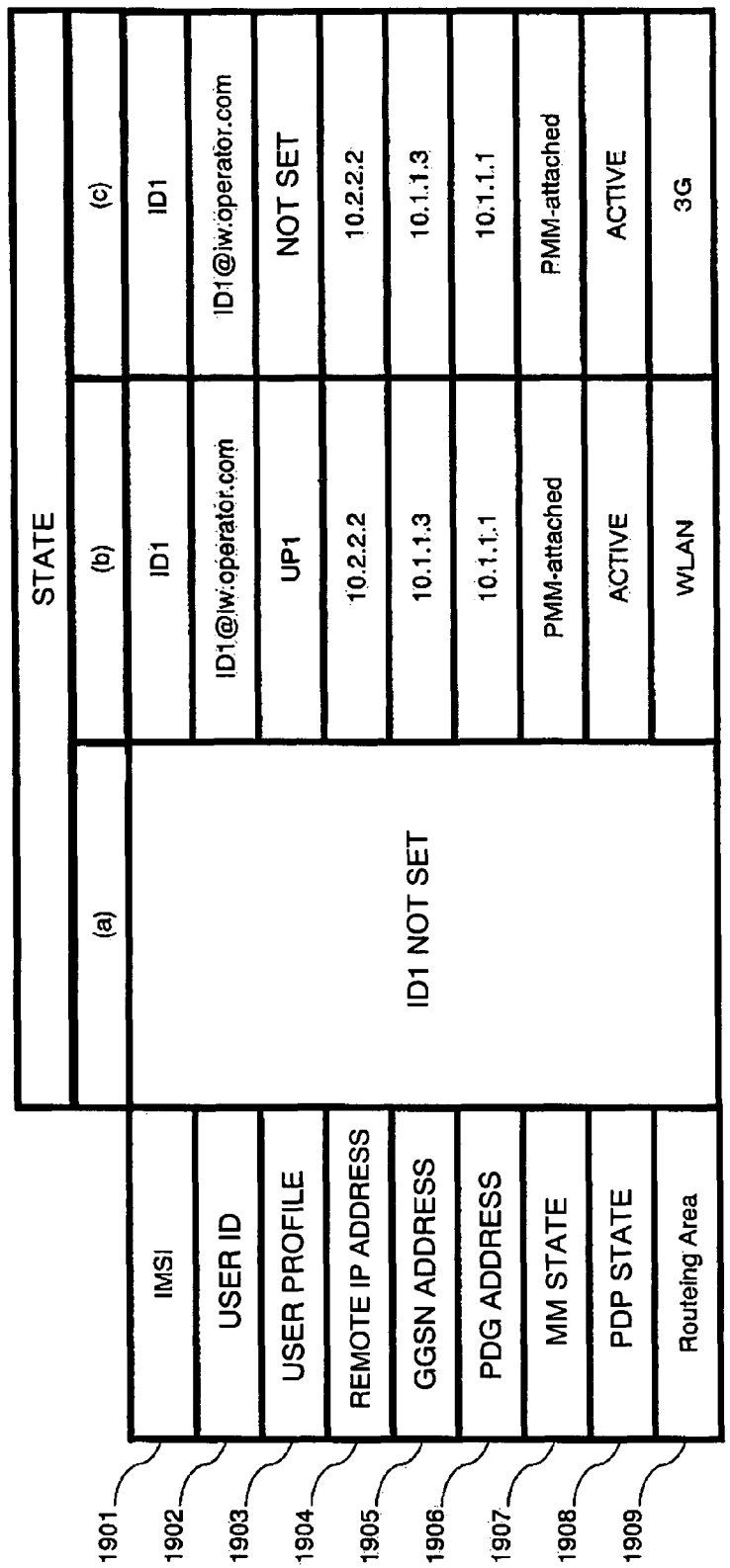
FIG. 19 shows fields of data held by a packet controller.

The GGSN address 1904 and PDG address 1905 in FIG. 19 indicate the addresses of the mobile network packet gateway 107 and the packet data gateway 108, respectively. MM state 1906 and PDP state 1907 indicate the state of mobility management (MM) in GPRS and the state of PDP. The MM state 1906 indicates PMM-detached after the mobile terminal is detached, PMM-attached after position registration is completed. PDP state indicates the presence or absence of communication, that is, ACTIVE while communication is being performed, and INACTIVE while there is not ongoing communication. The routing Area 1909 contains the ID of a routing area of the terminal 101. In this embodiment, cells M1 and M2 of the mobile communication network constitute Routing Area 3G and cells L1 and L2 of the wireless LAN network constitute Routing Area WLAN.

Figure 20:
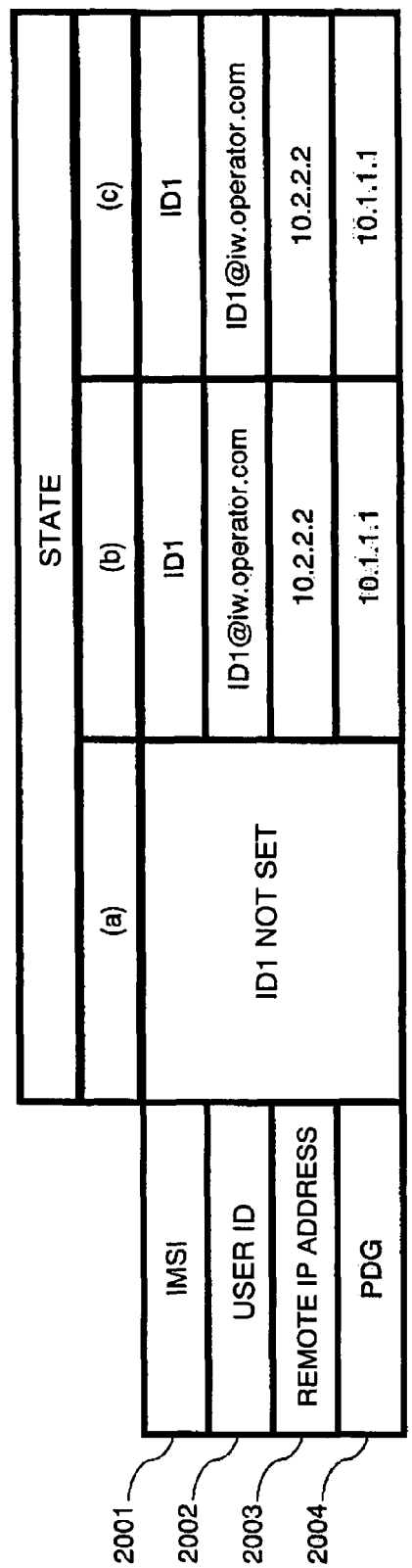
FIG. 20 shows fields of data held by a mobile packet gateway.

In response to the secondary PDP information activate request 2402, the mobile network packet gateway 170 generates secondary PDP information concerning the terminal 101c in the mobile network packet gateway 107. FIG. 20 shows secondary PDP information fields. The secondary PDP information corresponds to Secondary PDP context in GPRS and is used for managing information about terminals.

Then, the packet controller 106 performs RAB setup 2403 for establishing an RAB (Radio Access Bearer), which is a communication cannel for user data. Here, a process corresponding to RAB Setup Request and RAB Setup Response in RANAP in 3GPP TS 25.413 and RADIO BEARER SETUP and RADIO BEARER SETUP RESPONSE in TS 25.331 is performed.

After completion of this process, the packet controller 106 performs a secondary PDP information update process 2404 for the mobile network packet gateway 107. As a result, establishment of RAB is reflected in the secondary PDP information concerning the terminal 101c in the mobile network packet gateway 107. After completion of the process, the packet controller 106 sends a PDP information activate response 2405 to the terminal 101c.

With the completion of the sequence, the connection relating to cell L2 is registered in the UTRAN and the packet controller 106. Since in the present embodiment, packet data is transferred over the wireless LAN network and the mobile network packet gateway 107 is not used for packet relay, the secondary PDP information activate 2402 and the secondary PDP information update 2404 can be omitted.

Returning to FIG. 15, the terminal 101c performs a process for registering cell M1 as semi-active set (S1509) in order to perform a process for location prediction. After connection relating to the terminal 101c is established, the radio network controller 106 searches a cell position management section 203 for cells adjacent to cell L2. As a result, only cell M1 is retrieved. The radio network controller 106 starts a process for updating the active set in order to register cell M1. While all adjacent cells are included in the semi-active set in this embodiment, only adjacent cells into which the terminal 101c is likely to move may be included in the semi-active cell on the basis of more detailed information about communication conditions.

In the semi-active set registration process, the radio network controller 104 sends an Active Set Update request (Active Set Update in 3GPP RRC) 2406 containing cell L2, which is an active set cell, and cell M2, which is a semi-active set cell, to the terminal 101c over the wireless LAN network as shown in FIG. 24. In response to this, the terminal 101c determines that adding these items causes no problem and adds cells L2 and M1 to its active set and semi-active set, respectively. The terminal 101b sends an Active Set Update response (ACTIVE SET UPDATE COMPLETE in 3GPP TS 25.331) 2407 to the radio network controller 104 to notify the radio network controller 104 of the completion of active set update. After completion of setting of the active set on the terminal 101c, the radio network controller 104 changes the active set and the semi-active set of the terminal 101c in the terminal information management section 202 to L2 and M1, respectively. This completes registration of the data concerning the terminal 101c in the UTRAN controlled by the radio network controller 104.

A process performed when the terminal 101c thus connected to the WLAN moves from the WLAN to a mobile communication network area will be described below.

Figure 25:
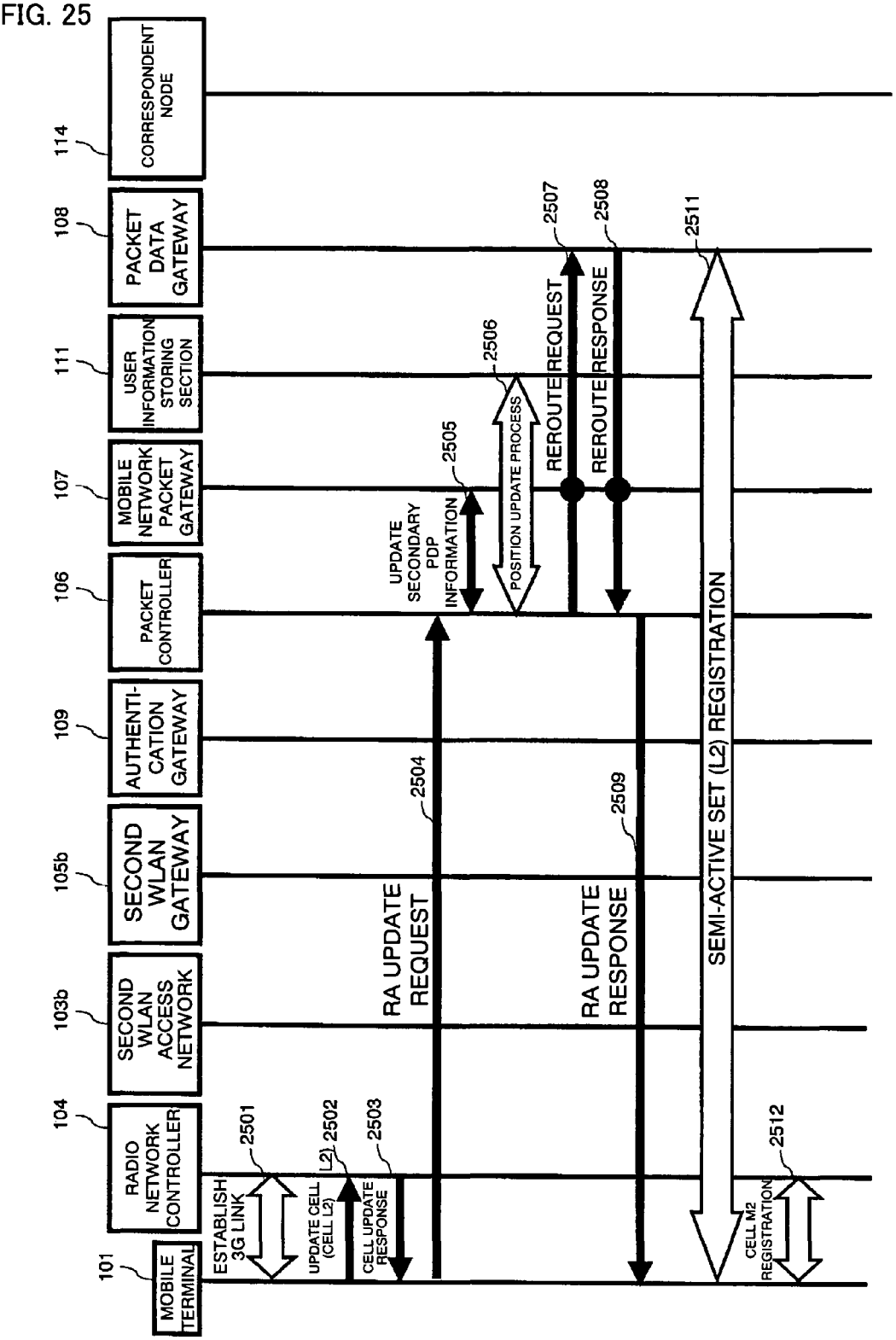
FIG. 25 shows a process performed when a mobile terminal handovers from the wireless LAN to a mobile communication network.
Figure 26:
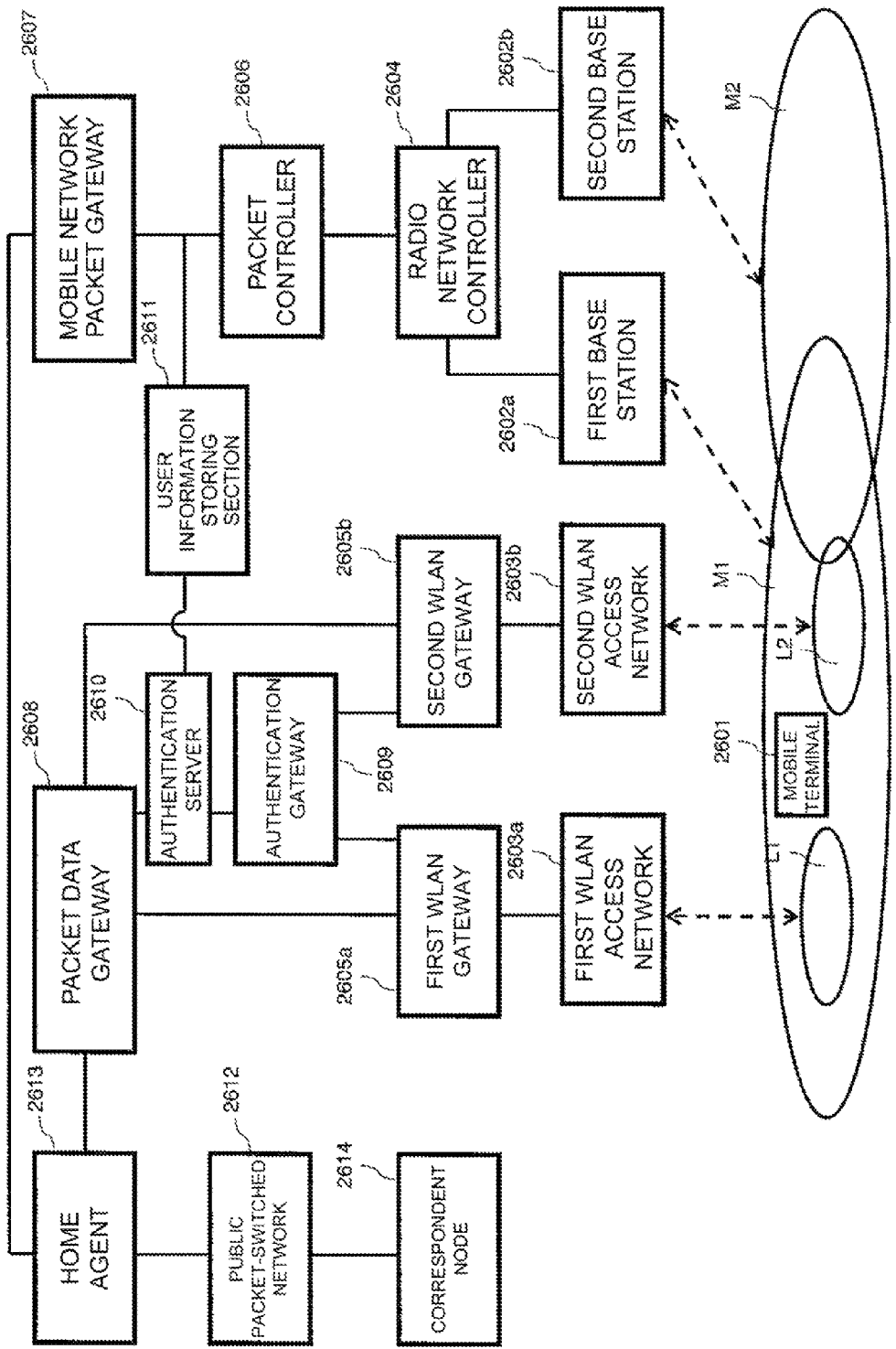
FIG. 26 shows a configuration of a radio communication system according to the prior art.
Figure 27:
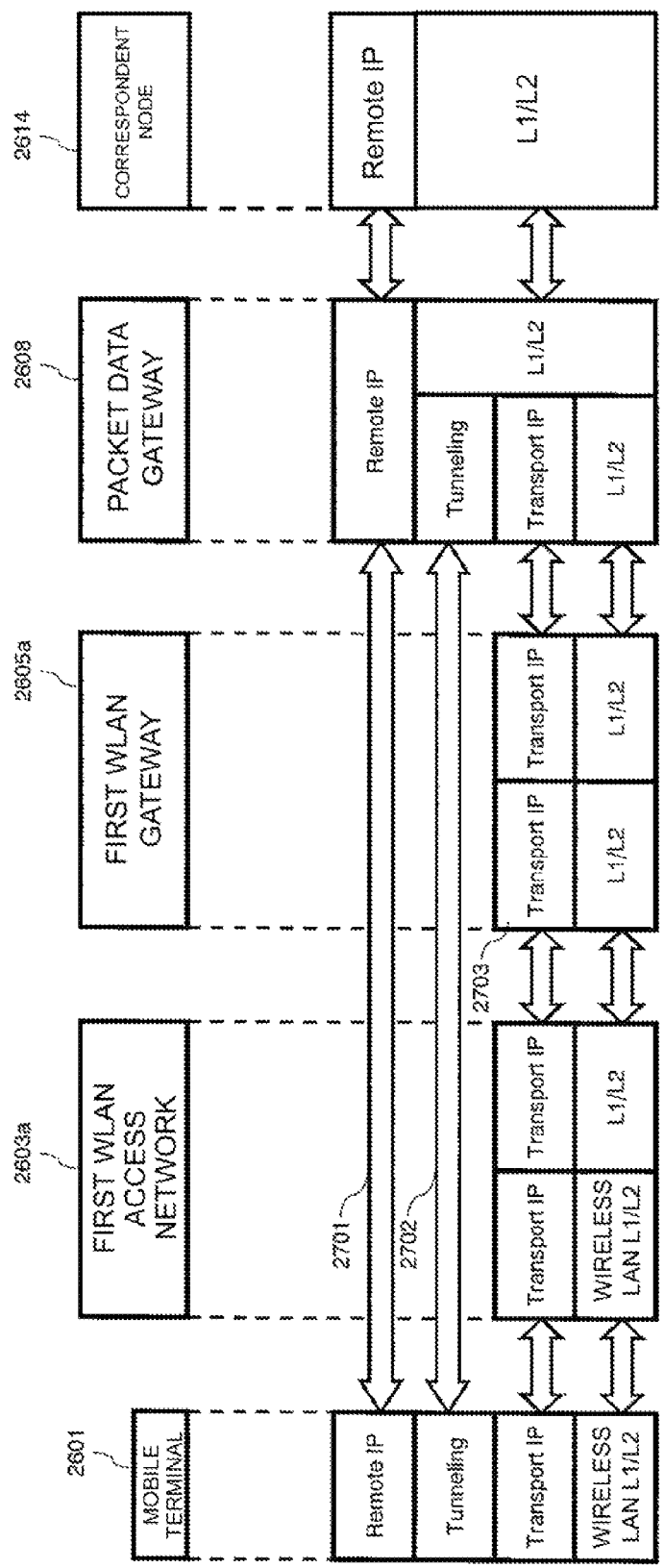
FIG. 27 shows protocol stacks relating to user data according to the conventional art.
Figure 28:
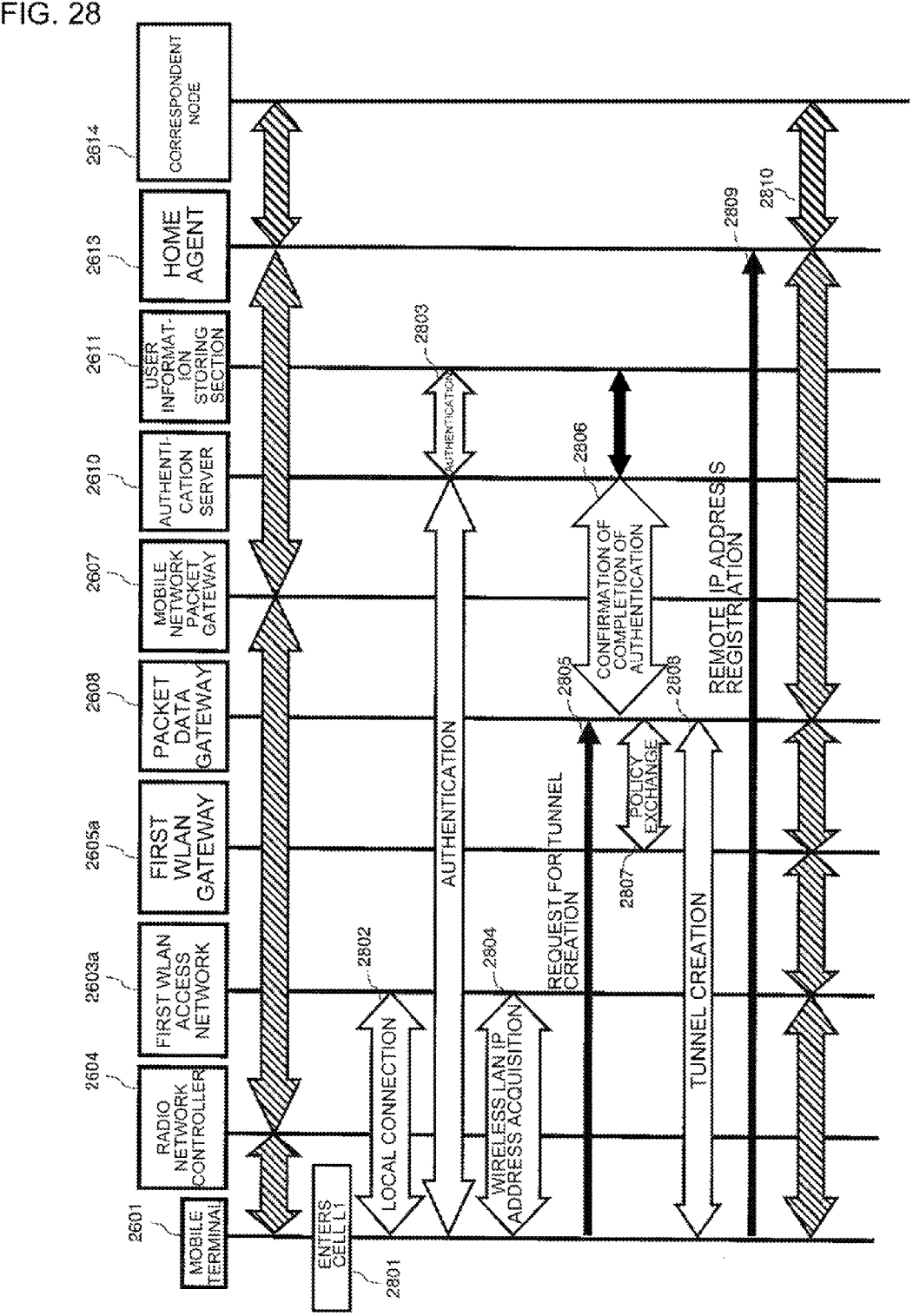
FIG. 28 shows a sequence of operation according to the conventional art.
Figure 29:
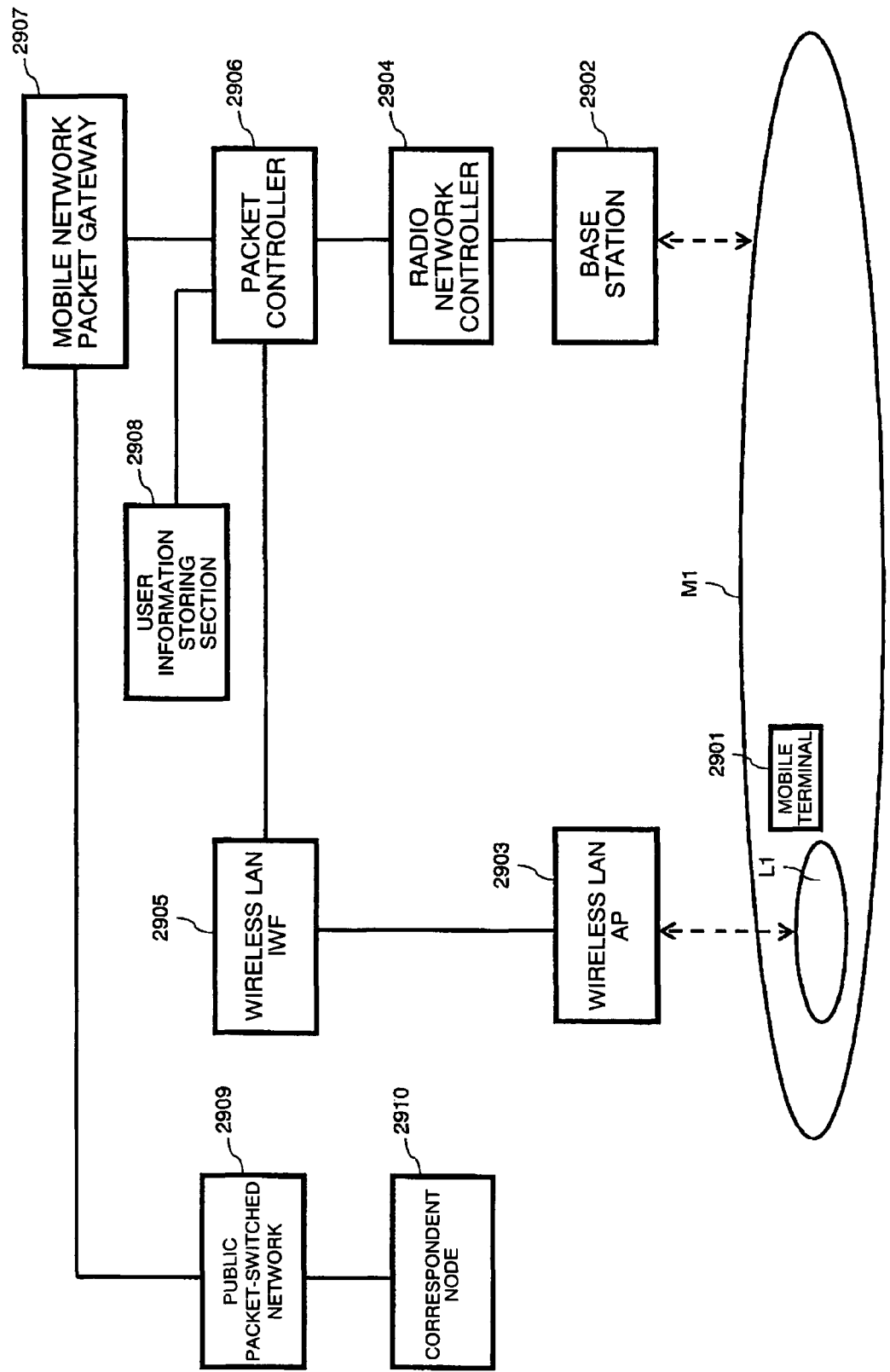
FIG. 29 shows a configuration of a radio communication system according to the conventional art.

FIG. 25 shows a process for switching connection of the terminal 101c to a mobile communication network which is performed when the terminal 101c in cell L2 of the wireless LAN network moves to cell M1 while communicating with the wireless LAN network after connection over the wireless LAN network has been established.

Referring to FIG. 15, the terminal 101c determines whether it has detected a wireless LAN or a mobile communication network. When the terminal 101c enter cell M1, the terminal 101c detects the mobile communication network, therefore a process for establishing a 3G link is initiated and a link between a radio network controller 104 and the terminal 101c through a base station 102a is established (S1510). Here, Radio Link Setup procedure described in NBAP (Node B Application Part) in 3GPP TS 25.433 is used.

Then, the terminal 101c performs an Active Set update process for updating cell location (S1511). In this process, first the terminal 101c sends a cell update request 2502 to the radio network controller 104. In this embodiment, the cell update request 2502 is the Cell Update in 3GPP TS 25.331. However, the SRNS Relocation procedure may be used if switching to another radio network controller 104 is involved, or the URA (UTRAN Registration Area) Update procedure may be used if the position of the terminal 101c is tracked on URA level, including the case of no communication being performed. In either case, the same advantageous effects as those of the present embodiment can be achieved.

When the radio network controller 104 receives the cell update request 2502, the radio network controller 104 change the active set and the semi-active set in the terminal information management section 202 to M1 and L1, respectively, and sends a cell update response 2503 to the terminal 101c. With this, the movement of the terminal 101c into cell M1 is registered in the radio network controller 104.

Returning to FIG. 15, the terminal 101c determines whether it has moved to the mobile communication network while still connecting with the wireless LAN network (S1512). Since the mobile terminal 101c detected the mobile communication network while connecting with the wireless LAN network in this embodiment, the terminal 101c updates RA (S1513). In the RA update process, the terminal 101c registers with the packet controller 106 and switches packet transfer link from the wireless LAN network to the mobile communication network. With this, information in the terminal state management section 1402 in the packet controller 106 changes from WLAN to 3G.

The RA update sequence will be described with reference to FIG. 25. First, the terminal 101c sends an RA update request 2504 for updating RA and for registering positions of both packet-switched domain and circuit-switched domain to the packet controller 106. On receipt of the RA update request 2504, the packet controller 106 performs a secondary PDP update process 2505 for the mobile network packet gateway 107 and a position information update process 2506 for the user information storing section 111. In the secondary PDP information update process 2505, parameters for connecting to the mobile communication network are registered in the mobile network packet gateway 107 as in the secondary PDP information update process 2404 described above. In the position information update process 2507, the entry of the terminal 101c in the area covered by the mobile communication network is registered in the user information storing section 111 through the same three steps, namely a position update request 2305, a subscriber data insert 2306, and a position update response 2307, that have been described above.

After completion of the sequence, the packet controller 106 sends to the packet data gateway 108 a reroute request 2507 for rerouting packet data sent from the correspondent node 114 to the terminal 101c through the wireless LAN network so as to be transmitted through the mobile communication network. The packet controller 106 and the packet data gateway 108 are not directly interconnected in FIG. 1. The mobile network packet gateway 107 relays the data since the data is transmitted as IP packet.

After the switching, packets can be transferred through the mobile network packet gateway 107 to the packet data gateway 108 using any of several IP-based transmission methods. Tunneling methods such as Mobile IP, GTP (GPRS Tunneling Protocol), and IP-in-IP can be used. If any of the tunneling methods are used, a node on the originating side (packet data gateway 108 or mobile network packet gateway 107) should perform encapsulation to add a selected protocol portion to the original packet header and a node on the destination side should decapsulate the capsule to extract the original data.

Therefore, the IP address of the mobile network packet gateway 107 and, if identifiable, the identifier of a tunneling method, are contained in the reroute request 2507. The identifier and the IP address of the mobile network packet gateway 107 are used by the packet data gateway 108 to change the tunnel creation method. After completion of tunnel setup, the packet data gateway 108 changes U-plane according to the reroute request 2507 and sends a reroute response 2508 to the packet controller 106.

After completion of the secondary PDP information update process 2505, position update process 2506, reroute process 2507, 2508, the packet controller 106 sends RA update response 2509 to the terminal 101*c* to indicate the completion of the process in the mobile communication network. This completes the registration process relating to cells M1 and L2.

While the cell update request 2502 is sent from the terminal 101*c* in this embodiment, it may be sent from the radio network controller 104 by using the Active Set Update procedure to achieve the same effect described above. If the radio network controller 104 has the capability of disassembling and reassembling packets, the mobile communication network and wireless LAN network can be used and connected at the same time.

Returning to FIG. 15, the mobile terminal 101*c*, which is in cell M1, registers cells adjacent to cell M1 as the semi-active set in the semi-active set update process (S1514) as in the first embodiment. The sequence for registering the semi-active set is represented by the Semi-active set (L2) registration process 2511 and the Cell (M2) registration process 2512 in FIG. 25. The Cell L2 registration process 2511 is the same as the process in the sequence from signal 704 to signal 716 in FIG. 7 and Cell M2 registration process is the same as the active set update process.

When the MM status of the terminal becomes PMM-Idle, the packet controller 106 deletes tunnels relating to the mobile network packet relay 107 and the packet data gateway 108. After deleting the tunnels, the packet controller 106 directs the radio network controller 104 to delete the registered active set in the terminal information management section 202 in the radio network controller 104.

The third embodiment described above have the advantageous effect of reducing the time required switching between a terminal and a wireless LAN because the same information can be registered when a terminal 101*c* on the wireless LAN network can be registered in the mobile communication network and the process for registration which would be performed when the terminal moves from the wireless LAN network to the mobile communication network area can be eliminated.

The embodiment also makes it possible that the radio network controller 104 controls the terminals that reside in the area only covered by a wireless LAN network, because the IP address of the radio network controller 104 is provided to the terminal 101*c* in the area covered by the wireless LAN to enable communication between the terminal 101*c* and the radio network controller 104.

Because a radio network controller 104 performs protocol conversion and relays signals between the terminal 101*c* and the packet controller 106, the terminal 101*c* can perform communication in a area covered by a wireless LAN network even if the terminal 101*c* does not hold the address of the packet controller 106, and can perform communication even if multiple packet controllers are connected to the same radio network controller 104.

When a terminal moves from a mobile communication network to a wireless LAN, the packet controller 106 sends a reroute request 2507 to the packet data gateway 108 to reroute packet data sent from the correspondent node 114. Therefore, the embodiment has the effect of reducing time required for switching as compared with the case where the terminal 101*c* registers with the packet data gateway 108 to reroute packet data.

While currently preferable embodiments of the present invention have been described, it will be understood that various modification can be made to the embodiments and it is intended to cover in the attached claims all such modifications and variations as fall within the true spirit and scope of the present invention.

A radio communication system according to the present invention has a configuration in which connection items of information required for a terminal capable of communicating with a mobile communication network and a wireless LAN network to communicate over the wireless LAN network are sent to the terminal among items of information input from a WLAN gateway that controls connection of one or more wireless LAN (Local Area Network) access networks. The radio communication system is useful as a radio communication system that provides seamless handover of packet communication between a mobile communication network and a wireless LAN.

The invention claimed is:

1. A radio communication system that enables communication between a mobile communication network and a wireless local area network, comprising:
    a terminal configured to communicate with the mobile communication network and the wireless local area network;
    a base station configured to wirelessly communicate with the terminal through the mobile communication network;
    a radio network controller configured to connect to one or a plurality of the base stations and control wireless connection of the terminal;
    a WLAN access network configured to wirelessly connect to the terminal through the wireless local area network;
    a wireless access gateway configured to connect to the radio network controller and one or a plurality of the WLAN access networks and control connection of a WLAN access network; and
    a packet data gateway configured to connect to the wireless access gateway and relay data from the wireless access gateway to a public packet-switched network,
    wherein the radio network controller selects one of the WLAN access networks which the radio network controller predicts the terminal is likely to move to and connect to based on positional information of the terminal, and outputs an authentication process request signal and a connection setup process request signal to the wireless access gateway that controls the selected WLAN access network, the wireless access gateway performs an authentication process for determining whether the terminal is permitted to use the selected WLAN access network and, if permitted, performs a process for setting up connection within the wireless local area network and outputs to the radio network controller a context required for the terminal to communicate on the wireless local area network, the process for setting up connection being required for the terminal to use the WLAN access network and being completed before the terminal enters a coverage area of and establishes a connection with the WLAN access network; and the radio network controller outputs the context to the terminal.

2. The radio communication system according to claim 1, wherein when the terminal to which the context has been input from the radio network controller enters an area covered by the WLAN access network, the wireless access gateway uses the context to establish connection with the terminal.

3. The radio communication system according to claim 1, wherein the radio network controller obtains network status information including a capacity, usage, or error information of one or a plurality of the base stations and one or a plurality of the WLAN access networks, and when the terminal resides in a position where the terminal is configured to communicate with a plurality of the base stations or the WLAN access networks at the same time, the terminal selects, on the basis of the network status information, one of the base stations and the WLAN access networks to communicate with.

4. The radio communication system according to claim 1, wherein when the terminal enters the WLAN access network, the wireless access gateway sends a packet reception relay notification notifying the packet data gateway that the terminal is configured to receive packets through the wireless local area network, and when the packet reception relay notification is input in the packet data gateway, the packet data gateway outputs data input from the public packet-switched network to the wireless access gateway.

5. The radio communication system according to claim 1, wherein the terminal and the radio network controller store an active cell set which is a set of identifiers of the base station or the WLAN access network with which the terminal is communicating and a predicted cell set which is a set of identifiers of the base station or the WLAN access network to which the terminal is predicted to connect to; and when the terminal communicates with the base station and the WLAN access network at the same time and an error rate in communication with the WLAN access network is less than or equal to a predetermined value, the radio network controller transfers the identifiers of the base station included in the active cell set to the predicted cell set, notifies the wireless access gateway of the transfer of the identifiers of the base station, and outputs to the terminal an update request signal that causes the terminal to update the active cell set and the predicted cell set.

6. The radio communication system according to claim 5, wherein when the radio communication system detects disconnection of communication between the terminal and the wireless access gateway, the radio communication system transfers the identifies of the WLAN access network included in the active cell set to the predicted cell set, notifies the wireless access gateway of the transfer of the identifiers of the WLAN access network, and outputs to the terminal an update request signal that causes the terminal to update the active cell set and the predicted cell set.

7. The radio communication system according to claim 5, wherein the radio communication system transfers the identifiers of the WLAN access network included in the active cell set to the predicted cell set, and when the identifiers of the base station or the WLAN access network are no longer included in the active cell set, notifies the wireless access gateway that the communication of the terminal has been disconnected and the wireless access gateway deletes the context concerning the terminal.

8. The radio communication system according to claim 5, further comprising a packet controller configured to connect to the radio network controller for controlling calls in packet communication performed through the mobile communication network, wherein when connection between the packet controller and the radio network controller that relates to the terminal is disconnected, the radio network controller deletes the identifiers of the base station connected to the radio network controller from the active cell set and the predicted cell information, outputs a delete request signal to the wireless access gateway whose identifier is contained in the predicted cell set to cause the wireless access gateway to delete the context, and outputs to the terminal an update request signal to cause the terminal to update the active cell set and the predicted cell set when the identifiers are not longer included in the active cell set.

9. A mobile communication network controller, comprising:

a communication control section configured to control communication with a mobile terminal performed through a mobile communication network;

a positional information acquisition section configured to acquire positional information of the mobile terminal;

a next-location predicting section configured to predict, on the basis of the positional information, a wireless network which will communicate with a mobile communication network to which the mobile terminal will move to; and a context transmitting section configured to transmit a context for connecting the mobile terminal to the wireless network to a wireless network controller which controls communication with the mobile terminal on the wireless network predicted by the next-location predicting section, the transmission of the context being completed before the terminal enters a coverage area of and establishes a connection with the wireless network.

10. The mobile communication network controller according to claim 9, further comprising a wireless network information transmitting section configured to transmit information about the wireless network to the mobile terminal through the mobile communication network when the mobile communication network controller receives a response indicating completion of preparation for connection between the wireless network and the mobile terminal sent from the wireless network controller in response to the context transmitted by the context transmitting section.

11. A wireless network controller, comprising:
- a radio control section configured to control communication with a mobile terminal performed through a wireless network;
- a context receiving section configured to receive a context for the mobile terminal to connect to a wireless network controlled by the wireless network controller, the context being sent from a mobile communication network controller based on a prediction that the terminal will move to the wireless network according to positional information of the terminal, wherein the mobile communication network controller controls communication with the mobile terminal performed through a mobile communication network which communicates with the wireless network;
- a tunnel setup unit configured to, in response to reception of a context at the context receiving section, set up a tunnel for the mobile terminal between the wireless network and a gateway which relays packet communication between the wireless network and a public packet-switched network; and
- a response transmitting section configured to transmit a response to the mobile communication network controller indicating completion of preparation for connection upon completion of the tunnel setup by the tunnel setup section, the tunnel setup being completed before the terminal enters a coverage area of and establishes a connection with the wireless network.

12. The wireless network controller according to claim 11, further comprising an authentication section configured to, in response to reception of a context at the context receiving section, authenticate whether the mobile terminal is registered as a terminal connected to the mobile communication network,
- wherein the response transmitting section transmits a response if the authentication section successfully authenticates the mobile terminal.

13. The wireless network controller according to claim 11, comprising:
- a determination section configured to, when a mobile terminal is detected within the wireless network, determine whether a tunnel is set for the mobile terminal between the wireless network controller and the gateway; and
- a packet reception relay notification transmitting section configured to transmit a packet reception relay notification indicating that packets can be received at the gateway in response to determination by the determination section that a tunnel for the mobile terminal is set.

14. A radio communication system comprising a mobile communication network controller which controls communication with a mobile terminal performed through a mobile communication network and a wireless network controller which controls communication with a mobile terminal performed through a wireless network that communicates with the mobile communication network, wherein
the mobile communication network controller comprises:
- a positional information acquiring section configured to acquire positional information of the mobile terminal;
- a next-location predicting section configured to predict a wireless network to which the mobile terminal will move to, on the basis of the positional information; and
- a context transmitting section configured to transmit a context for connecting the mobile terminal to the wireless network to a wireless network controller of the wireless network predicted by the next-location predicting section;

the wireless network controller comprises:
- a context receiving section configured to receive the context sent from the mobile communication network controller;
- a tunnel setup section configured to set up a tunnel for the mobile terminal between the wireless network controller and a gateway in response to reception of a context at the context receiving section, wherein the gateway relays packet communication between the wireless network and a public packet-switched network, and the tunnel setup is completed before the terminal enters a coverage area of and establishes a connection with the wireless network.

15. A communication method for a radio communication system which comprises a mobile communication network controller which controls communication with a mobile terminal performed through a mobile communication network and a wireless network controller which controls communication with the mobile terminal performed over a wireless network that communicates with the mobile communication network,
the communication method comprising the steps of:
- obtaining positional information of the mobile terminal at the mobile communication network controller;
- predicting, on the basis of the positional information, a wireless network to which the mobile terminal will move to;
- transmitting a context for connecting the mobile terminal to the wireless network to the wireless network controller of the wireless network predicted;
- receiving at the wireless network controller the context sent from the mobile communication network controller; and
- in response to reception of the context at the wireless controller, setting up a tunnel for the mobile terminal between the wireless network controller and a gateway, wherein the gateway relays packet communication between the wireless network and a public packet-switched network, the tunnel setup being completed before the terminal enters a coverage area of and establishes a connection with the wireless network.

16. A wireless network controller which controls communication with a mobile terminal performed through a wireless network, comprising:
- an address information storing section configured to store address information of a mobile communication network controller of a mobile communication network that communicates with the wireless network;
- a connection request receiving section configured to receive a connection request for connecting to the wireless network sent from the mobile terminal; and
- radio controller configured to, in response to reception of the connection request at the connection request receiving section, connect the mobile terminal to the wireless network and notify the address information of the mobile communication network controller stored in the address information storing section to the mobile terminal,
- wherein the radio controller selects the wireless network for connecting to the mobile terminal based on a prediction that the mobile terminal is likely to move to the wireless network according to positional information of the mobile terminal and a determined context required for the terminal to communicate on the wireless network, the selection of the wireless network and the determination of the context being completed before the terminal enters a coverage area of and establishes a connection with the wireless network.

17. The wireless network controller according to claim 16, wherein the wireless network controller transfers packets directed to the mobile communication network controller sent from the mobile terminal to the mobile communication network controller.

18. A radio communication system comprising a mobile communication network controller which controls communication with a mobile terminal performed through a mobile communication network and a wireless network controller which controls communication with the mobile terminal performed through a wireless network that communicates with the mobile communication network, wherein,
the wireless network controller comprises:
an address information storing section configured to store address information of a mobile communication network controller of a mobile communication network that communicates with the wireless network;
a connection request receiving section configured to receive a connection request for connecting to the wireless network sent from the mobile terminal; and
radio controller configured to, in response to reception of the connection request at the connection request receiving section, connect the mobile terminal to the wireless network and notify the address information of the mobile communication network controller stored in the address information storing section to the mobile terminal,
wherein the radio controller selects the wireless network for connecting to the mobile terminal based on a prediction that the mobile terminal is likely to move to the wireless network according to positional information of the mobile terminal and a determined context required for the terminal to communicate on the wireless network, the selection of the wireless network and the determination of the context being completed before the terminal enters a coverage area of and establishes a connection with the wireless network.

19. The radio communication system according to claim 18, wherein the mobile terminal uses the address information of the mobile communication network controller notified from the wireless network controller to send a registration request for registering the mobile terminal with the mobile communication network to the mobile communication network controller through the wireless network controller.

20. The radio communication system according to claim 18, wherein the mobile communication network controller further comprises:
a determining section configured to, when the mobile terminal is detected within the mobile communication network, determine whether the detected mobile terminal is registered with the mobile communication network; and
a packet reception relay notification transmitting section configured to transmit a packet relay notification indicating that packets can be received by a gateway in response to determination that the detected mobile terminal is registered with the mobile communication network, wherein the gateway relays packet communication between the mobile communication network controller and a public packet-switched network.

21. A communication method for a radio communication system which comprises a mobile communication network controller which controls communication with a mobile terminal performed through a mobile communication network and a wireless network controller which controls communication with a mobile terminal performed through a wireless network that communicates with the mobile communication network, the communication method comprising the steps of:
receiving a connection request for connecting to the wireless network sent from the mobile terminal;
connecting the mobile terminal to the wireless network in response to reception of the connection request received at the step of receiving a connection request; and
reading address information from an address information storing section and notifying the read address information to the mobile terminal by the wireless network controller, wherein the address information storing section stores address information of the mobile communication network controller of the mobile communication network that communicates with the wireless network,
wherein connecting of the mobile terminal to the wireless network is based on a prediction that the mobile terminal is likely to move to the wireless network according to positional information of the mobile terminal and a determined context required for the terminal to communicate on the wireless network, the selection of the wireless network and the determination of the context being completed before the terminal enters a coverage area of and establishes a connection with the wireless network.

22. A radio communication system that enables communication between a mobile communication network and a wireless local area network, comprising:
a terminal configured to communicate with the mobile communication network and the wireless local area network;
a base station configured to wirelessly communicate with the terminal through the mobile communication network;
a radio network controller configured to connect to one or a plurality of the base stations and control wireless connection of the terminal;
a WLAN access network configured to wirelessly connect to the terminal through the wireless local area network;
a wireless access gateway configured to connect to the radio network controller and one or a plurality of the WLAN access networks and control connection of the WLAN access network; and
a packet data gateway configured to connect to the wireless access gateway and relay data from the wireless access gateway to a public packet-switched network,
wherein the radio network controller selects one of the WLAN access networks which the radio network controller predicts the terminal is likely to move to and connect to, and outputs an authentication process request signal and a connection setup process request signal to the wireless access gateway that controls the selected WLAN access network,
the wireless access gateway performs an authentication process for determining whether the terminal is permitted to use the selected WLAN access network and, if permitted, performs a process for setting up connection within the wireless local area network and outputs to the radio network controller a context required for the terminal to communicate on the wireless local area network, the process for setting up connection being required for the terminal to use the WLAN access network and being completed before the terminal enters a coverage area of and establishes a connection with the WLAN access network; and
the radio network controller outputs the context to the terminal, and
wherein the radio network controller obtains network status information including a capacity, usage, or error information of one or a plurality of the base stations and one or a plurality of the WLAN access networks, and when the terminal resides in a position where the terminal is configured to communicate with a plurality of the base stations or the WLAN access networks at the same time, the terminal selects, on the basis of the network status information, one of the base stations and the WLAN access networks to communicate with.

* * * * *